(12) United States Patent
Felger

(10) Patent No.: US 8,190,513 B2
(45) Date of Patent: May 29, 2012

(54) METHOD OF BILLING A PURCHASE MADE OVER A COMPUTER NETWORK

(75) Inventor: David Felger, Latana, FL (US)

(73) Assignee: Fraud Control Systems.com Corporation, Boca Raton, FL (US)

( * ) Notice: Subject to any disclaimer, the term of this patent is extended or adjusted under 35 U.S.C. 154(b) by 59 days.

(21) Appl. No.: 12/255,857

(22) Filed: Oct. 22, 2008

(65) Prior Publication Data
US 2009/0048975 A1 Feb. 19, 2009

Related U.S. Application Data

(60) Continuation of application No. 10/422,751, filed on Apr. 25, 2003, now abandoned, which is a division of application No. 09/432,811, filed on Nov. 4, 1999, now Pat. No. 7,555,458, which is a continuation-in-part of application No. 09/362,238, filed on Jul. 28, 1999, now abandoned, which is a continuation-in-part of application No. 09/280,863, filed on Mar. 30, 1999, now abandoned, which is a continuation-in-part of application No. 09/245,713, filed on Feb. 8, 1999, now abandoned.

(51) Int. Cl.
*G06Q 40/00* (2006.01)
(52) U.S. Cl. ........... 705/38; 705/39; 705/44; 705/18; 705/26.82; 705/26.35
(58) Field of Classification Search ............ 705/35, 705/40, 39, 44, 26, 16, 18, 30, 36 R, 38, 26.35, 705/26.82
See application file for complete search history.

(56) References Cited

U.S. PATENT DOCUMENTS
3,509,331 A 4/1970 Cutaia
(Continued)

FOREIGN PATENT DOCUMENTS
EP 0227327 1/1994
(Continued)

OTHER PUBLICATIONS

Philbrick, William "The Use of Factoring in International Commercial Transactions and the Need for Legal Uniformity as Applied to Factoring Trasactions Between the United States and Japan" Spring 1994, Commercial Law Journal, V99N1, pp. 141-156.*

(Continued)

*Primary Examiner* — Kelly Campen
(74) *Attorney, Agent, or Firm* — Jason H. Vick; Sheridan Ross, PC

(57) ABSTRACT

A method of effecting a sale over a computer network in which it is determined whether a user passes fraud control before effecting a sale over a computer network. Information associated with a method of payment, such as credit card information, debit card information, checking account information, a telephone service account, a cable television account, a utility service account, or an Internet service provider account, is requested from the user after the user passes the fraud control. Information associated with the method of payment is received from the user in real time. Method-of-payment information is communicated to a payment authorization database, which can be located locally or remotely. The method-of-payment information includes the received information associated with the method of payment. Payment authorization information associated with the method of payment is received from the payment authorization database. A sale transaction is completed when the payment authorization information is affirmative. Sale charge information associated with the sale effected over the computer network is transmitted to the payment authorization database when the sale transaction is complete. The sale charge information includes information for charging the method of payment an amount representing a charge for the sale.

51 Claims, 11 Drawing Sheets

U.S. PATENT DOCUMENTS

| | | |
|---|---|---|
| 3,598,973 A | 8/1971 | Brooks et al. |
| 3,617,638 A | 11/1971 | Jochimsen et al. |
| 3,639,686 A | 2/1972 | Walker et al. |
| 3,656,178 A | 4/1972 | De Maine et al. |
| 3,675,211 A | 7/1972 | Raviv |
| 3,694,813 A | 9/1972 | Loh et al. |
| 3,701,108 A | 10/1972 | Loh et al. |
| 3,717,851 A | 2/1973 | Cocke et al. |
| 3,719,927 A | 3/1973 | Michels et al. |
| 3,769,579 A | 10/1973 | Harney |
| 3,786,421 A | 1/1974 | Wostl et al. |
| 3,826,344 A | 7/1974 | Wahlberg |
| 3,878,531 A | 4/1975 | McClelland |
| 3,909,604 A | 9/1975 | Monna |
| 3,912,874 A | 10/1975 | Botterell et al. |
| 3,914,579 A | 10/1975 | Shigemori et al. |
| 3,916,386 A | 10/1975 | Teixeira et al. |
| 3,920,908 A | 11/1975 | Kraus |
| 3,924,108 A | 12/1975 | Nakamura |
| RE28,701 E | 1/1976 | Edwards et al. |
| 3,937,925 A | 2/1976 | Boothroyd |
| 3,938,090 A | 2/1976 | Borison et al. |
| 3,946,217 A | 3/1976 | Tsujikawa et al. |
| 3,946,220 A | 3/1976 | Brobeck et al. |
| 3,947,660 A | 3/1976 | Saito |
| 3,956,615 A | 5/1976 | Anderson et al. |
| 3,963,910 A | 6/1976 | Enomoto et al. |
| 4,003,030 A | 1/1977 | Takagi et al. |
| 4,021,782 A | 5/1977 | Hoerning |
| 4,023,012 A | 5/1977 | Ano et al. |
| 4,027,140 A | 5/1977 | Fowler et al. |
| 4,048,475 A | 9/1977 | Yoshida |
| 4,070,564 A | 1/1978 | Tucker |
| 4,070,648 A | 1/1978 | Mergenthaler et al. |
| 4,075,696 A | 2/1978 | Shinoda et al. |
| 4,084,238 A | 4/1978 | Masuo |
| 4,093,998 A | 6/1978 | Miller |
| 4,095,738 A | 6/1978 | Masuo |
| 4,106,060 A | 8/1978 | Chapman, Jr. |
| 4,138,733 A | 2/1979 | Tadakuma et al. |
| 4,142,235 A | 2/1979 | Tadakuma et al. |
| 4,144,567 A | 3/1979 | Tadakuma et al. |
| 4,156,259 A | 5/1979 | Sato |
| 4,159,533 A | 6/1979 | Sakurai |
| 4,173,026 A | 10/1979 | Deming |
| 4,179,723 A | 12/1979 | Spencer |
| 4,186,439 A | 1/1980 | Shimura et al. |
| 4,187,498 A | 2/1980 | Creekmore |
| 4,188,962 A | 2/1980 | Onoe et al. |
| 4,189,774 A | 2/1980 | Kashio |
| 4,191,999 A | 3/1980 | Kashio |
| 4,200,770 A | 4/1980 | Hellman et al. |
| 4,213,179 A | 7/1980 | Hamano et al. |
| 4,218,582 A | 8/1980 | Hellman et al. |
| 4,220,991 A | 9/1980 | Hamano et al. |
| 4,231,511 A | 11/1980 | Campanella et al. |
| 4,237,483 A | 12/1980 | Clever |
| 4,245,138 A | 1/1981 | Harper |
| 4,245,311 A | 1/1981 | Nakamura |
| 4,251,867 A | 2/1981 | Uchida et al. |
| 4,254,441 A | 3/1981 | Fisher |
| 4,255,697 A | 3/1981 | Buhler, III |
| 4,261,036 A | 4/1981 | Nagasaka et al. |
| 4,262,333 A | 4/1981 | Horigome et al. |
| 4,264,782 A | 4/1981 | Konheim |
| 4,276,593 A | 6/1981 | Hansen |
| 4,276,598 A | 6/1981 | Inoue et al. |
| 4,277,837 A | 7/1981 | Stuckert |
| 4,285,043 A | 8/1981 | Hashimoto et al. |
| 4,289,943 A | 9/1981 | Sado |
| 4,293,911 A | 10/1981 | Oonishi |
| 4,295,039 A | 10/1981 | Stuckert |
| 4,296,404 A | 10/1981 | Sheldon |
| 4,303,904 A | 12/1981 | Chasek |
| 4,304,992 A | 12/1981 | Kobayashi et al. |
| 4,305,059 A | 12/1981 | Benton |
| 4,307,268 A | 12/1981 | Harper |
| 4,312,037 A | 1/1982 | Yamakita |
| 4,314,116 A | 2/1982 | Gordon |
| 4,317,172 A | 2/1982 | Nakano |
| 4,320,387 A | 3/1982 | Powell |
| 4,321,671 A | 3/1982 | Ohsako |
| 4,321,672 A | 3/1982 | Braun et al. |
| 4,322,587 A | 3/1982 | Burns et al. |
| 4,322,793 A | 3/1982 | Andersson et al. |
| 4,322,796 A | 3/1982 | Uchida et al. |
| 4,325,441 A | 4/1982 | Nakatani et al. |
| D264,467 S | 5/1982 | Fischer |
| 4,328,544 A | 5/1982 | Baldwin et al. |
| 4,331,973 A | 5/1982 | Eskin et al. |
| 4,351,982 A | 9/1982 | Miller et al. |
| 4,360,872 A | 11/1982 | Suzuki et al. |
| 4,369,334 A | 1/1983 | Nakatani et al. |
| 4,381,500 A | 4/1983 | Urata et al. |
| 4,388,689 A | 6/1983 | Hayman et al. |
| 4,389,707 A | 6/1983 | Tsuzuki |
| 4,396,985 A | 8/1983 | Ohara |
| 4,398,250 A | 8/1983 | Hosono |
| 4,399,508 A | 8/1983 | Nakatani et al. |
| 4,407,016 A | 9/1983 | Bayliss et al. |
| 4,408,292 A | 10/1983 | Nakatani et al. |
| 4,412,304 A | 10/1983 | Yamakita |
| 4,412,306 A | 10/1983 | Moll |
| 4,415,065 A | 11/1983 | Sandstedt |
| 4,419,738 A | 12/1983 | Takahashi et al. |
| 4,424,414 A | 1/1984 | Hellman et al. |
| 4,424,566 A | 1/1984 | Tsuzuki |
| 4,424,567 A | 1/1984 | Yasutake |
| 4,425,619 A | 1/1984 | Matsuda et al. |
| 4,428,049 A | 1/1984 | Miyazaki |
| 4,430,713 A | 2/1984 | Nakatani et al. |
| 4,435,767 A | 3/1984 | Nakatani et al. |
| 4,436,992 A | 3/1984 | Simjian |
| 4,439,636 A | 3/1984 | Newkirk et al. |
| 4,441,160 A | 4/1984 | Azcua et al. |
| 4,443,692 A | 4/1984 | Nishimura |
| 4,449,040 A | 5/1984 | Matsuoka et al. |
| 4,449,186 A | 5/1984 | Kelly et al. |
| 4,450,526 A | 5/1984 | Nakatani et al. |
| 4,454,414 A | 6/1984 | Benton |
| 4,455,620 A | 6/1984 | Watanabe et al. |
| 4,458,315 A | 7/1984 | Uchenick |
| 4,458,317 A | 7/1984 | Horigome et al. |
| 4,464,650 A | 8/1984 | Eastman et al. |
| 4,464,713 A | 8/1984 | Benhase et al. |
| 4,468,750 A | 8/1984 | Chamoff et al. |
| 4,471,434 A | 9/1984 | Iwawaki |
| 4,481,599 A | 11/1984 | Ootsuka |
| 4,482,976 A | 11/1984 | Ishikawa |
| 4,484,277 A | 11/1984 | Uesugi |
| 4,485,441 A | 11/1984 | Nakatani et al. |
| 4,491,934 A | 1/1985 | Heinz |
| 4,493,037 A | 1/1985 | Takano et al. |
| 4,497,261 A | 2/1985 | Ferris et al. |
| 4,502,119 A | 2/1985 | Tsuzuki |
| 4,502,120 A | 2/1985 | Ohnishi et al. |
| 4,503,503 A | 3/1985 | Suzuki |
| 4,508,962 A | 4/1985 | Yamasaki |
| 4,509,129 A | 4/1985 | Yatsunami et al. |
| 4,512,027 A | 4/1985 | Mochizuki et al. |
| 4,518,852 A | 5/1985 | Stockburger et al. |
| 4,521,677 A | 6/1985 | Sarwin |
| 4,525,799 A | 6/1985 | Okawa et al. |
| 4,529,870 A | 7/1985 | Chaum |
| 4,530,067 A | 7/1985 | Dorr |
| 4,532,588 A | 7/1985 | Foster |
| 4,532,641 A | 7/1985 | Nishimura |
| 4,533,791 A | 8/1985 | Read et al. |
| 4,538,057 A | 8/1985 | Iwagami et al. |
| 4,546,382 A | 10/1985 | McKenna et al. |
| 4,553,222 A | 11/1985 | Kurland et al. |
| 4,558,302 A | 12/1985 | Welch |
| 4,558,413 A | 12/1985 | Schmidt et al. |
| 4,562,341 A | 12/1985 | Ohmae et al. |
| 4,564,904 A | 1/1986 | Kumagai |
| 4,567,359 A | 1/1986 | Lockwood |
| 4,567,600 A | 1/1986 | Massey et al. |

| Patent No. | Date | Name |
|---|---|---|
| 4,569,421 A | 2/1986 | Sandstedt |
| 4,570,223 A | 2/1986 | Yoshimoto |
| 4,578,530 A | 3/1986 | Zeidler |
| 4,585,929 A | 4/1986 | Brown et al. |
| 4,587,379 A | 5/1986 | Masuda |
| 4,589,069 A | 5/1986 | Endo et al. |
| 4,590,470 A | 5/1986 | Koenig |
| 4,591,854 A | 5/1986 | Robinson |
| 4,594,663 A | 6/1986 | Nagata et al. |
| 4,594,664 A | 6/1986 | Hashimoto |
| 4,595,985 A | 6/1986 | Sakakiya |
| 4,598,288 A | 7/1986 | Yarbrough et al. |
| 4,602,279 A | 7/1986 | Freeman |
| 4,607,334 A | 8/1986 | Shiono et al. |
| 4,607,335 A | 8/1986 | Mizuno |
| 4,608,486 A | 8/1986 | Berstein et al. |
| 4,611,286 A | 9/1986 | Nishimura et al. |
| 4,612,532 A | 9/1986 | Bacon et al. |
| 4,614,861 A | 9/1986 | Pavlov et al. |
| 4,626,844 A | 12/1986 | Mann et al. |
| 4,626,990 A | 12/1986 | Komai et al. |
| 4,628,452 A | 12/1986 | Shiono et al. |
| 4,630,108 A | 12/1986 | Gomersall |
| 4,630,200 A | 12/1986 | Ohmae et al. |
| 4,630,201 A | 12/1986 | White |
| 4,633,396 A | 12/1986 | Komai et al. |
| 4,634,845 A | 1/1987 | Hale et al. |
| 4,635,189 A | 1/1987 | Kendall |
| 4,635,196 A | 1/1987 | Nakamura et al. |
| 4,638,435 A | 1/1987 | Matsuda et al. |
| 4,646,145 A | 2/1987 | Percy et al. |
| 4,646,235 A | 2/1987 | Hirosawa et al. |
| 4,648,061 A | 3/1987 | Foster |
| 4,649,481 A | 3/1987 | Takahashi |
| 4,651,279 A | 3/1987 | Suzuki |
| 4,658,093 A | 4/1987 | Hellman |
| 4,658,290 A | 4/1987 | McKenna et al. |
| 4,658,370 A | 4/1987 | Erman et al. |
| 4,661,658 A | 4/1987 | Matyas |
| 4,661,908 A | 4/1987 | Hamano et al. |
| 4,669,596 A | 6/1987 | Capers et al. |
| 4,670,838 A | 6/1987 | Kawata |
| 4,672,543 A | 6/1987 | Matsui et al. |
| 4,673,802 A | 6/1987 | Ohmae et al. |
| 4,675,515 A | 6/1987 | Lucero |
| 4,677,434 A | 6/1987 | Fascenda |
| 4,678,895 A | 7/1987 | Tateisi et al. |
| 4,679,154 A | 7/1987 | Blanford |
| 4,680,707 A | 7/1987 | Iida |
| 4,683,536 A | 7/1987 | Yamamoto |
| 4,683,553 A | 7/1987 | Mollier |
| 4,688,173 A | 8/1987 | Mitarai et al. |
| 4,688,174 A | 8/1987 | Sakamoto |
| 4,689,478 A | 8/1987 | Hale et al. |
| 4,691,283 A | 9/1987 | Matsuda et al. |
| 4,694,408 A | 9/1987 | Zaleski |
| 4,707,785 A | 11/1987 | Takagi |
| 4,713,760 A | 12/1987 | Yamada et al. |
| 4,713,780 A | 12/1987 | Schultz et al. |
| 4,713,785 A | 12/1987 | Antonelli et al. |
| 4,713,837 A | 12/1987 | Gordon |
| 4,714,992 A | 12/1987 | Gladney et al. |
| 4,722,054 A | 1/1988 | Yorozu et al. |
| 4,723,284 A | 2/1988 | Munck et al. |
| 4,725,949 A | 2/1988 | Dreher |
| 4,729,097 A | 3/1988 | Takaoka et al. |
| 4,730,259 A | 3/1988 | Gallant |
| 4,730,348 A | 3/1988 | MacCrisken |
| 4,734,857 A | 3/1988 | Fujiwara et al. |
| 4,734,858 A | 3/1988 | Schlafly |
| 4,734,931 A | 3/1988 | Bourg et al. |
| 4,745,468 A | 5/1988 | Von Kohorn |
| 4,747,049 A | 5/1988 | Richardson et al. |
| 4,750,120 A | 6/1988 | Takahashi |
| 4,750,201 A | 6/1988 | Hodgson et al. |
| 4,751,635 A | 6/1988 | Kret |
| 4,751,641 A | 6/1988 | Collins, Jr. et al. |
| 4,752,874 A | 6/1988 | Meyers |
| 4,752,875 A | 6/1988 | Takebayashi |
| 4,755,940 A | 7/1988 | Brachtl et al. |
| 4,757,267 A | 7/1988 | Riskin |
| 4,757,448 A | 7/1988 | Takagi |
| 4,758,714 A | 7/1988 | Carlson et al. |
| 4,761,808 A | 8/1988 | Howard |
| 4,763,277 A | 8/1988 | Ashford et al. |
| 4,766,293 A | 8/1988 | Boston |
| 4,766,295 A | 8/1988 | Davis et al. |
| 4,768,144 A | 8/1988 | Winter et al. |
| 4,771,382 A | 9/1988 | Shiono et al. |
| 4,771,383 A | 9/1988 | Takahashi |
| 4,771,461 A | 9/1988 | Matyas |
| 4,775,935 A | 10/1988 | Yourick |
| 4,775,936 A | 10/1988 | Jung |
| 4,776,540 A | 10/1988 | Westerlund |
| 4,779,224 A | 10/1988 | Moseley et al. |
| 4,780,821 A | 10/1988 | Crossley |
| 4,785,393 A | 11/1988 | Chu et al. |
| 4,786,788 A | 11/1988 | Noji |
| 4,787,037 A | 11/1988 | Ootsuka |
| 4,788,418 A | 11/1988 | Tsukui |
| 4,788,420 A | 11/1988 | Chang et al. |
| 4,788,637 A | 11/1988 | Tamaru |
| 4,790,007 A | 12/1988 | Richter et al. |
| 4,791,281 A | 12/1988 | Johnsen et al. |
| 4,792,968 A | 12/1988 | Katz |
| 4,795,890 A | 1/1989 | Goldman |
| 4,796,292 A | 1/1989 | Thomas |
| 4,797,540 A | 1/1989 | Kimizu |
| 4,799,156 A | 1/1989 | Shavit et al. |
| 4,805,020 A | 2/1989 | Greenberg |
| 4,805,207 A | 2/1989 | McNutt et al. |
| 4,809,219 A | 2/1989 | Ashford et al. |
| 4,811,219 A | 3/1989 | Touji et al. |
| 4,812,628 A | 3/1989 | Boston et al. |
| 4,812,629 A | 3/1989 | O'Neil et al. |
| 4,814,746 A | 3/1989 | Miller et al. |
| 4,814,985 A | 3/1989 | Swistak |
| 4,817,041 A | 3/1989 | Sakamoto |
| 4,817,050 A | 3/1989 | Komatsu et al. |
| 4,818,854 A | 4/1989 | Davies et al. |
| 4,821,186 A | 4/1989 | Munakata et al. |
| 4,823,264 A | 4/1989 | Deming |
| 4,825,045 A | 4/1989 | Humble |
| 4,827,418 A | 5/1989 | Gerstenfeld |
| 4,827,508 A | 5/1989 | Shear |
| 4,829,429 A | 5/1989 | Komai et al. |
| 4,831,526 A | 5/1989 | Luchs et al. |
| 4,833,308 A | 5/1989 | Humble |
| 4,833,608 A | 5/1989 | Aya |
| 4,833,609 A | 5/1989 | Grulke, Jr. |
| 4,835,372 A | 5/1989 | Gombrich et al. |
| 4,837,422 A | 6/1989 | Dethloff et al. |
| 4,837,798 A | 6/1989 | Cohen et al. |
| 4,840,344 A | 6/1989 | Moroe |
| 4,841,441 A | 6/1989 | Nixon et al. |
| 4,841,442 A | 6/1989 | Hosoyama |
| 4,843,547 A | 6/1989 | Fuyama et al. |
| 4,843,560 A | 6/1989 | Ichikawa |
| 4,845,625 A | 7/1989 | Stannard |
| 4,847,762 A | 7/1989 | Suzuki |
| 4,849,878 A | 7/1989 | Roy |
| 4,850,007 A | 7/1989 | Marino et al. |
| 4,851,650 A | 7/1989 | Kitade |
| 4,853,696 A | 8/1989 | Mukherjee |
| 4,853,853 A | 8/1989 | Yamamura et al. |
| 4,855,908 A | 8/1989 | Shimoda et al. |
| 4,859,837 A | 8/1989 | Halpern |
| 4,859,838 A | 8/1989 | Okiharu |
| 4,860,352 A | 8/1989 | Laurance et al. |
| 4,866,634 A | 9/1989 | Reboh et al. |
| 4,868,735 A | 9/1989 | Moller et al. |
| 4,870,577 A | 9/1989 | Karasawa et al. |
| 4,872,113 A | 10/1989 | Dinerstein |
| 4,873,631 A | 10/1989 | Nathan et al. |
| 4,875,163 A | 10/1989 | Ishii |
| 4,875,206 A | 10/1989 | Nichols et al. |
| 4,876,541 A | 10/1989 | Storer |
| 4,876,592 A | 10/1989 | Von Kohorn |

| | | | | | |
|---|---|---|---|---|---|
| 4,876,711 A | 10/1989 | Curtin | 5,016,274 A | 5/1991 | Micali et al. |
| 4,877,947 A | 10/1989 | Mori | 5,017,766 A | 5/1991 | Tamada et al. |
| 4,877,950 A | 10/1989 | Halpern | 5,018,196 A | 5/1991 | Takaragi et al. |
| 4,879,648 A | 11/1989 | Cochran et al. | 5,019,696 A | 5/1991 | Chang et al. |
| 4,879,649 A | 11/1989 | Ishii | 5,023,904 A | 6/1991 | Kaplan et al. |
| 4,879,650 A | 11/1989 | Kurimoto et al. | 5,023,907 A | 6/1991 | Johnson et al. |
| 4,880,493 A | 11/1989 | Ashby et al. | 5,025,372 A | 6/1991 | Burton et al. |
| 4,884,212 A | 11/1989 | Stutsman | 5,025,373 A | 6/1991 | Keyser, Jr. et al. |
| 4,884,217 A | 11/1989 | Skeirik et al. | 5,030,806 A | 7/1991 | Collin |
| 4,887,209 A | 12/1989 | Sugishima | 5,034,807 A | 7/1991 | Von Kohorn |
| 4,887,210 A | 12/1989 | Nakamura et al. | 5,043,871 A | 8/1991 | Nishigaki et al. |
| 4,888,771 A | 12/1989 | Benignus et al. | 5,053,607 A | 10/1991 | Carlson et al. |
| 4,888,798 A | 12/1989 | Earnest | 5,057,915 A | 10/1991 | Von Kohorn |
| 4,890,240 A | 12/1989 | Loeb et al. | 5,058,056 A | 10/1991 | Hammer et al. |
| 4,891,766 A | 1/1990 | Derr et al. | 5,060,153 A | 10/1991 | Nakagawa |
| 4,893,236 A | 1/1990 | Ohnishi et al. | 5,063,523 A | 11/1991 | Vrenjak |
| 4,893,237 A | 1/1990 | Unno | 5,077,607 A | 12/1991 | Johnson et al. |
| 4,899,136 A | 2/1990 | Beard et al. | 5,091,849 A | 2/1992 | Davis et al. |
| 4,902,881 A | 2/1990 | Janku | 5,103,476 A | 4/1992 | Waite et al. |
| 4,903,200 A | 2/1990 | Mook, Jr. | 5,103,498 A | 4/1992 | Lanier et al. |
| 4,906,828 A | 3/1990 | Halpern | 5,114,128 A | 5/1992 | Harris, Jr et al. |
| 4,906,991 A | 3/1990 | Fiala et al. | D327,472 S | 6/1992 | Martin |
| 4,907,227 A | 3/1990 | Unno | D327,877 S | 7/1992 | Martin |
| 4,907,257 A | 3/1990 | Asano et al. | 5,128,524 A | 7/1992 | Anglin et al. |
| 4,908,850 A | 3/1990 | Masson et al. | 5,128,752 A | 7/1992 | Von Kohorn |
| 4,910,672 A | 3/1990 | Off et al. | 5,128,985 A | 7/1992 | Yoshida et al. |
| 4,912,648 A | 3/1990 | Tyler | 5,133,045 A | 7/1992 | Gaither et al. |
| 4,914,590 A | 4/1990 | Loatman et al. | 5,136,146 A | 8/1992 | Anglin et al. |
| 4,916,699 A | 4/1990 | Ohashi | 5,138,712 A | 8/1992 | Corbin |
| 4,918,588 A | 4/1990 | Barrett et al. | 5,146,857 A | 9/1992 | Spliethoff et al. |
| 4,922,521 A | 5/1990 | Krikke et al. | 5,148,474 A | 9/1992 | Haralambopoulos et al. |
| 4,924,378 A | 5/1990 | Hershey et al. | 5,155,591 A | 10/1992 | Wachob |
| 4,924,408 A | 5/1990 | Highland | 5,161,214 A | 11/1992 | Addink et al. |
| 4,926,255 A | 5/1990 | Von Kohorn | 5,164,576 A | 11/1992 | Anglin et al. |
| 4,931,928 A | 6/1990 | Greenfeld | 5,164,981 A | 11/1992 | Mitchell et al. |
| 4,931,932 A | 6/1990 | Dalnekoff et al. | 5,165,011 A | 11/1992 | Hisano |
| 4,931,933 A | 6/1990 | Chen et al. | 5,168,275 A | 12/1992 | Harrison et al. |
| 4,935,870 A | 6/1990 | Burk, Jr. et al. | 5,173,238 A | 12/1992 | Chang et al. |
| 4,935,956 A | 6/1990 | Hellwarth et al. | 5,173,597 A | 12/1992 | Anglin |
| 4,935,962 A | 6/1990 | Austin | 5,173,936 A | 12/1992 | Ditzig et al. |
| 4,937,036 A | 6/1990 | Beard et al. | 5,175,416 A | 12/1992 | Mansvelt et al. |
| 4,937,863 A | 6/1990 | Robert et al. | 5,175,423 A | 12/1992 | Kayan |
| 4,939,507 A | 7/1990 | Beard et al. | 5,175,682 A | 12/1992 | Higashiyama et al. |
| 4,939,773 A | 7/1990 | Katz | 5,180,905 A | 1/1993 | Chen et al. |
| 4,941,089 A | 7/1990 | Fischer | 5,181,238 A | 1/1993 | Medamana et al. |
| 4,941,170 A | 7/1990 | Herbst | 5,183,135 A | 2/1993 | Kurimoto et al. |
| 4,941,175 A | 7/1990 | Enescu et al. | 5,187,710 A | 2/1993 | Chau et al. |
| 4,943,996 A | 7/1990 | Baker, Jr. et al. | D333,658 S | 3/1993 | Sasaki |
| 4,947,028 A | 8/1990 | Gorog | 5,191,410 A | 3/1993 | McCalley et al. |
| 4,948,174 A | 8/1990 | Thomson et al. | D334,924 S | 4/1993 | Crawford et al. |
| 4,949,248 A | 8/1990 | Caro | 5,201,010 A | 4/1993 | Deaton et al. |
| 4,949,278 A | 8/1990 | Davies et al. | 5,204,897 A | 4/1993 | Wyman |
| 4,949,373 A | 8/1990 | Baker, Jr. et al. | 5,204,939 A | 4/1993 | Yamazaki et al. |
| 4,961,142 A | 10/1990 | Elliott et al. | 5,204,947 A | 4/1993 | Bernstein et al. |
| 4,962,531 A | 10/1990 | Sipman et al. | 5,206,899 A | 4/1993 | Gupta et al. |
| 4,963,721 A | 10/1990 | Kohno et al. | 5,207,294 A | 5/1993 | Kurimoto et al. |
| 4,964,164 A | 10/1990 | Fiat | 5,210,789 A | 5/1993 | Jeffus et al. |
| 4,967,273 A | 10/1990 | Greenberg | 5,210,794 A | 5/1993 | Brunsgard |
| 4,968,873 A | 11/1990 | Dethloff et al. | 5,214,688 A | 5/1993 | Zlam et al. |
| 4,970,681 A | 11/1990 | Bennett | 5,214,700 A | 5/1993 | Pinkas et al. |
| 4,972,328 A | 11/1990 | Wu et al. | 5,218,632 A | 6/1993 | Cool |
| 4,972,463 A | 11/1990 | Danielson et al. | 5,220,501 A | 6/1993 | Lawlor et al. |
| 4,972,504 A | 11/1990 | Daniel, Jr. et al. | 5,220,593 A | 6/1993 | Zicker et al. |
| 4,974,193 A | 11/1990 | Beutelspacher et al. | 5,221,838 A | 6/1993 | Gutman et al. |
| 4,974,878 A | 12/1990 | Josephson | 5,222,134 A | 6/1993 | Waite et al. |
| 4,977,502 A | 12/1990 | Baker et al. | 5,223,699 A | 6/1993 | Flynn et al. |
| 4,977,595 A | 12/1990 | Ohta et al. | 5,224,164 A | 6/1993 | Elsner |
| D313,401 S | 1/1991 | Tanabe | 5,225,666 A | 7/1993 | Amarena et al. |
| 4,982,346 A | 1/1991 | Girouard et al. | 5,227,874 A | 7/1993 | Von Kohorn |
| 4,987,587 A | 1/1991 | Jolissaint | 5,229,894 A | 7/1993 | Collins et al. |
| 4,989,234 A | 1/1991 | Schakowski et al. | 5,231,569 A | 7/1993 | Myatt et al. |
| 4,992,646 A | 2/1991 | Collin | D338,876 S | 8/1993 | Nair et al. |
| 4,992,940 A | 2/1991 | Dworkin | 5,235,642 A | 8/1993 | Wobber et al. |
| 4,999,806 A | 3/1991 | Chernow et al. | 5,237,159 A | 8/1993 | Stephens et al. |
| 5,003,584 A | 3/1991 | Benyacar et al. | 5,237,499 A | 8/1993 | Garback |
| 5,003,595 A | 3/1991 | Collins et al. | 5,241,671 A | 8/1993 | Reed et al. |
| 5,007,084 A | 4/1991 | Materna et al. | 5,245,656 A | 9/1993 | Loeb et al. |
| 5,010,240 A | 4/1991 | Sheldon | 5,247,347 A | 9/1993 | Litteral et al. |
| 5,012,077 A | 4/1991 | Takano | 5,247,357 A | 9/1993 | Israelsen |

| | | | | | |
|---|---|---|---|---|---|
| 5,247,575 A | 9/1993 | Sprague et al. | 5,379,037 A | 1/1995 | Harrison et al. |
| 5,249,293 A | 9/1993 | Schreiber et al. | 5,381,242 A | 1/1995 | Fujii |
| D340,067 S | 10/1993 | Arakaki et al. | 5,381,467 A | 1/1995 | Rosinski et al. |
| 5,253,165 A | 10/1993 | Leiseca et al. | 5,383,113 A | 1/1995 | Kight et al. |
| 5,254,843 A | 10/1993 | Hynes et al. | 5,384,831 A | 1/1995 | Creswell et al. |
| 5,255,309 A | 10/1993 | Katz | 5,386,458 A | 1/1995 | Nair et al. |
| 5,256,867 A | 10/1993 | Chen | D355,437 S | 2/1995 | Reph |
| 5,260,999 A | 11/1993 | Wyman | 5,390,297 A | 2/1995 | Barber et al. |
| 5,261,002 A | 11/1993 | Perlman et al. | 5,394,463 A | 2/1995 | Fischell et al. |
| 5,263,164 A | 11/1993 | Kannady et al. | D356,601 S | 3/1995 | Arakaki et al. |
| 5,265,065 A | 11/1993 | Turtle | 5,398,300 A | 3/1995 | Levey |
| 5,266,789 A | 11/1993 | Anglin et al. | 5,404,231 A | 4/1995 | Bloomfield |
| 5,267,314 A | 11/1993 | Stambler | 5,404,506 A | 4/1995 | Fujisawa et al. |
| 5,267,334 A | 11/1993 | Normille et al. | 5,404,508 A | 4/1995 | Konrad et al. |
| 5,267,351 A | 11/1993 | Reber et al. | 5,408,519 A | 4/1995 | Pierce et al. |
| 5,270,921 A | 12/1993 | Hornick | 5,410,343 A | 4/1995 | Coddington et al. |
| 5,274,824 A | 12/1993 | Howarth | 5,410,602 A | 4/1995 | Finkelstein et al. |
| D343,413 S | 1/1994 | Arakaki et al. | 5,412,804 A | 5/1995 | Krishna |
| 5,276,444 A | 1/1994 | McNair | 5,414,833 A | 5/1995 | Hershey et al. |
| 5,276,829 A | 1/1994 | Sano | 5,420,405 A | 5/1995 | Chasek |
| 5,283,731 A | 2/1994 | Lalonde et al. | 5,420,926 A | 5/1995 | Low et al. |
| 5,283,734 A | 2/1994 | Von Kohorn | 5,420,927 A | 5/1995 | Micali |
| 5,283,829 A | 2/1994 | Anderson | 5,421,008 A | 5/1995 | Banning et al. |
| 5,283,856 A | 2/1994 | Gross et al. | D359,490 S | 6/1995 | Arakaki et al. |
| 5,287,181 A | 2/1994 | Holman | 5,425,080 A | 6/1995 | Abbie |
| 5,287,403 A | 2/1994 | Atkins et al. | 5,426,286 A | 6/1995 | Nair et al. |
| 5,287,407 A | 2/1994 | Holmes | 5,428,210 A | 6/1995 | Nair et al. |
| 5,291,003 A | 3/1994 | Avnet et al. | 5,428,709 A | 6/1995 | Banzhaf |
| 5,291,543 A | 3/1994 | Freese et al. | 5,428,745 A | 6/1995 | de Bruijn et al. |
| 5,297,189 A | 3/1994 | Chabernaud | 5,428,791 A | 6/1995 | Andrew et al. |
| 5,297,197 A | 3/1994 | Katz | D359,951 S | 7/1995 | Nair et al. |
| 5,297,249 A | 3/1994 | Bernstein et al. | 5,432,326 A | 7/1995 | Noblett, Jr. et al. |
| 5,305,195 A | 4/1994 | Murphy | 5,432,329 A | 7/1995 | Colgate, Jr. et al. |
| 5,307,456 A | 4/1994 | MacKay | 5,434,400 A | 7/1995 | Scherzer |
| D346,794 S | 5/1994 | Arakaki et al. | 5,434,404 A | 7/1995 | Liu et al. |
| 5,309,437 A | 5/1994 | Perlman et al. | 5,434,918 A | 7/1995 | Kung et al. |
| 5,309,504 A | 5/1994 | Morganstein | 5,438,184 A | 8/1995 | Roberts et al. |
| 5,311,594 A | 5/1994 | Penzias | 5,438,355 A | 8/1995 | Palmer |
| 5,311,595 A | 5/1994 | Bjerrum et al. | 5,438,356 A | 8/1995 | Ushiki et al. |
| 5,317,507 A | 5/1994 | Gallant | 5,438,508 A | 8/1995 | Wyman |
| D347,828 S | 6/1994 | Arakaki et al. | 5,438,615 A | 8/1995 | Moen |
| 5,321,243 A | 6/1994 | Groves et al. | 5,440,108 A | 8/1995 | Tran et al. |
| 5,321,750 A | 6/1994 | Nadan | 5,440,621 A | 8/1995 | Castro |
| 5,321,751 A | 6/1994 | Ray et al. | 5,440,634 A | 8/1995 | Jones et al. |
| 5,321,833 A | 6/1994 | Chang et al. | 5,442,342 A | 8/1995 | Kung |
| 5,324,922 A | 6/1994 | Roberts | 5,442,688 A | 8/1995 | Katz |
| 5,325,298 A | 6/1994 | Gallant | 5,442,771 A | 8/1995 | Filepp et al. |
| 5,325,362 A | 6/1994 | Aziz | 5,442,778 A | 8/1995 | Pedersen et al. |
| D348,440 S | 7/1994 | Nair et al. | 5,444,794 A | 8/1995 | Uhland, Sr. |
| 5,331,546 A | 7/1994 | Webber et al. | 5,446,885 A | 8/1995 | Moore et al. |
| 5,333,181 A | 7/1994 | Biggs | 5,446,919 A | 8/1995 | Wilkins |
| 5,333,186 A | 7/1994 | Gupta | 5,448,045 A | 9/1995 | Clark |
| 5,334,823 A | 8/1994 | Noblett, Jr. et al. | 5,448,727 A | 9/1995 | Annevelink |
| 5,335,266 A | 8/1994 | Richardson, Jr. et al. | 5,450,477 A | 9/1995 | Amarant et al. |
| 5,336,870 A | 8/1994 | Hughes et al. | 5,452,348 A | 9/1995 | Adams et al. |
| 5,336,871 A | 8/1994 | Colgate, Jr. | 5,452,352 A | 9/1995 | Talton |
| 5,337,357 A | 8/1994 | Chou et al. | 5,452,447 A | 9/1995 | Nelson et al. |
| 5,337,360 A | 8/1994 | Fischer | 5,452,448 A | 9/1995 | Sakuraba et al. |
| 5,339,352 A | 8/1994 | Armstrong et al. | 5,453,601 A | 9/1995 | Rosen |
| 5,341,414 A | 8/1994 | Popke | 5,455,407 A | 10/1995 | Rosen |
| 5,341,429 A | 8/1994 | Stringer et al. | 5,455,903 A | 10/1995 | Jolissaint et al. |
| 5,341,478 A | 8/1994 | Travis, Jr. et al. | 5,455,953 A | 10/1995 | Russell |
| 5,343,529 A | 8/1994 | Goldfine et al. | 5,457,680 A | 10/1995 | Kamm et al. |
| 5,345,090 A | 9/1994 | Hludzinski | 5,457,746 A | 10/1995 | Dolphin |
| 5,347,576 A | 9/1994 | Taylor | 5,459,304 A | 10/1995 | Eisenmann |
| 5,347,632 A | 9/1994 | Filepp et al. | D364,391 S | 11/1995 | Drugge |
| 5,349,642 A | 9/1994 | Kingdon | 5,465,206 A | 11/1995 | Hilt et al. |
| 5,351,186 A | 9/1994 | Bullock et al. | 5,465,290 A | 11/1995 | Hampton et al. |
| 5,351,293 A | 9/1994 | Michener et al. | 5,465,291 A | 11/1995 | Barrus et al. |
| 5,353,283 A | 10/1994 | Tsuchiya | 5,465,293 A | 11/1995 | Chiller et al. |
| 5,355,403 A | 10/1994 | Richardson, Jr. et al. | 5,466,918 A | 11/1995 | Ray et al. |
| 5,357,563 A | 10/1994 | Hamilton et al. | 5,466,920 A | 11/1995 | Nair et al. |
| 5,357,564 A | 10/1994 | Gupta et al. | 5,467,269 A | 11/1995 | Flaten |
| 5,362,952 A | 11/1994 | Nair et al. | 5,469,491 A | 11/1995 | Morley, Jr. et al. |
| 5,369,705 A | 11/1994 | Bird et al. | 5,475,740 A | 12/1995 | Biggs, Jr. et al. |
| 5,371,794 A | 12/1994 | Diffie et al. | 5,475,747 A | 12/1995 | Bales et al. |
| 5,373,550 A | 12/1994 | Campbell et al. | 5,476,259 A | 12/1995 | Weingardt |
| 5,375,240 A | 12/1994 | Grundy | 5,477,040 A | 12/1995 | Lalonde |
| 5,377,103 A | 12/1994 | Lamberti et al. | 5,478,993 A | 12/1995 | Derksen |

| | | | | | |
|---|---|---|---|---|---|
| 5,479,510 A | 12/1995 | Olsen et al. | 5,590,197 A | 12/1996 | Chen et al. |
| 5,481,600 A | 1/1996 | Alessio | 5,594,226 A | 1/1997 | Steger |
| 5,483,444 A | 1/1996 | Heintzeman et al. | 5,596,642 A | 1/1997 | Davis et al. |
| 5,483,652 A | 1/1996 | Sudama et al. | 5,596,643 A | 1/1997 | Davis et al. |
| 5,485,370 A | 1/1996 | Moss et al. | 5,602,918 A | 2/1997 | Chen et al. |
| 5,485,510 A | 1/1996 | Colbert | 5,604,801 A | 2/1997 | Dolan et al. |
| 5,487,103 A | 1/1996 | Richardson, Jr. et al. | 5,604,802 A | 2/1997 | Holloway |
| 5,488,725 A | 1/1996 | Turtle et al. | 5,613,783 A | 3/1997 | Kinney et al. |
| D367,044 S | 2/1996 | Arakaki | 5,617,474 A | 4/1997 | Ditzig et al. |
| 5,491,752 A | 2/1996 | Kaufman et al. | 5,619,709 A | 4/1997 | Caid et al. |
| 5,491,820 A | 2/1996 | Belove et al. | 5,621,797 A | 4/1997 | Rosen |
| 5,495,521 A | 2/1996 | Rangachar | 5,623,547 A | 4/1997 | Jones et al. |
| 5,497,458 A | 3/1996 | Finch et al. | 5,623,600 A | 4/1997 | Ji et al. |
| 5,500,681 A | 3/1996 | Jones | 5,623,652 A | 4/1997 | Vora et al. |
| 5,500,929 A | 3/1996 | Dickinson | D379,195 S | 5/1997 | Stanton |
| 5,502,636 A | 3/1996 | Clarke | 5,627,892 A | 5/1997 | Kauffman |
| 5,502,759 A | 3/1996 | Cheng et al. | 5,633,919 A | 5/1997 | Hogan et al. |
| 5,502,762 A | 3/1996 | Andrew et al. | 5,633,930 A | 5/1997 | Davis et al. |
| 5,504,677 A * | 4/1996 | Pollin ............................ 705/45 | 5,634,729 A | 6/1997 | Kinney et al. |
| 5,504,890 A | 4/1996 | Sanford | 5,640,564 A | 6/1997 | Hamilton et al. |
| 5,506,393 A | 4/1996 | Ziarno | 5,641,050 A | 6/1997 | Smith et al. |
| 5,506,887 A | 4/1996 | Emery et al. | 5,642,419 A | 6/1997 | Rosen |
| 5,509,055 A | 4/1996 | Ehrlich et al. | 5,651,101 A | 7/1997 | Gotoh et al. |
| 5,510,777 A | 4/1996 | Pilc et al. | 5,652,786 A | 7/1997 | Rogers |
| 5,511,180 A | 4/1996 | Schieve | 5,657,390 A | 8/1997 | Elgamal et al. |
| 5,513,344 A | 4/1996 | Nakamura | 5,659,165 A | 8/1997 | Jennings et al. |
| 5,515,098 A | 5/1996 | Carles | 5,664,190 A | 9/1997 | Cohen et al. |
| 5,522,087 A | 5/1996 | Hsiang | 5,668,995 A | 9/1997 | Bhat |
| 5,524,142 A | 6/1996 | Lewis et al. | 5,671,279 A | 9/1997 | Elgamal |
| 5,524,145 A | 6/1996 | Parker | 5,671,355 A | 9/1997 | Collins |
| 5,524,208 A | 6/1996 | Finch et al. | 5,671,414 A | 9/1997 | Nicolet |
| 5,530,852 A | 6/1996 | Meske, Jr. et al. | 5,673,322 A | 9/1997 | Pepe et al. |
| 5,530,855 A | 6/1996 | Satoh et al. | 5,678,041 A | 10/1997 | Baker et al. |
| 5,535,276 A | 7/1996 | Ganesan | 5,679,938 A | 10/1997 | Templeton et al. |
| 5,535,382 A | 7/1996 | Ogawa | 5,679,940 A | 10/1997 | Templeton et al. |
| 5,537,464 A | 7/1996 | Lewis et al. | 5,680,552 A | 10/1997 | Netravali et al. |
| 5,537,470 A | 7/1996 | Lee | 5,682,475 A | 10/1997 | Johnson et al. |
| 5,537,546 A | 7/1996 | Sauter | 5,682,523 A | 10/1997 | Chen et al. |
| D372,492 S | 8/1996 | Stanton | D386,781 S | 11/1997 | Sasaki |
| D372,730 S | 8/1996 | Sasaki | D386,782 S | 11/1997 | Sasaki |
| 5,544,320 A | 8/1996 | Konrad | 5,687,323 A | 11/1997 | Hodroff |
| 5,544,322 A | 8/1996 | Cheng et al. | 5,691,526 A | 11/1997 | Evans |
| 5,546,523 A | 8/1996 | Gatto | 5,694,616 A | 12/1997 | Johnson et al. |
| 5,546,583 A | 8/1996 | Shriver | 5,696,898 A | 12/1997 | Baker et al. |
| 5,548,760 A | 8/1996 | Healey | 5,696,909 A | 12/1997 | Wallner |
| 5,550,984 A | 8/1996 | Gelb | 5,701,466 A | 12/1997 | Yong et al. |
| 5,551,030 A | 8/1996 | Linden et al. | 5,703,344 A | 12/1997 | Bezy et al. |
| 5,553,239 A | 9/1996 | Heath et al. | 5,704,046 A | 12/1997 | Hogan |
| 5,555,309 A | 9/1996 | Kruys | 5,706,211 A | 1/1998 | Beletic et al. |
| 5,555,346 A | 9/1996 | Gross et al. | 5,706,452 A | 1/1998 | Ivanov |
| 5,555,551 A | 9/1996 | Rudokas et al. | 5,708,780 A | 1/1998 | Levergood et al. |
| 5,557,518 A | 9/1996 | Rosen | 5,708,825 A | 1/1998 | Sotomayor |
| 5,557,730 A | 9/1996 | Frid-Nielsen | 5,710,719 A | 1/1998 | Houle |
| 5,557,736 A | 9/1996 | Hirosawa et al. | 5,710,887 A | 1/1998 | Chelliah et al. |
| 5,557,747 A | 9/1996 | Rogers et al. | 5,715,314 A | 2/1998 | Payne et al. |
| 5,559,887 A | 9/1996 | Davis et al. | 5,715,399 A | 2/1998 | Bezos |
| 5,559,925 A | 9/1996 | Austin | 5,717,745 A | 2/1998 | Vijay et al. |
| 5,560,008 A | 9/1996 | Johnson et al. | 5,719,928 A | 2/1998 | Pinnell et al. |
| 5,561,707 A | 10/1996 | Katz | 5,721,768 A | 2/1998 | Stimson et al. |
| 5,566,234 A | 10/1996 | Reed et al. | 5,721,832 A | 2/1998 | Westrope et al. |
| 5,566,302 A | 10/1996 | Khalidi et al. | 5,724,242 A | 3/1998 | Moore-McKee et al. |
| 5,570,283 A | 10/1996 | Shoolery et al. | 5,724,424 A | 3/1998 | Gifford |
| 5,572,643 A | 11/1996 | Judson | 5,724,595 A | 3/1998 | Gentner |
| 5,572,677 A | 11/1996 | Luther et al. | 5,727,156 A | 3/1998 | Herr-Hoyman et al. |
| 5,574,785 A | 11/1996 | Ueno et al. | 5,727,159 A | 3/1998 | Kikinis |
| 5,577,118 A | 11/1996 | Sasaki et al. | 5,727,163 A | 3/1998 | Bezos |
| 5,577,121 A | 11/1996 | Davis et al. | 5,727,249 A * | 3/1998 | Pollin ............................ 705/40 |
| 5,577,197 A | 11/1996 | Beck | 5,740,425 A | 4/1998 | Povilus |
| 5,577,209 A | 11/1996 | Boyle et al. | 5,742,674 A | 4/1998 | Jain et al. |
| 5,577,241 A | 11/1996 | Spencer | 5,744,787 A | 4/1998 | Teicher |
| 5,577,251 A | 11/1996 | Hamilton et al. | 5,745,556 A | 4/1998 | Ronen |
| 5,581,522 A | 12/1996 | Sibuya et al. | 5,745,654 A | 4/1998 | Titan |
| 5,581,764 A | 12/1996 | Fitzgerald et al. | 5,745,681 A | 4/1998 | Levine et al. |
| 5,583,563 A | 12/1996 | Wanderscheid et al. | 5,745,880 A | 4/1998 | Strothmann |
| 5,583,759 A | 12/1996 | Geer | 5,748,780 A | 5/1998 | Stolfo |
| 5,583,996 A | 12/1996 | Tsuchiya | 5,748,973 A | 5/1998 | Palmer et al. |
| 5,584,003 A | 12/1996 | Yamaguchi et al. | 5,749,079 A | 5/1998 | Yong et al. |
| 5,586,260 A | 12/1996 | Hu | 5,751,914 A | 5/1998 | Coley et al. |
| 5,590,038 A | 12/1996 | Pitroda | 5,754,656 A | 5/1998 | Nishioka et al. |

| | | | | | | |
|---|---|---|---|---|---|---|
| 5,757,669 A | 5/1998 | Christie et al. | | 5,835,084 A | 11/1998 | Bailey et al. |
| 5,757,917 A | 5/1998 | Rose et al. | | 5,835,718 A | 11/1998 | Blewett |
| 5,757,925 A | 5/1998 | Faybishenko | | 5,835,726 A | 11/1998 | Shwed et al. |
| 5,758,029 A | 5/1998 | Hall | | 5,835,762 A | 11/1998 | Gans et al. |
| 5,758,327 A | 5/1998 | Gardner et al. | | 5,838,911 A | 11/1998 | Rosenhauer et al. |
| 5,760,771 A | 6/1998 | Blonder et al. | | 5,838,920 A | 11/1998 | Rosborough |
| 5,761,649 A | 6/1998 | Hill | | 5,841,469 A | 11/1998 | Freeman et al. |
| 5,764,789 A | 6/1998 | Pare, Jr. et al. | | D403,321 S | 12/1998 | Beck et al. |
| 5,765,170 A | 6/1998 | Morikawa | | 5,844,972 A | 12/1998 | Jagadish et al. |
| 5,765,178 A | 6/1998 | Tanaka | | 5,845,070 A | 12/1998 | Ikudome |
| 5,768,505 A | 6/1998 | Gilchrist et al. | | 5,845,261 A | 12/1998 | McAbian |
| 5,771,355 A | 6/1998 | Kuzma | | 5,845,267 A | 12/1998 | Ronen |
| 5,773,804 A | 6/1998 | Baik | | 5,845,290 A | 12/1998 | Yoshii |
| 5,774,670 A | 6/1998 | Montulli | | 5,847,957 A | 12/1998 | Cohen et al. |
| 5,778,173 A * | 7/1998 | Apte ................................ 726/2 | | 5,848,161 A | 12/1998 | Luneau et al. |
| 5,778,213 A | 7/1998 | Shakib et al. | | 5,848,271 A | 12/1998 | Caruso et al. |
| 5,778,377 A | 7/1998 | Marlin et al. | | 5,848,397 A | 12/1998 | Marsh et al. |
| 5,778,398 A | 7/1998 | Nagashima et al. | | 5,848,400 A | 12/1998 | Chang |
| 5,780,827 A | 7/1998 | Zolkos et al. | | 5,850,446 A | 12/1998 | Berger et al. |
| 5,781,632 A | 7/1998 | Odom | | 5,850,520 A | 12/1998 | Griebenow et al. |
| 5,784,539 A | 7/1998 | Lenz | | 5,854,897 A | 12/1998 | Radziewicz et al. |
| 5,784,564 A | 7/1998 | Camaisa et al. | | 5,855,008 A | 12/1998 | Goldhaber et al. |
| 5,786,587 A | 7/1998 | Colgate, Jr. | | D404,732 S | 1/1999 | Mason et al. |
| 5,787,402 A | 7/1998 | Potter et al. | | 5,857,191 A | 1/1999 | Blackwell, Jr. et al. |
| 5,787,409 A | 7/1998 | Seiffert et al. | | 5,859,898 A | 1/1999 | Checco |
| 5,787,424 A | 7/1998 | Hill et al. | | 5,862,337 A | 1/1999 | Gray |
| 5,787,438 A | 7/1998 | Cink et al. | | 5,864,613 A | 1/1999 | Flood |
| D397,112 S | 8/1998 | Locklin et al. | | 5,864,620 A | 1/1999 | Pettitt |
| 5,790,977 A | 8/1998 | Ezekiel | | 5,864,669 A | 1/1999 | Osterman et al. |
| 5,793,970 A | 8/1998 | Fakes et al. | | 5,864,684 A | 1/1999 | Nielsen |
| 5,794,053 A | 8/1998 | Doris, Jr. et al. | | 5,864,823 A | 1/1999 | Levitan |
| 5,794,178 A | 8/1998 | Caid et al. | | 5,864,852 A | 1/1999 | Luotonen |
| 5,794,210 A | 8/1998 | Goldhaber et al. | | D405,447 S | 2/1999 | Landry et al. |
| 5,794,221 A * | 8/1998 | Egendorf ........................ 705/40 | | 5,867,562 A | 2/1999 | Scherer |
| 5,796,831 A | 8/1998 | Paradinas et al. | | 5,867,646 A | 2/1999 | Benson et al. |
| 5,796,952 A | 8/1998 | Davis et al. | | 5,867,650 A | 2/1999 | Osterman |
| 5,797,127 A | 8/1998 | Walker et al. | | 5,867,659 A | 2/1999 | Otteson |
| 5,797,128 A | 8/1998 | Birnbaum | | 5,867,667 A | 2/1999 | Butman et al. |
| 5,799,072 A | 8/1998 | Vulcan et al. | | 5,870,473 A | 2/1999 | Boesch et al. |
| 5,799,285 A | 8/1998 | Klingman | | 5,870,544 A | 2/1999 | Curtis |
| 5,799,321 A | 8/1998 | Benson | | 5,870,552 A | 2/1999 | Dozier et al. |
| 5,801,700 A | 9/1998 | Ferguson | | 5,870,556 A | 2/1999 | Cote et al. |
| 5,802,124 A | 9/1998 | Bhadsavle | | 5,870,719 A | 2/1999 | Maritzen et al. |
| 5,802,156 A | 9/1998 | Felger | | 5,870,769 A | 2/1999 | Freund |
| 5,808,283 A | 9/1998 | Stanton et al. | | 5,872,917 A | 2/1999 | Hellman |
| 5,809,250 A | 9/1998 | Kisor | | 5,872,930 A | 2/1999 | Masters et al. |
| 5,809,492 A | 9/1998 | Murray et al. | | 5,873,072 A | 2/1999 | Kight et al. |
| 5,812,668 A | 9/1998 | Weber | | 5,873,100 A | 2/1999 | Adams et al. |
| 5,812,765 A | 9/1998 | Curtis | | 5,875,110 A | 2/1999 | Jacobs |
| 5,812,776 A | 9/1998 | Gifford | | 5,875,236 A | 2/1999 | Jankowitz et al. |
| 5,813,008 A | 9/1998 | Benson et al. | | 5,875,296 A | 2/1999 | Shi et al. |
| 5,813,013 A | 9/1998 | Shakib et al. | | 5,875,322 A | 2/1999 | House et al. |
| 5,815,657 A | 9/1998 | Williams et al. | | 5,878,337 A | 3/1999 | Joao et al. |
| 5,818,021 A | 10/1998 | Szewczykowski | | 5,884,289 A | 3/1999 | Anderson et al. |
| 5,818,271 A | 10/1998 | Stanojevic | | 5,887,249 A | 3/1999 | Schmid |
| 5,819,030 A | 10/1998 | Chen et al. | | 5,890,137 A | 3/1999 | Koreeda |
| 5,819,089 A | 10/1998 | White | | 5,893,088 A | 4/1999 | Hendricks et al. |
| 5,819,226 A | 10/1998 | Gopinathan et al. | | 5,894,510 A | 4/1999 | Felger |
| 5,819,271 A | 10/1998 | Mahoney et al. | | 5,897,620 A | 4/1999 | Walker et al. |
| 5,819,272 A | 10/1998 | Benson | | 5,897,621 A | 4/1999 | Boesch et al. |
| 5,822,410 A | 10/1998 | McCausland et al. | | 5,898,780 A | 4/1999 | Liu et al. |
| 5,822,527 A | 10/1998 | Post | | 5,899,980 A | 5/1999 | Wilf et al. |
| 5,822,731 A | 10/1998 | Schultz | | 5,903,721 A | 5/1999 | Sixtus |
| 5,822,737 A | 10/1998 | Ogram | | 5,905,979 A | 5/1999 | Barrows |
| 5,825,863 A | 10/1998 | Walker | | 5,914,472 A | 6/1999 | Foladare et al. |
| 5,825,881 A | 10/1998 | Colvin, Sr. | | 5,933,480 A | 8/1999 | Felger |
| 5,825,890 A | 10/1998 | Elgamal et al. | | 5,950,121 A | 9/1999 | Kaminsky et al. |
| 5,826,242 A | 10/1998 | Montulli | | 5,960,069 A | 9/1999 | Felger |
| 5,826,244 A * | 10/1998 | Huberman ........................ 705/37 | | 5,963,625 A | 10/1999 | Kawecki et al. |
| 5,826,270 A | 10/1998 | Rutkowski et al. | | 5,966,698 A * | 10/1999 | Pollin ............................ 705/34 |
| 5,828,734 A | 10/1998 | Katz | | 5,970,477 A | 10/1999 | Roden |
| 5,828,833 A | 10/1998 | Belville et al. | | 5,991,750 A | 11/1999 | Watson |
| 5,828,840 A | 10/1998 | Cowan et al. | | 6,006,251 A * | 12/1999 | Toyouchi et al. ............. 709/203 |
| 5,828,845 A | 10/1998 | Jagadish et al. | | 6,016,484 A | 1/2000 | Williams et al. |
| 5,829,002 A | 10/1998 | Priest | | 6,041,315 A * | 3/2000 | Pollin ............................ 705/45 |
| 5,831,987 A | 11/1998 | Spilo | | 6,047,270 A | 4/2000 | Joao et al. |
| 5,832,463 A | 11/1998 | Funk | | 6,049,785 A | 4/2000 | Gifford |
| 5,832,502 A | 11/1998 | Durham et al. | | 6,185,416 B1 | 2/2001 | Rudokas et al. |
| 5,834,756 A | 11/1998 | Gutman et al. | | 6,195,649 B1 | 2/2001 | Gifford |

| | | | |
|---|---|---|---|
| 6,199,051 B1 | 3/2001 | Gifford | |
| 6,205,437 B1 | 3/2001 | Gifford | |
| 6,263,501 B1 | 7/2001 | Schein et al. | |
| 6,282,276 B1 | 8/2001 | Felger | |
| 6,292,478 B1 | 9/2001 | Farris | |
| 6,327,352 B1 | 12/2001 | Betts et al. | |
| 6,549,889 B2 | 4/2003 | Lauffer | |
| 6,553,108 B1 | 4/2003 | Felger | |
| 6,567,511 B2 | 5/2003 | Betts et al. | |
| 6,636,590 B1 | 10/2003 | Jacob et al. | |
| 7,013,001 B1 | 3/2006 | Felger | |
| 7,058,166 B2 | 6/2006 | Betts et al. | |
| 7,096,192 B1 | 8/2006 | Pettit et al. | |
| 7,117,171 B1 * | 10/2006 | Pollin | 705/35 |
| 7,340,045 B2 | 3/2008 | Felger | |
| 2003/0195846 A1 | 10/2003 | Felger | |
| 2003/0195847 A1 | 10/2003 | Felger | |
| 2003/0195848 A1 | 10/2003 | Felger | |
| 2006/0153350 A1 | 7/2006 | Felger | |
| 2009/0049529 A1 | 2/2009 | Felger | |
| 2009/0055315 A1 | 2/2009 | Felger | |

FOREIGN PATENT DOCUMENTS

| | | |
|---|---|---|
| EP | 0179898 | 11/1994 |
| EP | 0629093 | 12/1994 |
| EP | 0676888 | 10/1995 |
| EP | 0705019 | 4/1996 |
| EP | 0335562 | 7/1996 |
| EP | 0601523 | 9/1998 |
| EP | 0527855 | 12/1998 |
| EP | 0604042 | 8/2000 |
| WO | 85/02510 | 6/1985 |
| WO | 94/09587 | 4/1994 |
| WO | 94/24803 | 10/1994 |
| WO | 94/28683 | 12/1994 |
| WO | 95/06993 | 3/1995 |
| WO | 95/08231 | 3/1995 |
| WO | 95/11576 | 4/1995 |
| WO | 95/24011 | 9/1995 |
| WO | 95/24094 | 9/1995 |
| WO | 95/27255 | 10/1995 |
| WO | 95/30317 | 11/1995 |
| WO | 95/35619 | 12/1995 |
| WO | 96/04618 | 2/1996 |
| WO | 96/05706 | 2/1996 |
| WO | 96/09714 | 3/1996 |
| WO | 96/13814 | 5/1996 |
| WO | WO 97/41537 | 11/1997 |
| WO | WO 98/40809 | 9/1998 |
| WO | PCT/US00/30504 | 3/2001 |

OTHER PUBLICATIONS

Stroud, Jerri "1-800-Wide-Open Toll-Free Phone Service Becoming a Battleground" Nov. 1, 1992 St. Louis Post-Dispatch, p. 1E.*
Anonymous "Technology Stems Credit Card Fraud" Nov. 20, 1996, Financial Services Report, V13N24.*
Anonymous, "Technology Stems Credit Card Fraud, Financial Services Report," Potomac, Nov. 20, 1996, p. 1.
W.C. Philbrick, The Use of Factoring in International Commercial Transactions and the Need for Legal Uniformity as Applied to Factoring Transactions between the United States and Japan, Commerical Law Journal, Spring 1994; 99, 1; ABI/Global pp. 141-156.
J. Stroud, "1-800-Wide-Open Toll-Free Phone Service Becoming a Battleground," Nov. 1, 1992, St. Louis Post-Dispatch, p. 1E.
U.S. Appl. No. 09/432,811, Felger.
U.S. Appl. No. 09/039,335, Felger.
U.S. Appl. No. 09/260,068, Felger.
U.S. Appl. No. 09/280,862, Felger.
U.S. Appl. No. 09/280,863, Felger.
U.S. Appl. No. 09/362,238, Felger.
U.S. Appl. No. 09/362,239, Felger.
U.S. Appl. No. 09/432,809, Felger.
U.S. Appl. No. 11/971,047, Felger.
A. Rogers, "Internet Show Focuses on Security," Computer Reseller News, Sep. 28, 1998, 2 pages.
K. Nash, "Electronic profiling," Computer World, vol. 32, Issue 6, Feb. 9, 1998, 5 pages.
D. Linthicum, "Open for business," PC Magazine, vol. 16, Issue 20, Nov. 18, 1997, 30 pages.
Description of NSTI Processing Methods and Services, May 14, 1990, 12 pages.
U.S. Appl. No. 09/245,713, filed Feb. 8, 1999, Felger.
U.S. Appl. No. 09/356,572, filed Dec. 10, 1999, Felger
U.S. Appl. No. 09/432,808, filed Nov. 4, 1999, Felger.
"Verified by Visa: How it Works," http://usa.visa.com/personal/security/visa_security_program/vbv/how_it_works.html, printed Jun. 7, 2005, 2 pages.
Hollander, J., "Polaroid Puts the Finger on E-Commerce Security," E-Commerce Times, Feb. 18, 1999, 2 pages.
Richmond, Riva, "Scammed! Web merchants use new tools to keep buyers from ripping them off," The Wall Street Journal Online, Jan. 27, 2003, http://online.wsj.com/article_print/0,,SB10431845825158165840,00.html, 7 pages.
Written Opinion for International (PCT) Application No. PCT/US00/30504, mailed Jul. 27, 2001, 4 pages.
International Preliminary Examination Report for International (PCT) Application No. PCT/US/00/30504, mailed Jan. 29, 2002, 5 pages.
Official Communication for European Patent Application No. 00976971.2, dated Jun. 23, 2004, 3 pages.
Official Communication for European Patent Application No. 00976971.2, dated Jul. 23, 2004, 2 pages.
Official Action for U.S. Appl. No. 08/658,378, mailed Dec. 23, 1996, 10 pages.
Official Action for U.S. Appl. No. 08/658,378, mailed Jun. 11, 1997, 7 pages.
Notice of Allowance for U.S. Appl. No. 08/658,378, mailed Sep. 2, 1997, 7 pages.
Official Action for U.S. Appl. No. 08/757,563, mailed Dec. 11, 1997, 10 pages.
Official Action for U.S. Appl. No. 08/757,563, mailed May 14, 1998, 10 pages.
Notice of Allowance for U.S. Appl. No. 08/757,563, mailed Nov. 12, 1998, 5 pages.
Official Action (Restriction Requirement) for U.S. Appl. No. 08/796,448, mailed Jun. 22, 1998, 4 pages.
Official Action for U.S. Appl. No. 08/796,448, mailed Aug. 13, 1998, 9 pages.
Notice of Allowance for U.S. Appl. No. 08/796,448, mailed Nov. 12, 1998, 5 pages.
Official Action (Restriction Requirement) for U.S. Appl. No. 08/971,047, mailed Oct. 26, 1998, 5 pages.
Official Action for U.S. Appl. No. 08/971,047, mailed Dec. 3, 1998, 7 pages.
Notice of Allowance for U.S. Appl. No. 08/971,047, mailed Feb. 16, 1999, 5 pages.
Official Action for U.S. Appl. No. 09/432,811, mailed Oct. 2, 2002, 6 pages.
Official Action (Restriction Requirement) for U.S. Appl. No. 09/432,811, mailed Feb. 11, 2003, 6 pages.
Official Action (Restriction Requirement) for U.S. Appl. No. 09/432,811, mailed Jun. 17, 2003, 5 pages.
Official Action for U.S. Appl. No. 09/432,811, mailed Aug. 27, 2004, 8 pages.
Official Action for U.S. Appl. No. 09/432,811, mailed Apr. 1, 2005, 7 pages.
Official Action for U.S. Appl. No. 09/432,811, mailed Apr. 21, 2006, 10 pages.
Official Action for U.S. Appl. No. 09/432,811, mailed May 7, 2007, 8 pages.
Official Action for U.S. Appl. No. 09/432,811, mailed Oct. 22, 2007, 9 pages.
Official Action for U.S. Appl. No. 09/432,811, mailed May 2, 2008, 13 pages.
Notice of Allowance for U.S. Appl. No. 09/432,811, mailed Apr. 1, 2009, 10 pages.
Official Action for U.S. Appl. No. 09/495,923, mailed Jun. 22, 2000, 16 pages.
Official Action for U.S. Appl. No. 09/495,923, mailed Nov. 6, 2000, 4 pages.

Notice of Allowance for U.S. Appl. No. 09/495,923, mailed Apr. 11, 2001, 5 pages.
Official Action for U.S. Appl. No. 09/495,924, mailed Jan. 31, 2002, 5 pages.
Official Action for U.S. Appl. No. 09/495,924, mailed May 9, 2002, 7 pages.
Official Action for U.S. Appl. No. 09/495,924, mailed Aug. 15, 2002, 15 pages.
Notice of Allowance for U.S. Appl. No. 09/495,924, mailed Dec. 3, 2002, 7 pages.
Official Action for U.S. Appl. No. 10/274,274, mailed Jul. 16, 2003, 17 pages.
Official Action for U.S. Appl. No. 10/274,274, mailed Jan. 13, 2004, 17 pages.
Official Action for U.S. Appl. No. 10/274,274, mailed Jun. 3, 2004, 16 pages.
Official Action for U.S. Appl. No. 10/274,274, mailed Jan. 5, 2005, 16 pages.
Notice of Allowance for U.S. Appl. No. 10/274,274, mailed Jun. 16, 2005, 6 pages.
Official Action for U.S. Appl. No. 10/422,751, mailed Jun. 7, 2007, 13 pages.
Official Action (Restriction Requirement) for U.S. Appl. No. 10/422,751, mailed Feb. 25, 2008, 9 pages.
Official Action for U.S. Appl. No. 10/422,757, mailed Jun. 7, 2007, 12 pages.
Official Action (Restriction Requirement) for U.S. Appl. No. 10/422,757, mailed Jan. 30, 2008, 5 pages.
Official Action for U.S. Appl. No. 10/422,758, mailed Jun. 7, 2007, 10 pages.
Official Action (Restriction Requirement) for U.S. Appl. No. No. 10/422,758, mailed Feb. 25, 2008, 8 pages.
Official Action for U.S. Appl. No. 11/371,900, mailed, Nov. 28, 2006, 7 pages.
Official Action for U.S. Appl. No. 11/371,900, mailed Jun. 6, 2007, 5 pages.
Notice of Allowance for U.S. Appl. No. 11/371,900, mailed Sep. 27, 2007, 3 pages.
Official Action for U.S. Appl. No. 09/260,068, mailed Jun. 14, 1999, 7 pages.
Official Action for U.S. Appl. No. 09/260,068, mailed Oct. 28, 1999, 7 pages.
Official Action for U.S. Appl. No. 09/260,068, mailed Mar. 24, 2000, 6 pages.
Official Action for U.S. Appl. No. 09/260,068, mailed Aug. 25, 2000, 8 pages.
Official Action for U.S. Appl. No. 09/260,068, mailed Oct. 30, 2000, 4 pages.
Official Action for U.S. Appl. No. 09/039,335, mailed Apr. 5, 1999, 17 pages.
Official Action for U.S. Appl. No. 09/039,335, mailed May 18, 1999, 16 pages.
Official Action for U.S. Appl. No. 09/356,572, mailed Dec. 10, 1999, 17 pages.
Official Action for U.S. Appl. No. 12/255,871, mailed Aug. 17, 2010.
Official Action for U.S. Appl. No. 12/255,871, mailed Dec. 22, 2010.
Official Action for U.S. Appl. No. 12/255,899, mailed Aug. 17, 2010.
Official Action for U.S. Appl. No. 12/255,899, mailed Jan. 4, 2011.
Official Action for U.S. Appl. No. 12/255,871, mailed Oct. 24, 2011.
Official Action for U.S. Appl. No. 12/255,899, mailed Oct. 26, 2011.
Official Action for U.S. Appl. No. 12/255,871, mailed Aug. 18, 2011.
Official Action for U.S. Appl. No. 12/255,899, mailed Aug. 23, 2011.
US 5,351,994, 10/1994, Pollin (withdrawn)

* cited by examiner

METHOD OF BILLING A PURCHASE MADE OVER A COMPUTER NETWORK

The present application is a continuation patent application of U.S. patent application Ser. No. 10/422,751, filed Apr. 25, 2003, which is a divisional application of U.S. patent application Ser. No. 09/432,811, filed Nov. 4, 1999; which is a continuation-in-part application of U.S. patent application Ser. No. 09/362,238, filed Jul. 28, 1999, now abandoned; which is a continuation-in-part application of U.S. patent application Ser. No. 09/280,863, filed Mar. 30, 1999, now abandoned; which is a continuation-in-part application of U.S. patent application Ser. No. 09/245,713, filed Feb. 8, 1999, each of which is incorporated by reference herein. The present application is also related to U.S. patent application Ser. No. 09/432,809, filed Nov. 4, 1999, now abandoned; which is a continuation-in-part application of U.S. patent application Ser. No. 09/362,239, filed Jul. 28, 1999, and now abandoned; which is a continuation-in-part application of U.S. patent application Ser. No. 09/280,862, filed Mar. 30, 1999, and now abandoned; which is a continuation-in-part application of U.S. patent application Ser. No. 09/245,713, filed Feb. 8, 1999, and now abandoned; and is related to U.S. patent application Ser. No. 09/495,923, filed Feb. 2, 2000, now U.S. Pat. No. 6,282,276, which is a continuation-in-part application of U.S. patent application Ser. No. 09/432,808, filed Nov. 4, 1999, now abandoned; which is a continuation-in-part application of U.S. patent application Ser. No. 09/356,572, filed Jul. 19, 1999, and now abandoned; which is a continuation-in-part application of U.S. patent application Ser. No. 09/039,335, filed Mar. 16, 1998 and now abandoned, each of which is incorporated by reference herein. Additionally, the present application claims benefit of U.S. Provisional Patent Application Ser. No. 60/139,475, filed Jun. 17, 1999, which is incorporated by reference herein.

BACKGROUND OF THE INVENTION

A. Technical Field

The present invention relates to an efficient payment authorization and billing arrangement for products and services purchased over a computer network, such as the Internet. More particularly, the present invention relates to a method for providing payment authorization and a billing arrangement for a call or a communication session to a service representative that is accessible over a telecommunications network or a computer network, such as the Internet, and to session limiting, blocking, fraud control associated with such a communication session. The present invention also relates to a method for providing payment authorization and a billing arrangement for effecting a sale of goods and/or services over a computer network, such as the Internet.

B. Description of the Related Arts

So-called psychic network services have been in operation for several years. A service representative, or agent, at such a service counsels a caller who has called on an 800 or 900 telephone number regarding life, love and prosperity. For a fee, the caller can ask any question of the service representative and, generally, the service representative may counsel to the caller regarding the question.

Presently, a caller to the Yellow Pages Psychic Network service dials one of a plurality of telephone numbers that are used by the network for determining the advertising source from which the caller became aware of the psychic network service. Each respective telephone number connects a caller to the same service bureau where an automatic call distribution (ACD) system distributes calls among service representatives. The caller hears an announcement regarding costs and charges, referred to as a preamble, and is then offered a menu of choices. The caller is given a choice to hear brief resumes of the service representatives that are presently available. When the caller decides on a specific psychic, the caller may press the * button, for example, to reach that particular psychic. When the caller already knows the extension number of a psychic that the caller has used before, that particular telephone extension may be entered. The caller controls the call, but can speak only to one psychic during the call.

ACD telecommunications equipment is known for providing this and other types of telecommunications services. Common-controlled ACD equipment is available, for example, from Lucent Technologies, Inc and other manufacturers of common-controlled switching equipment. Typically, a service bureau or related organization offers services through a service bureau-owned ACD system. Such an ACD system directs a call from a caller requesting service to a next available service representative listed in a service representative availability queue. It is always assumed that one service representative responds to a call. Service representatives, typically equipped with displays and operator type headsets for hands-free operation, usually consult databases for, for example, making travel reservations. To this end, service representatives have access to large computer databases of travel reservation and billing information.

Billing arrangements for such service bureau organizations are primitive and may rely on a 900 service for the service provider to bill the caller for the service provided. For an 800 number call, the service provider pays for the call and must insure that payment for the service will be received, even more so than for 900-based call. The service provider records credit card or other payment data manually into a memory of a billing system for properly billing the call. Such procedures have led to many callers questioning their bills in many instances. Additionally, dishonest callers have received free calls using fraudulent payment schemes, improper granting of credit and the like because of inefficiencies associated with conventional billing procedures.

One approach for overcoming these and other problems is provided by a service offered by a company known as Mile High Psychics that uses credit cards for prepayment for blocks of service usage time. Credit authorization is obtained well in advance of when service is provided. For example, the customer may purchase a block of 25 minutes of service in advance of a call and utilize a personal identification number or code (PIN) at the time of the call for accessing the service.

Another approach is presented by U.S. Pat. No. 5,475,740 to Biggs, Jr., et al. which discloses a system connected to a central distribution computer that enables a user to access and pay for amenities using a telephone for entering amenity identification and billing information. A billing database is connected to the central distribution computer for validating entered billing information.

U.S. Pat. No. 5,383,113 to Kight et al. and U.S. Pat. No. 5,283,829 to Anderson are both directed to a method for paying bills electronically. According to U.S. Pat. No. 5,383,113 to Kight et al., a computerized payment system is implemented by which a consumer may instruct a service provider by telephone, computer terminal, or by using another telecommunications technique to pay various bills without the consumer being required to write a check for each bill. The service provider collects information from consumers, financial institutions and merchants, and arranges payment to the merchants according to each consumer's specific instructions. Similarly, U.S. Pat. No. 5,283,829 to Anderson discloses an electronic bill payment system and method that includes billing equipment for creating approval records and generating approval numbers for each pre-authorized subscriber. The system also includes an interactive payment approval apparatus into which subscribers dial for approving payment and which determines, based upon information collected, whether to initiate an electronic funds transfer. A series of security checks and comparisons are performed for guarding against accidental and malicious entry of approval numbers.

U.S. Pat. No. 4,908,850 to Masson et al. discloses an information network and method for providing a nationwide audio text network, including electronic billing, that is useful for a wide variety of applications. The system allows for interactive communication with a computer that supplies the network information to a 1-800 caller. The system is also capable of obtaining electronic credit card authorization or charges, and controls routing an incoming call for redirecting the call to a live operator or to other equipment, or to outgoing lines to any desired destination.

In another conventional system, credit cards are used for paying for service representative calls. In this system, each time the caller calls, the caller's credit card account is accessed and a predetermined charge, such as 100 dollars, is authorized and set aside from the caller's credit card available line of credit. The caller then speaks with a service representative. The actual cost of the call is determined at the end of the call, and then transferred to the credit card company in the normal course of business. The charge is then compared to the amount that has been set aside and the difference between the amount that has been set aside and the actual cost of the call is returned to the caller's available line of credit. Unfortunately for the caller, this process usually takes approximately 3 or 4 days. As a result, the portion of the caller's available line of credit that has been set aside is unavailable for other calls or purchases for the approximately 3 to 4 days that it takes the credit card company to reconcile the authorized amount and the actual amount of the call.

Additionally, there is a growing need for providing a billing arrangement for effecting a sale of an item or a service occurring over a computer network. For example, U.S. Pat. No. 5,724,424 to Gifford discloses a network sales system that allows a user to purchase goods or information over a computer network, such as the Internet. According to Gifford, the network sales system includes a plurality of buyer computers, a plurality of merchant computers and a payment computer that are interconnected by the computer network. A user at a buyer computer purchases a product and the buyer computer sends a purchase message to a merchant computer. The merchant computer constructs a payment order that it sends to the payment computer. The payment computer authorizes the purchase and sends an authorization message to the merchant computer. When the merchant computer receives the authorization message, product is sent to the buyer computer. Alternatively, the buyer computer can send a payment order directly to the payment computer, which, in turn, sends an authorization message back to the buyer computer that includes an unforgeable certificate indicating that the order is valid. The buyer computer then constructs a purchase message that is sent to the merchant computer. When the merchant computer receives the purchase request, the product is sent to the buyer computer based on the pre-authorized payment order.

U.S. Pat. No. 5,715,314 to Payne et al. discloses a similar network-based sales system that includes at least one buyer computer, at least one merchant computer and at least one payment computer that are interconnected by a computer network, such as the Internet. According to Payne et al., a merchant computer can respond to payment orders from a buyer computer without the merchant computer having to communicate directly with the payment computer for ensuring that the user is authorized to purchase the product and without the merchant computer having to store information in a database regarding which buyers are authorized to purchase which products. When the merchant computer receives an access message from the buyer computer identifying a product to be purchased, the merchant computer need only check the access message for ensuring that the access message was created by the payment computer, thereby establishing that the buyer is authorized to purchase the product.

Despite these conventional billing arrangements for voice-based telephony services over a circuit-switched telecommunications network and for products and services purchased over a computer network, such as the Internet, there is a need for an efficient payment authorization and billing arrangement for products, services and telephony-based services purchased over a computer network.

BRIEF SUMMARY OF THE INVENTION

The present invention provides an efficient payment authorization and a billing arrangement for a communication session between a user and a service representative that is accessible over a circuit-switched telecommunications network and a packet-switched telecommunications network, such as the Internet, and to session limiting, blocking, fraud control associated with such a communication session. The present invention also provides an efficient payment authorization and billing arrangement for products and services purchased over a computer network, such as the Internet, and to purchase limiting, blocking, fraud control associated with such a purchase.

The advantages of the present invention are provided by a method of billing a communication session between a service representative and a user in which a request is received from a user for a communication session between the user and a service representative. Information associated with a credit account is requested before the user is connected to a service representative, and the information associated with the credit account is received in real time. According to the invention, the information associated with the credit account can be credit card information, debit card information, checking account information, electronic funds transfer information, a telephone number, a cable television, account, a utility service account, or an Internet service provider account. Credit account information is communicated to a payment authorization database, which can be located locally or remotely. When the credit account information relates to, for example, a credit card, the credit account information includes the received information associated with the credit account and a predetermined amount that is to be set aside in the credit account. Alternatively, the credit account information includes the received information associated with the credit account and a predetermined amount that is to be charged to the credit account. Payment authorization information associated with the credit account is received from the payment authorization database before the user is connected to the service representative, and the user is connected to the service representative when the payment authorization information is affirmative. A total charge for the communication session is calculated when the communication session is terminated based on an actual time that the user is connected to the service representative. Preferably, the charge for the communication session is based on a per minute rate. Session charge information associated with the communication session is transmitted to the payment authorization database when the communication session is terminated. Accordingly, the session charge information includes information for charging the credit account an amount representing a charge for the communication session.

According to one aspect of the invention, when the credit account information relates to, for example, a credit card, the credit account information includes an authorization of a predetermined amount, and the session charge information includes information for reversing the authorization of the predetermined amount and for reauthorizing the credit account the amount representing the charge for the communication session. Alternatively, the session charge information is a credit representing an amount that is the predetermined amount minus the amount representing the charge for the communication session.

The present invention also provides a method for controlling communication session access to a service representation in which a request is received from a user for a communication session, such as a computer-network telephony call or a multi-media communication session, between the user and a service representative. Information associated with the user is also received, and a database is accessed. The received information associated with the user is compared with information stored in the database, and the user is connected to the service representative when the received information associated with the user passes the comparison with the information stored in the database. The communication session can be blocked or limited based on different criteria, such as a frequency of communication sessions from the user during a predetermined period of time, an amount of money spent by the user during a predetermined period of time, a length of communication sessions during a predetermined period of time, an identity of the user, a computer-network address of the user, credit account information of the user, personal information of the user, and/or a user billing address.

Another embodiment of the present invention provides a method of effecting a sale over a computer network in which it is determined whether a user passes fraud control before effecting a sale over a computer network. Information associated with a method of payment, such as credit card information, debit card information, checking account information, a telephone service account, a cable television account, a utility service account, or an Internet service provider account, is requested from the user after the user passes the fraud control. Information associated with the method of payment is received from the user in real time. Method-of-payment information is communicated to a payment authorization database, which can be located locally or remotely. The method-of-payment information includes the received information associated with the method of payment. Payment authorization information associated with the method of payment is received from the payment authorization database. A sale transaction is completed when the payment authorization information is affirmative. Sale charge information associated with the sale effected over the computer network is transmitted to the payment authorization database when the sale transaction is complete. The sale charge information includes information for charging the method of payment an amount representing a charge for the sale.

According to one aspect of this embodiment of the present invention, whether a user passes fraud control is based on computer-network address information associated with the user that is received from the computer network and computer-network address information that is received from the user. The computer-network address information received from the computer network is compared to the computer-network address information received from the user before the information associated with the method of payment is requested. According to another aspect of this embodiment of the present invention, whether a user passes fraud control is determined based on received information associated with the user. A database is accessed, and the received information associated with the user is compared with information stored in the database before information associated with the method of payment is requested from the user. The method also provides that information associated with the user is compared with information stored in the database before determining whether to block, limit or complete the sale transaction. The received information can include an identity of the user, a frequency of sales to the user during a predetermined period of time, an amount of money spent by the user during a predetermined period of time, a computer-network address for the user, credit account information associated with the user, a billing address, and/or personal information of the user.

DETAILED DESCRIPTION OF THE INVENTION

Figure 1:
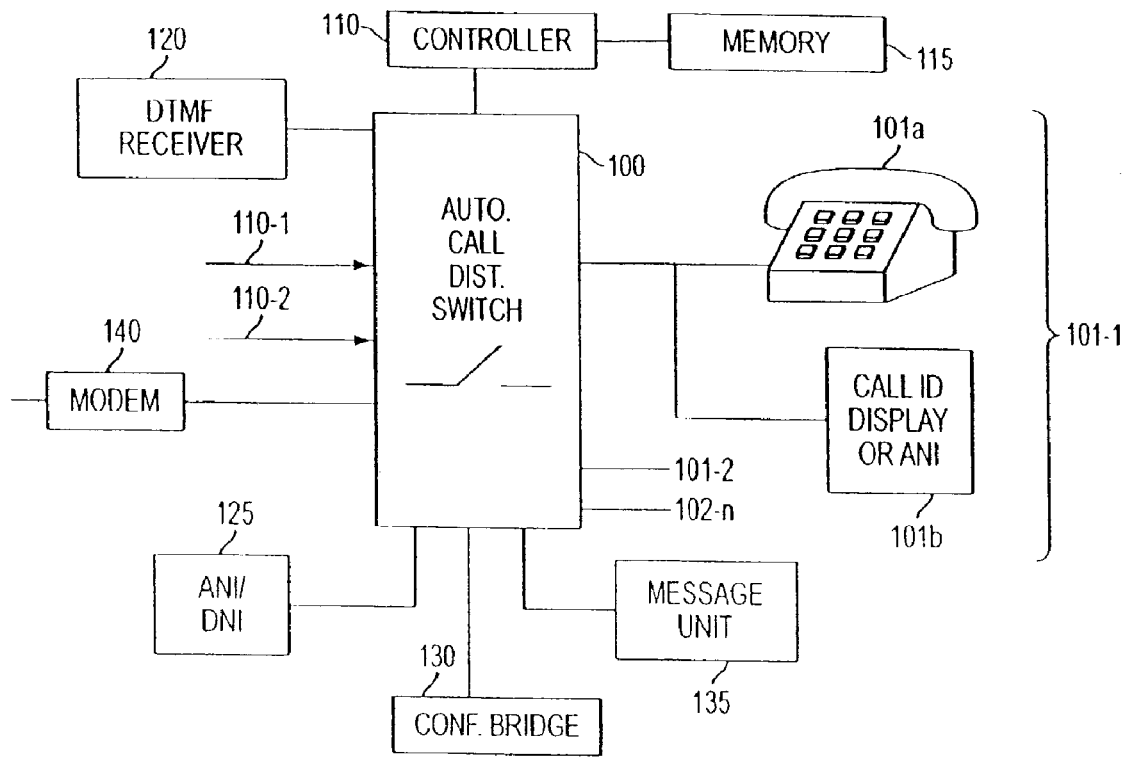
FIG. 1 shows a schematic block diagram for an automatic call distribution system that is programmed to operate according to the present invention.

FIG. 1 shows a schematic block diagram for an automatic call distribution (ACD) system that is programmed to operate according to the present invention. An exemplary ACD system that is suitable for the present invention is disclosed by U.S. Pat. No. 5,802,156 to Felger, which is incorporated by reference herein. An ACD system provides switched network access to a plurality of service representatives or agents. Such ACD systems may vary from manufacturer to manufacturer, but according to the present invention, such an ACD system operates under common-control of a controller 110. The ACD system of FIG. 1 includes a switch 100 that is connected to a plurality of service representatives, or agents, that operate from service representative positions 101-1 through 102-n. ACD 100 redirects calls (circuit-switched voice and data) to any of service representative positions 101-1 through 102-n.

A service representative position, such as position 101-1, can include a remote dial-up terminal 101a that has a caller identification display 101b. Alternatively, a service representative position can be a conventional service representative position, such as position 101-2, that includes such equipment (not shown) as an operator headset, a cathode ray tube display, a computer system and automatic number identification/name display. Accordingly, such a service representative position operates as an extension line for the ACD system. As yet another alternative, a service representative position may include an intelligent telephone terminal, a personal computer or other intelligent terminal known in the art (not shown).

Figure 2:
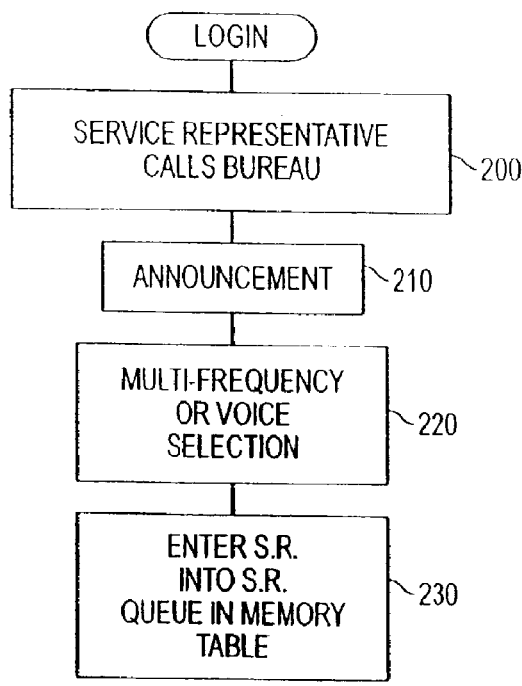
FIG. 2 shows a flowchart of the sequence of operations for logging a service representative into a service representative availability queue according to the present invention.

A service representative at a service representative position indicates availability for providing service to callers by performing a log-in procedure, such as that shown by the flowchart of FIG. 2, which will be further described herein. A caller requesting service is handled according to the flowchart of FIG. 3, which will also be further described herein.

A plurality of service circuits and devices are connected to switch 100 that provide various signaling, data input, data output, conferencing and other services. Such service circuits and devices include, but are not limited to, a dual tone multi-frequency (DTMF) receiver and decoder 120, an automatic number identification (ANI), a dialed number identification (DNI) circuitry 125, an audio response (message) unit 135, a conference bridge circuit 130 and a modulator/demodulator circuitry (MODEM) 140. One or more of each type of these service circuits and devices are typically provided, with the number depending on their respective frequency of use.

Each service circuit or device is called into play by controller 110 in accordance with call processing and control programs stored in a memory 115. One control program residing in memory 115 is a real time of day, day, month and year clock that is accurately maintained by, for example, periodic satellite update and must be preserved even in the event of a local power loss to the system. Another program is a translation program that may be needed for translating a called telephone number to an advertising source or for translating an extension number of a service representative to a remote telephone number for remote dialing, when required.

DTMF receiver and decoder 120 is especially important for receiving information, such as zip code, address, credit card number, bank account number, name input, command and signals for the system of the present invention for caller control and system control to the extent of at least providing service, call blocking, call limiting, fraud control and payment and billing features. Audio response (message) unit 135 preferably includes an audible announcement capability for querying a caller and a connection to DTMF receiver/decoder 120 for receiving and decoding input data entered via a telephone keypad in response to an announcement query. Alternatively, DTMF receiver/decoder 120 and other input circuits may be replaced by speech recognition and other automatic input devices. Modem 140 automatically forwards form-of-payment data to a credit agency or bank under control of controller 110, and receives authorization in real time for a payment or a charge to an account. Modem 140 may comprise a network data mover (NDM) modem or a remote job entry (RJE) modem. Once a call to a service representative is terminated, modem 140 communicates call charge information to a remotely-located billing agency (not shown).

Callers call on lines 110-1 and 110-2, which are representative of lines/trunks connecting ACD 100 to a telephone switching center. A number of different telephone numbers identified to the lines/trunks at a telephone central office (not shown) may be used for identifying the source of advertising or other source by which a caller learned of the existence of the call-in service. Typically, signaling information is provided in advance of a call on the same or a different line. The signaling information includes the address of the calling party and may also include the called address. A dialed number identification/automatic number identification (ANI/DNI) unit 125 identifies the dialed number for determining, for example, the source by which a caller learned of the service. ANI/DNI unit 125 also indicates the calling telephone number for subsequent comparison with a telephone number entered through a telephone keypad by the caller in response to a request generated by audio response (message) unit 135 once the call has begun or for comparison with negative databases, as will be further described herein.

Briefly and according to one embodiment of the present invention, a toll, an 800 or 900 telephone number or an Internet address may be used for connecting a new caller to a single service representative in an available service representative at, for example, a psychic network service. A second telephone number or Internet address may be used for identifying a psychic twins service, such that two service representatives are connected simultaneously to a caller through a dual representative service representative availability queue. A third number or Internet address is used for a three service representative call, and so on. In a preferred embodiment of the present invention, a caller is handled according to a call processing algorithm shown in FIG. 3, which is described subsequently herein.

Conference bridge 130 may include automatic dialing equipment for dialing a telephone number for a service representative. Alternatively, automatic dialing circuits (not shown) may be separately provided. Of course, in accordance with the present invention, a plurality of service representatives are simultaneously connected to a caller desiring such service and automatic dialing circuits may or may not be needed in a particular conference call, depending on whether the service representative is directly connected to ACD 100 as an extension or must be "dialed-up." Ringing circuits (not shown) transmit ringing signals toward a service representative, but according to the present invention, audible ringing is not provided the caller. The service representative is connected at the time the service representative goes off-hook.

The concepts of the present invention are fully applicable to all forms of telephony, whether circuit-switched based telephony or computer-network telephony, such as packet-switched telephony. For example, a typical router connected to a computer network, such as the Internet, can handle packetized telephony data in a manner similar to how the ACD system shown in FIG. 1 handles circuit-switched telephony. Just as an ACD system provides circuit-switched network access to a plurality of service representatives or agents, a router provides packet-switched network access to a plurality of computer network addresses. The router redirects Internet-type telephony and communication session data packets to service representative positions in a well-known manner. In that regard, an Internet address may be used for connecting a computer-network telephony caller to a single service representative in an available service representative at, for example, a psychic network service. A second Internet address may be used for identifying a psychic twins service, such that two service representatives are connected simultaneously to a caller through a dual representative service representative availability queue. A third Internet address is used for a three service representative call, and so on. For a computer-network based embodiment of the invention, a service representative position is preferably an intelligent telephone terminal, a personal computer or other intelligent terminal known in the art.

FIG. 2 shows a flowchart of the sequence of operations controlled by controller 110 when actuating and entering a service representative into a service representative availability queue according to the present invention. The overall procedure of FIG. 2 is performed whether the service representative is accessing the service bureau through a circuit-switched telecommunications network or by way of packet-switched telephony. At step 200, a service representative calls the service bureau and indicates the availability of a service representative for providing service. Of course, when the service representative is directly connected to switch 100, such as by a private dedicated line, the calling service representative may need only to merely pick up the phone or log on, respectively. Whether or not the calling service representative is connected via a dedicated line, the extension or telephone number is automatically recognized by controller 110, for example, through automatic number identification circuit 125. In a packetized telephony-based embodiment, the Internet address or log-on data of the service representative may be compared against a database for determining service representative identity.

An audio response unit 135 is connected to the service representative at step 210. Typically, the time of day and date is recorded in memory 115 via controller 110 recording the time and date that the service representative has offered to begin servicing callers. The service representative receives a programmed announcement at step 210 querying the service representative to identify certain choices and preferences for recording in memory 115. For example, a pair of psychic twins may prefer to offer services together to a caller. That is, a service representative A may request to only be connected in a psychic dual-conferencing call with a specific psychic twin service representative B. Other preferences may be predetermined or entered for the first time, such as the service representative's name, address, billing rate, Zodiac birth sign and/or other information, preferably automatically via a telephone keypad or via speech recognition. In another embodiment involving computer service assistance, a service representative may specify expertise in hardware matters and another service representative may specify expertise in software matters.

In an alternative embodiment or in a packetized telephony-based embodiment, the service representative is equipped with a cathode ray terminal, a printer or other display and a full keyboard permitting a written query and response and so the "announcement" of step 210 may be a written or a displayed announcement. In a preferred embodiment, however, an exemplary announcement or instructional display provided by either embodiment may include: "Press 1 if you wish to serve one call at a time by yourself. Press 2 if you wish to confer with a second conferee on each incoming call. Press 3 if you wish to confer with two other conferees on each incoming call requesting service . . . " and so on. When the service representative has a computer mouse, the mouse may be used to input selection criteria.

Flow continues to step 220 where a preference selection is made. Steps 210 and 220 are repeated until log-in is complete. Once the responses to the queries of step 210 are registered by DTMF or other data receiver 120 and reported to controller 110, ARU 135 may provide a validity check for the entered data and provide audible feedback for selections. Then, ARU 135 may further request, "Do you have a preference for the second conferee? If so, enter by pressing keys of the keypad the first several letters of the preferred conferee's last name." Of course, a psychic twin would enter their own last name and their twin could be immediately identified via a memory look-up in memory 115. Audible or visual confirmation/feedback that the choice has been accepted may be provided, in additional to error algorithms can be provided, as necessary for correcting an erroneous choice made by a service representative.

In the log-in process of FIG. 2, the various announcements and responses of steps 210 and 220 can be varied depending on the desired service to be performed. Moreover, the result may vary. In one scenario, there may be an availability queue of available service representatives willing to confer with a caller individually or with other conferees. In other words, the service representative may be willing to accept any request for services. In other embodiments, there may be availability queues formed in memory 115 for individual service representative calls, dual or twins calls, triplets or three service representative calls and so on. Or there may be a combination of such queues depending on the embodiment. Consequently, in its simplest embodiment the present invention involves the service representative logging in to a dual service representative availability queue so that upon receiving a call to a special dual service representative telephone number, the next two service representatives that are available in the dual service representative availability queue are automatically and connected practically simultaneously to the caller.

The result of the log-in process is shown as step 230, that is, the service representative is entered into memory 115 in one or more service representative availability queues as a memory table. Of course, when a service representative takes a call and is connected with a caller (and maybe one or more other service representative conferees), the appropriate availability table in memory 115 records a "busy" status for the service representative, as signaled by controller 110. Moreover, the service representative has recorded the preferred type of call that the service representative is willing to accept (for example, individually, with another service representative conferee, and the like) and certain other preferences, such as their own Zodiac sign, the day, month, year of birth, gender or other information that is useful for arranging a call. Some or all of this information may be preserved in memory 115 depending on the service offered. Over time, information such as the number, type, caller identities, caller preferences and the like of calls handled by each respective service representative may be recorded in memory 115 and associated with the service representative for assisting in providing better caller service, and for providing salary or other compensation to the service representatives.

Figure 3:
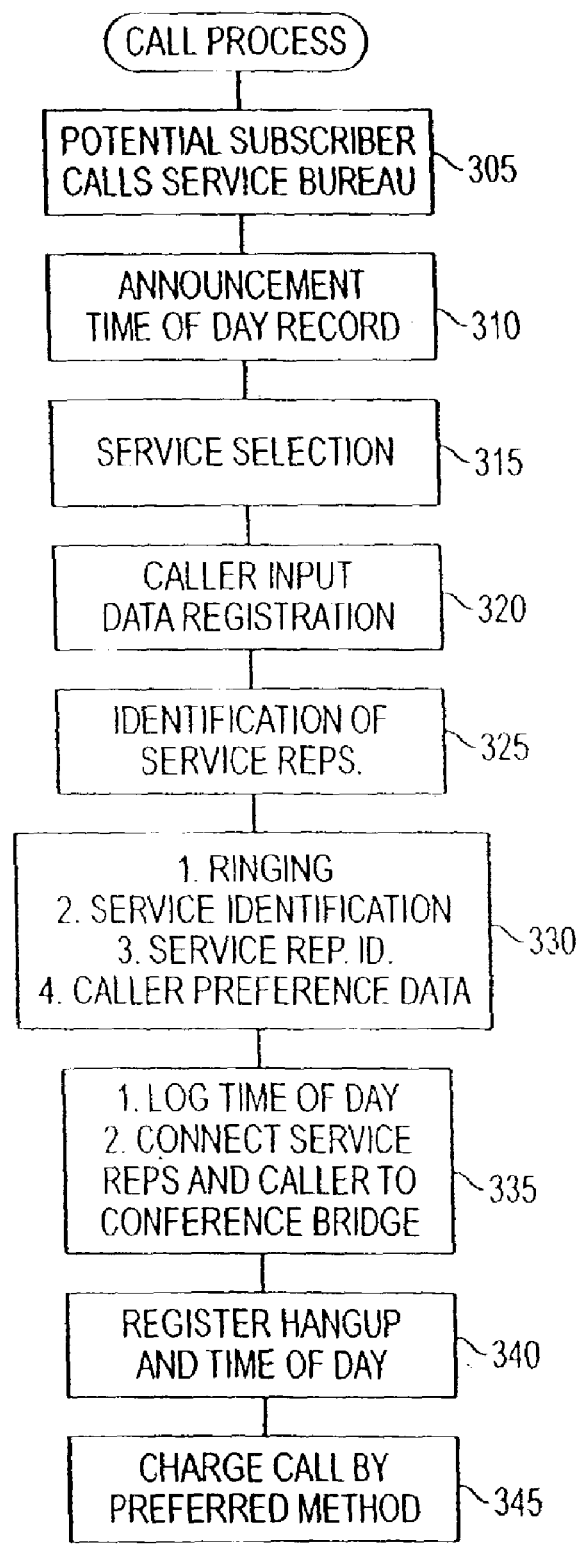
FIG. 3 shows a flowchart for processing a call received from a circuit-switched telecommunications network or by way of computer-network telephony over a packet-switched computer network, such as the Internet, for a service representative according to the present invention.

FIG. 3 shows a flowchart for processing a call received from a circuit-switched telecommunications network or from a packet-switched computer network, such as the Internet, for a service representative according to the present invention. A caller may define certain parameters for the ACD (Internet router) system of FIG. 1 to follow when connecting the caller to at least one service representative. At step 305, a caller to the psychic network service calls an 800 or a 900 telephone number for the service bureau on line 110-1 or series of trunks 110-1 and 110-2, or accesses the service bureau using an Internet address. A second line or Internet address or a series of trunks or Internet addresses may be separately provided for a twins service. In such an instance, the caller may be immediately passed to step 320 and the input data registered including, but not limited to, the calling telephone number, address and billing information of the caller, or Internet address of the caller.

According to the present invention, call limiting, call blocking and fraud control checking is performed automatically at this stage. For example, call limiting criteria may be established for protecting callers against excess usage and billing, such as two calls per day, 40 call minutes per day, 50 call minutes per week, 85 call minutes per month, and/or an amount of money spent by a caller during a predetermined period of time. A caller is queried in a database for determining how frequently and, for each respective call, how long the caller was connected for determining whether any individual or combination of the call limiting criteria have been exceeded. When any call limiting criteria has been exceeded, the caller may receive a message thanking the caller for their previous calls, and possibly blocking or limiting the duration of the present call.

Regarding call blocking based on input data and certain negative databases, the calling telephone number (or Internet address), the first several digits of the address or apartment number and/or the zip code of the caller that have been entered by way of a telephone keypad may be matched against the calling telephone number (obtained via ANI), the originating Internet address (obtained via packetized data) and/or credit card data so that a security breach is pre-identified. The comparison of the user-entered first several digits of a street address or apartment number and/or zip code against credit card data downloaded or prestored from a credit agency or a bank is referred to herein as an address verification system (AVS). The caller may be asked to explain any discrepancy and/or the call is blocked. The calling telephone numbers (obtained via ANI and by caller entry) or Internet addresses (obtained via packetized data and by caller entry) can be checked against each other and against telephone number/Internet address negative databases that identify pay phones, prisons, schools, selected commercial establishments, and other institutions or locations of telephones or Internet access devices from which calls may be blocked at switch (router) 100.

A voiceprint of the caller's voice may be recorded via message unit 135 and converted to digital form for comparison against a voiceprint database for insuring the validity of the identity of the caller. The caller's name may be spelled into the system via a telephone or intelligent terminal keypad, and compared against a card-holder or account name as a security check. When the caller is making a packet-switched call, a voiceprint, a fingerprint image and/or a portrait image can be used for insuring the validity of the identity of the caller. At least, via AVS, the address of the caller, entered by telephone keypad, can be matched against the address of the card holder or on an account that is pre-stored and downloaded from a credit agency or a bank. In an alternative embodiment, a non-service representative may assist, supplement or replace an automated system regarding call limiting, call blocking, fraud control, collecting form of payment information and obtaining payment authorization.

At step 325, the caller is identified to be served by at least one service representative and at step 330 immediately connected to an identified service representative listed in the availability queue of service. Once it has been determined that call blocking, call limiting and fraud control criteria have not been exceeded, a caller is immediately connected and served by at least one service representative listed in the service representative availability queue.

In a further preferred embodiment of the present invention, steps 310 and 315 performed repeatedly in a manner that is similar to the way the service representative logs in, as per FIG. 2, until the caller logs in. For example, at step 310, an announcement is played welcoming the caller to the service bureau, such as to a psychic network service. When the service representative queue is relatively full, the announcement can indicate that the caller's call is important and connection to a service representative be momentarily delayed. Based on controller calculated average call durations and other queuing theory calculations, controller 110 may even indicate an expected waiting time for the caller and, in the meanwhile, will begin to record certain service and service representative preference information.

While the caller is waiting for a service representative, the caller may be provided with their horoscope or other information of interest to the caller until a service representative is available to conduct a session with the caller. For example, a caller may enter the month, day and year of birth, their gender and service preference (such as one or more service representative conferees). This information may be used for providing a personalized horoscope or other information that may be of interest to the caller while the caller is waiting for a service representative.

As steps 310 and 315 are repeated, controller 100 variously calls into play ARU 135, ANI 125 and DTMF receiver/decoder 120, as necessary. Controller 100 may query a database for determining billing arrangements, among other things, such as whether the caller has used the service before, how the caller has paid in the past, what preferences and data was accumulated at that time, and bring such data that is useful for this call to active memory.

Once the call has been accepted and the caller has logged in, the caller's input data is registered into active memory 115 at step 320. The registered data may include, among other things, the caller's name, address, zip code, telephone number, credit card type and number, bank name and account number and billing data, service preference, and data that may be used for matching the caller with service representative data. For example, the caller's sign of the Zodiac, determined from an entered birth date, or separately entered, may be matched with similar psychic service representative information before the call is initiated.

Identification of service representatives at step 325 then may be as simple as selecting the next available service representative from an availability queue and associating the selected service representative with a caller. In a dual service representative call (twin service), the next two available service representatives are selected from the availability queue for a call, and so on. Service representative selection can be more complicated when, for example, a pair of psychic twins is required to be identified and selected. Other criteria for selecting a service representative can include gender, sign of the Zodiac and other preference data. In all such criteria selection and matching of preferences, step 325 is crucial for obtaining the best service for a particular caller. A trade-off is that there may not be as many available service representatives having desired criteria, so that a delay in arranging a call may be lengthened or impossible to accomplish at a particular time. Announcement 310 may be adaptively used for describing for the caller the real choices that the caller is able to make at a particular time under control of controller 110. The caller may be offered additional choices within the same network, or through prior arrangement with another psychic counseling network service, the caller may be transferred to an available psychic representative associated with another psychic network service for receiving service.

Once the service representative goes off-hook, the caller is billed for the call. Consequently, at step 335, all caller and service representative data is logged in along with time of day and date for calculating call duration in minutes and for billing, and service representative compensation data logging. More specifically, a caller is billed for the duration of time beginning when the first service representative goes off-hook or begins an Internet telephony session until the last service representative goes on-hook or terminates the Internet telephony session. Individual time logs are maintained for the caller (call duration) and each service representative (service duration). For example, when the first service representative hangs up, the system will update the database with the first service representative's connect time, time of day and the date. When the second or final service representative hangs up, the caller is billed for the total call time and the second service representative's connect time, time of day and date are logged accordingly.

Once the conferees (including the caller) have completed a call, step 340 is entered. On-hook conditions and the time-of-day are registered by controller 110 so that the duration of the call can be calculated. Each of the service representatives are returned to their respective availability queues until they choose to log off by following a log-off process that is complimentary to the log-in process of FIG. 2, or become unavailable by accepting a service call. Once a service representative logs in, controller 110 anticipates that the next call to the service bureau is a log-off call and will provide an appropriate sequence of announcements and obtain responses for logging off. The time of day may be recorded to determine how long the service representative has been on the job.

When the counseling service is provided for a fee, it is anticipated according to the principles of the present invention that callers may be offered a variety of ways to pay for the services offered. Some methods of payment, such as debit cards, bank checks or drafts, smartcards, electronic wallets (e-wallets), and major credit cards, are more creditworthy than other methods of payment. Other forms of payment contemplated by the present invention include billing to a telephone number, a cable television account number, a utility service account, or an Internet service provider (ISP) account number. A caller enters a preferred form of payment in response to a request via ARU unit 135. A caller may receive preauthorization using these credit arrangements in real time, even prior to the counseling service and, consequently, may realize a discount according to the present invention, which can induce the caller to use a method of payment that is preferred by the service vendor. Payment method and billing arrangements are typically agreed upon after the call limiting, call blocking and fraud control features previously described, and may be agreed upon in advance of the call or prior to conclusion of the call. Preferably, such arrangements are agreed upon automatically by using message unit 135 and data input 120, as described above, when modem 140 is used for obtaining the payment authorization from a bank or credit agency.

Figure 4:
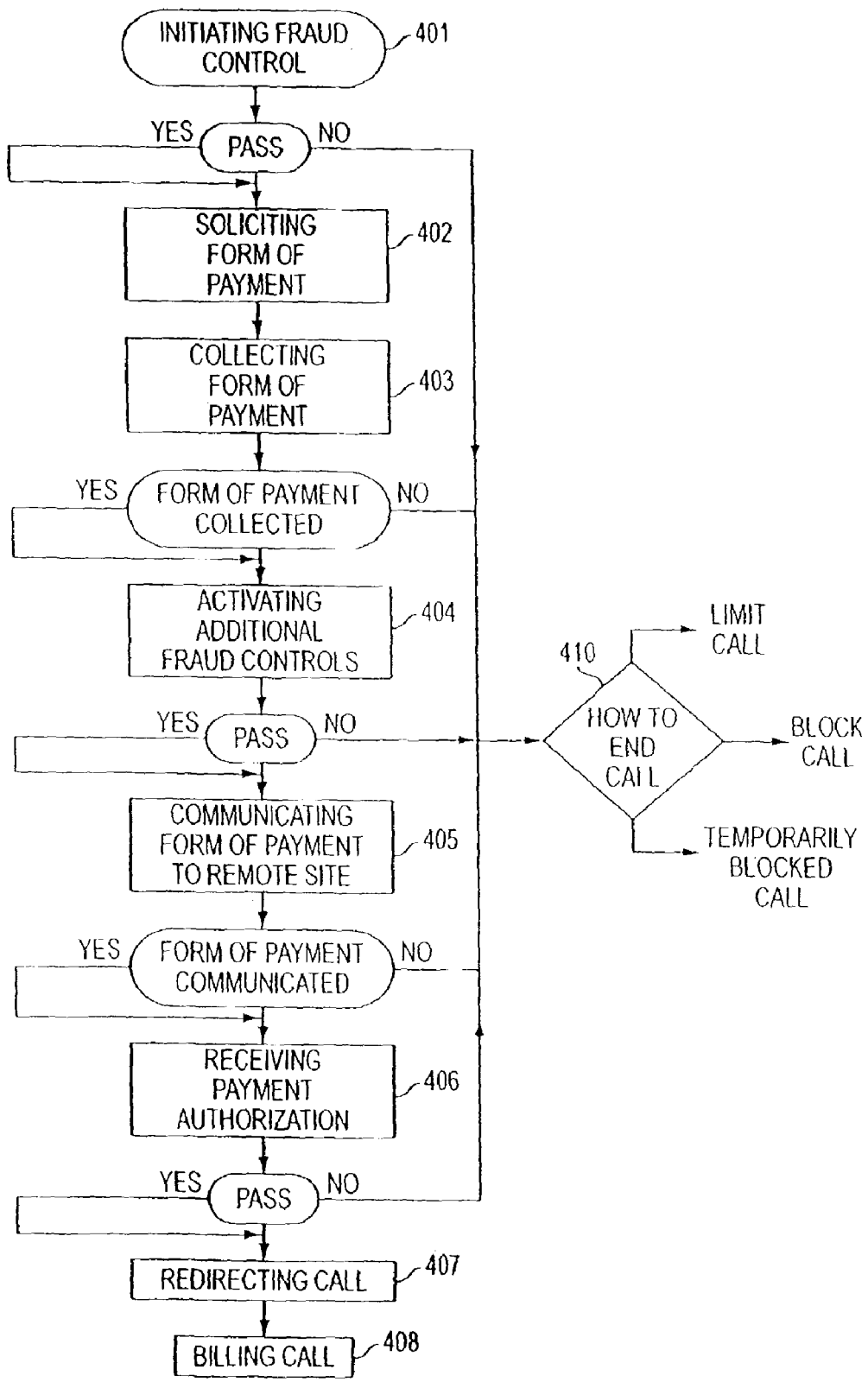
FIG. 4 shows a flow diagram for a real-time billing system for circuit-switched and packet-switched calls in accordance with the principles of the present invention.

FIG. 4 shows a flow diagram for a real-time billing system for circuit-switched and packet-switched calls in accordance with the principles of the present invention. At block 401, the initial fraud control are activated, which can include verifying whether the caller is calling from a location that matches the originating telephone number of the call, limiting the number and duration of calls made during a certain time period and/or limiting the amount of money a caller spends on service representative calls in a predetermined time period.

When a call is received from a circuit-switched telecommunications network, the system prompts the caller at block 401 to enter the caller's telephone number to verify that the caller is calling from a location that matches the telephone number from a displayed ANI. When the entered telephone number does not match the number forwarded by the ANI, the caller may be disconnected or the caller may be given another chance to reenter the correct telephone number. When the call is received from a packet-switched network, the initial fraud control of block 401 verifies that the caller is calling from an Internet address that matches the Internet address contained in the packetized telephony data received with the call. The caller is similarly prompted to enter the caller's Internet address or a unique identification associated with the caller and/or terminal equipment. When the entered Internet address (unique identification) and the Internet address (unique identification) forwarded in the packetized telephony data do not match, the caller may be disconnected or the caller may be given another chance to reenter the correct Internet address or unique identification.

When the originating telephone number or Internet address (unique identification) entered by the caller is verified to match the ANI or Internet address (unique identification) forwarded with the call, the initial fraud control of block 401 verifies that the caller's telephone number or Internet address (unique identification) is not stored in a negative database of known bad telephone numbers and/or Internet addresses (unique identifications). The negative database can be located locally in memory 115 or located remotely and accessed via a modem or over the Internet. Telephone numbers and/or Internet addresses (unique identifications) stored in the negative database result from insufficient payment of a telephone bill or a credit card charge, or a caller's refusal of payment relating to a disputed charge from a previous service representative call. The present invention, however, is not limited by the above-mentioned negative database satisfying the criteria mentioned above (storing telephone numbers and/or Internet addresses (unique identifications) having disputed charges or insufficient payments with respect to a service representative call). The negative database used at this stage of the initial fraud control of the present invention may be a shared database that stores telephone numbers and/or Internet addresses (unique identifications) of callers who have credit problems with other types of telephone and/or Internet-based ordering/payment systems.

The present system also checks to ensure that calls are not made from locations in which the telephone number and/or an originating Internet address (unique identification) cannot be forwarded to, for example, a Caller ID or other device that displays and/or records the telephone number or Internet address (unique identification) of the incoming call. In particular, certain parts of the United States cannot read ANIs and calls originating from telephone numbers located in these areas are detected by the initial fraud control of block 401. The present invention is also capable of detecting calls from particular institutions and communication devices, such as cellular telephones, numbers associated with a PBX system, governmental facilities, pay telephones, prisons, hospitals, schools, selected commercial establishments, etc.

The above-described initial fraud controls are illustrative examples. Other fraud controls will be apparent to those skilled in the art, thus the invention is not limited to the fraud controls described above. In general, the system can be designed to prevent any unwanted telephone numbers from entering the system.

When the originating telephone number or Internet address (unique identification) entered by the caller is verified to match the ANI or Internet address (unique identification) forwarded with the call and the originating telephone number or Internet address (unique identification) is not contained in the negative database, the initial fraud control of block 401 checks that the caller has not exceed a permissible number or duration of calls the caller has made during a predetermined period of time, or an amount of money the caller has spent during a predetermined period of time by querying a database. For example, a caller may be limited to only two calls per day or two calls per week, and the to duration of calls may be limited so that a caller is allowed to speak with service representatives for a maximum of, for example, 100 minutes per month. The amount of money that a caller can spend can be limited to, for example, an expenditure of $100 per month. The database containing this type of information can be part of or separate from the negative database, and can be a shared database.

Calls that fail the initial fraud control of block 401 are forwarded to block 410 where the call is processed to determine what the next course of action will be. According to the invention, calls can be blocked, temporarily blocked or limited. Blocked calls are permanently prohibited from connection with a service representative. A message may be played for a blocked call that advises the caller to stop calling because the calling number or Internet address has been blocked. Examples of potentially blocked calls include calls from telephone numbers located in a negative database or calls from localities where an ANI cannot be forwarded. Similarly, Internet telephony calls originating from Internet addresses (unique identification) that are not properly forwarded with packetized telephony data can be blocked calls.

A limited call prohibits a caller who has exceeded an allotted number of calls, an allotted duration (in minutes, hour or days) of calls or an allotted expenditure amount during a certain period of time from being connected to a service representative. The limitations placed on a given caller may be removed once the caller has satisfied criteria for removing the limitation. A temporarily blocked calls can include a call in which a telephone number requested by a service representative does not match an ANI number displayed or received packetized telephony data. The caller may be able to reenter the correct telephone number or Internet address (unique identification), or may be allowed to call again for correctly entering the caller's telephone number or Internet address (unique identification). Therefore, the caller is temporarily blocked from being connected to a service representative. When any of the call limiting, call blocking, or temporarily call blocking features is activated, the call is disconnected.

When the call successfully passes the initial fraud control of block 401, the call then advances to block 402 where the form of payment that will be used to pay for the call to a service representative is solicited. The caller is prompted by, for example, a computer-activated voice or by an operator (a non-service representative), to indicate the form of payment information the caller wishes to use. The form of payment can be cash, debit cards, check or electronic draft, electronic funds transfer, credit, major credit card, electronic wallet and the like. For this particular embodiment of the invention, the preferred form of payment involves credit cards, debit cards and the like.

Alternatively, in situations when the caller has previously called into the service, the form of payment information can be automatically accessed from a form-of-payment/credit database in a well-known manner based on the ANI and/or other information that has been provided by the caller. Preferably, the form-of-payment/credit database is stored locally, but can also be remotely located. The previously-used form of payment information stored in the form-of-payment/credit database is presented to the caller in a well-known manner as a possible selection by the caller for payment of the current call.

The operator or computer-activated voice may offer the caller a discount when the form of payment selected by the caller is convenient for the billing system. A further discount may be given when the caller is a frequent caller who has not exceeded the caller's allowance for prescribed calls or expenditure amount. Of course, any other form of preferential treatment may also be initiated. In the exemplary embodiment described in FIG. 4, the caller provides the form of payment information to the operator or inputs this information via a telephone keypad or keyboard. The caller can be requested to enter or supply information such as credit card or debit card numbers, the card expiration date, address including zip code, billing address, date of birth, driver's license number, etc. When the form of payment is not successfully communicated to the operator or successfully entered by the caller via the telephone keypad or keyboard, the call is disconnected. Alternatively, the caller may be temporarily blocked and/or given another chance for entering the correct information. The caller may also be completely blocked from calling the system again.

When the information is successfully communicated or entered, flow continues to block 404 where additional fraud control is implemented. Such additional fraud control may, for example, include comparing information given by the caller against information stored in a database of information related to each respective caller, and/or verifying that the caller's credit card or debit card number has not been in a negative database for delinquent payment. The information stored in this database can be part of or separate from the negative database of call originating telephone numbers and/or Internet addresses (unique identifications), and can be a shared database.

The information entered or communicated by the caller is also used for determining whether the caller has not exceed a permissible number or duration of calls the caller has made during a predetermined period of time, or an amount of money the caller has spent during a predetermined period of time by querying a database. The queried database may be the same database used in step 401 for determining whether the caller has exceeded any of the same criteria.

When a call fails the additional fraud control of block 404, the call is forwarded to block 410 where the call can be selectively blocked, temporarily blocked, or limited. A blocked call includes a call in which a credit card or debit card has expired or is invalid. A limited call includes a call in which a credit card or a debit card exceeds the monthly/weekly allocations of calls or exceeds the time allowance for a certain period of time. A temporarily blocked call includes a call in which the zip code or other information supplied by the caller does not match the appropriate information stored in a database. Moreover, the system can be designed so that calls classified as blocked calls can also be classified as temporarily blocked calls when the system allows a caller to supply information, such as the correct expiration date of a charge card. When the caller is allowed to make payment to a lending institution in order to validate the credit or debit card, a call can be classified as temporarily blocked.

According to one embodiment of the present invention, when the call passes the additional fraud control, the credit card account information or the debit card account information is forwarded at block 405 to a remote site for authorization. Remote sites used for authorization may, for example, include a credit bureau, a banking institution, a third-party biller, or the like. The remote site checks to ensure that the credit card or debit card is valid. When the card is valid, a predetermined amount of money is charged against the credit or debit card account at block 406. According to another embodiment of the present invention, when the call passes the additional fraud control, the credit card account information or the debit card account information is forwarded to a local database to ensure that the credit card or debit card is valid. When the card is valid, a predetermined amount of money is charged against the credit or debit card account at block 406.

The predetermined amount of money charged against the credit account can be performed in several ways. For example, a portion of the caller's available line of credit for the account equal to the predetermined amount can be authorized or set aside for the purpose of making the call. Alternatively, the account may be debited by the predetermined amount. In any event, the predetermined amount of money charged to the account is preferably greater than the probable charge for the telephone call for insuring that the charges incurred during the call will be paid. When the predetermined charge to the account is approved or denied, the remote site sends an approval or denial notification back to the system at block 406. When the remote site authorizes the call, the call is forwarded to a service representative, such as a psychic counselor. When the call is not authorized, the call is either blocked or temporarily blocked until information regarding the credit bureau or the banking institution is settled by the caller.

At block 407, the call is redirected to a service representative and, at this point, the billing processes begin, as shown in block 408. The call is billed from the time the call is redirected to one or more service representatives and to the time when the last service representative hangs up. The caller is billed in real time for only the actual minutes that the caller is connected to a service representative.

When the call is terminated, the system calculates the total billable amount for the call. The system then sends the billable amount to the remote site at block 410. The system can also send the credit card or debit card account information or some other identifying information along with the billable amount to the remote site. The remote site then reverses the previous charge of the predetermined amount to the account and a new charge for the actual billable amount of the call is charged to the account at block 408.

This reverse authorization routine can be performed in several ways and the invention is not limited to the following examples. First, the initial authorization to set aside the predetermined amount of available credit is reversed, thereby returning the amount that was set aside to the available credit line. A second authorization is then performed wherein a portion of the available credit line that is equal to the actual cost of the call is set aside. In another embodiment of the invention, the account may receive a credit in the amount of the predetermined amount to negate the initial charge of the predetermined amount. A new charge in the amount of the actual cost of the call is then made to the credit card account. Alternatively, the account may just receive a credit in the amount of the difference of the predetermined amount initially set aside minus the actual billable amount of the call. Furthermore, when the caller is not connected to a service representative and the billing has not begun before the call is terminated, the caller is not charged for the call and the initial charge is completely reversed. When the credit account information relates to a checking account or an electronic funds transfer, the reverse authorization feature of the present invention is, of course, not used.

The present invention is adaptable for providing video conferencing services to callers equipped with video cameras. Moreover, the service representatives may not necessarily need to depend on central controller 110 for database maintenance services regarding caller and service representative data. Such data may be maintained and updated within personal computers at the service representative's premises. Other modifications and enhancements to the present invention may be adaptively made for providing other services than that described, such as medical counseling, suicide hot-line and other services.

The present invention also provides for a call-out feature in which selected callers are called by the system in a well-known manner. Once the call has been connected to the caller, message unit 135 plays an announcement for the call recipient offering services and/or goods that can be accepted. If the offer of services and/or goods is accepted by the call recipient, message unit 135 provides audio prompts querying the call recipient for a form of payment. Accordingly, a previously-used form of payment can be accessed from a form-of-payment/credit database for providing a possible selection by the call recipient. The fraud control features of the present invention can optionally be used in conjunction with the querying for the form of payment Accessing the form-of-payment database When the form of payment is selected, the fraud controls relating to the form of payment provided by the present invention are then initiated before the services and/or goods are delivered.

Figure 5:
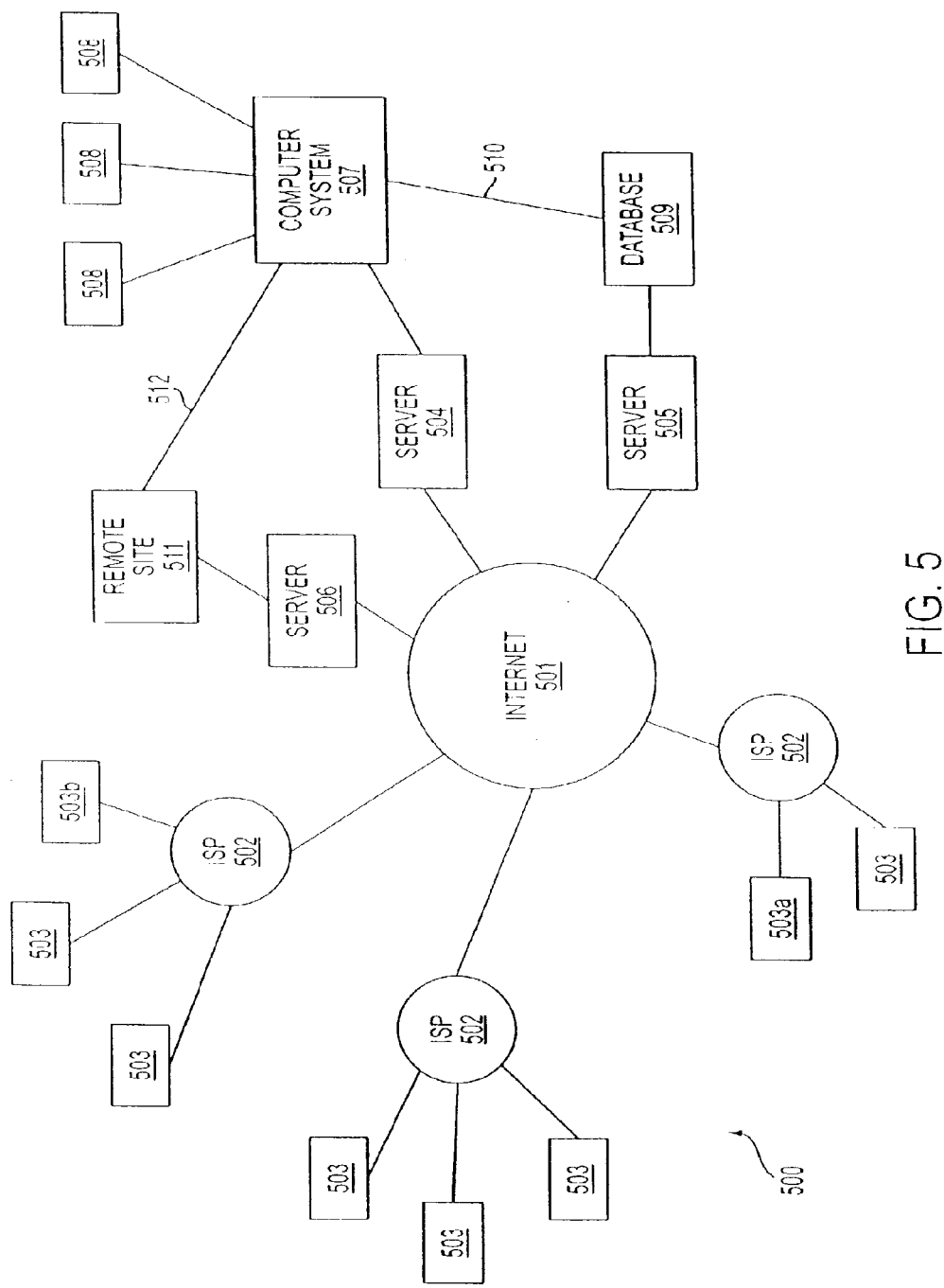
FIG. 5 shows a schematic block diagram of a system for billing a communication session conducted over a computer network, such as the Internet, according to the present invention.

FIG. 5 shows a schematic block diagram of a system 500 for billing a communication session conducted over a packetized digital data computer network 501, such as the Internet, according to the present invention. In FIG. 5, a plurality of Internet Service Providers (ISPs) 502 are connected to the Internet 501 for providing access to the Internet 501 and to resources connected to the Internet 501. Each of a plurality of user terminals 503 are connected to the Internet 501 through an ISP 502. Typically, a user terminal 503 uses an automatic dialing modem to create a circuit-switched data link to an ISP 502. Alternatively, a user terminal 503 can access an ISP 502 through a cable link or a high-speed digital link. The ISP, in turn, creates a packet-switched data link to a desired address over the Internet 502 in a well-known manner. A plurality of servers, which may comprise routers, are also connected to the Internet 501 for providing access to web pages and other data in a well-known manner. Only three such servers 504, 505 and 506 are shown in FIG. 5 for clarity.

Server 504 is connected to a computer system 507 that is used for providing a service representative-based service, for example, a psychic counseling network service. Other computer systems (not shown) can also be connected to server 504. Preferably, though, computer system 507 is the only computer system connected to the Internet 501 through a server 504 so that users requesting service receive an optimum level of performance. A plurality of service representative terminals 508 can be connected locally to computer system 507 so that service representatives can interface with users for counseling communication sessions from a centrally-located place. Additionally or in the alternative, a service representative can be located remotely from computer system 507 through a link over the Internet 501. For example, user terminals 503*a* and 503*b* can be operated by service representatives that are associated with the representative-based service provided through computer system 507 in a manner that appears to be transparent to users requesting service.

Figure 6:
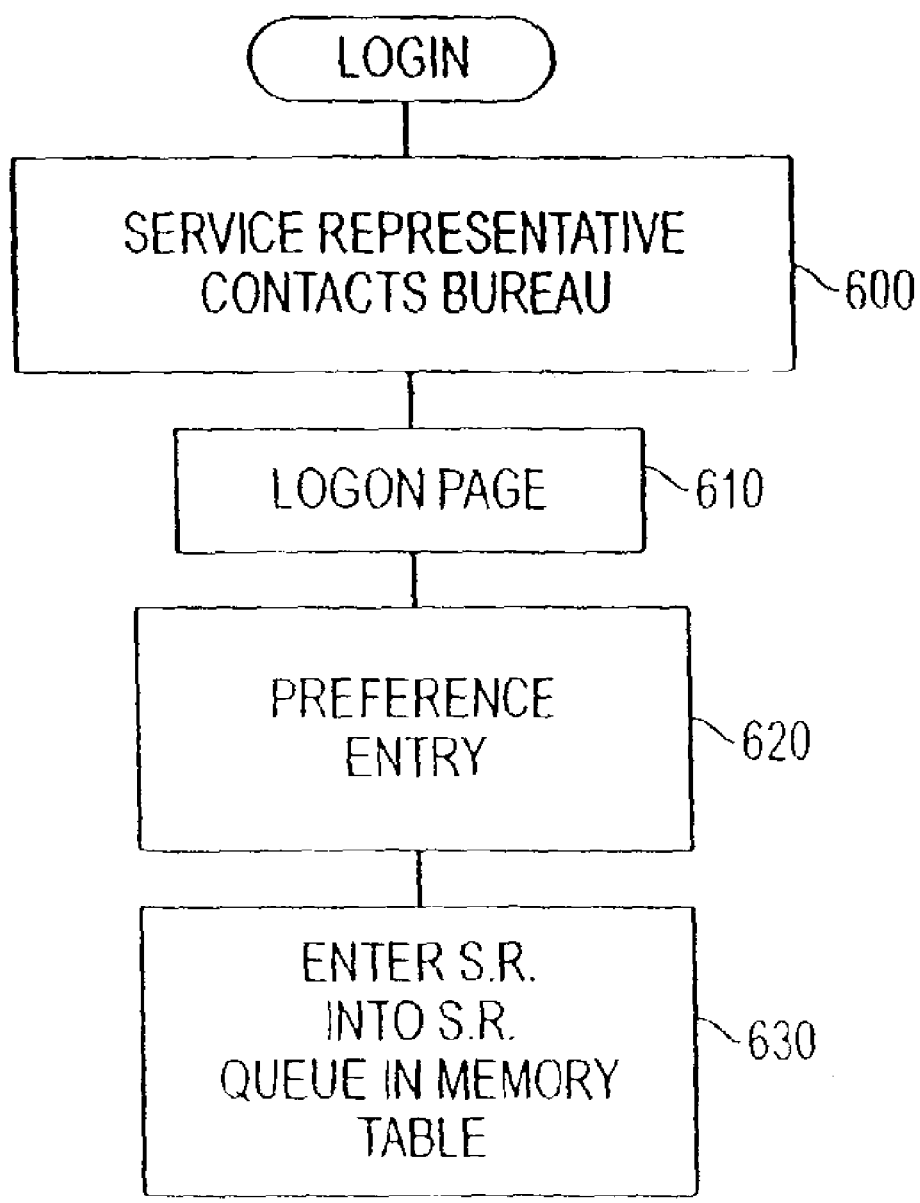
FIG. 6 shows a flowchart for a communication for actuating and entering a service representative into a service representative availability queue a computer network according to the present invention.

FIG. 6 shows a flowchart for actuating and entering a service representative into a service representative availability queue using a communication session over a computer network according to the present invention. Such a communication session can be a data-only session or a multimedia session that includes any combination of audio, video and data. At step 600, a service representative contacts the service bureau at computer system 507 over the Internet 501 for indicating an availability for providing service. At step 610, the service representative receives a log-on page requesting, for example, the service representative to identify certain choices and preferences for recording in memory of system 507 that are similar to the choices presented in connection with the logging in sequence of FIG. 2. Preferences may be predetermined or entered for the first time, such as the name and address of the service representative, billing rate, Zodiac birth sign and/or other information. Typically, at this time, a time of day and date is recorded in the memory of system 507 logging the time and date the service representative has offered to begin servicing users. When the service representative is directly connected to computer system 507, the service representative need only to initiate a log-on procedure, as opposed to logging into an ISP and initiating a communication session with system 507.

Flow continues to step 620 where the service representative enters a preference selection and sends the preference selection information to system 507. Steps 610 and 620 are repeated until log-in is complete. Once the responses to the queries of step 610 are registered, system 507 may provide a validity check for the entered data, and provide an audible and/or visual feedback for selections. System 507 may then send additional log-in query pages, such as whether the service representative desires to work with one or more conferees. Feedback confirmation that the choices have been accepted by system 507 may be provided in addition to error algorithms provided for correcting erroneous choices made by a service representative, as necessary.

In the log-in process of FIG. 6, the various query pages and responses of steps 610 and 620 can be varied depending on the desired service that is to be performed. Moreover, the result may vary. In one scenario, there may be an availability queue of available service representatives willing to confer with a user individually, with other conferees or in a chatroom-type of setting. In other words, the service representative may be willing to accept any request for services. In other embodiments, there may be availability queues formed in the memory of system 507 for individual service representative communication session, dual or twins communication sessions, triplets or three service representative communication sessions, and so on. There may be a combination of such queues depending on the embodiment. Consequently, in its simplest embodiment, the present invention involves the service representative logging in to a dual service representative availability queue such that on receiving a request for a communication session at a special dual service representative website or web page, the next two service representatives that are presently available in the dual service representative availability queue are automatically connected to the user.

The result of the log-in process is shown as step 630, that is, the service representative is entered into the memory of system 507 in one or more service representative availability queues as a memory table. Of course, when a service representative accepts a communication session and is connected with a user, and perhaps one or more other service representative conferees, the appropriate availability table in the memory of system 507 records a "busy" status for the service representative. Moreover, the service representative has signaled and recorded their preferences for the type of communication session that the service representative is willing to accept (for example, individually, with one or more service representative conferees or in a chatroom-type environment) and certain other preferences, for example, their own Zodiac sign, the day, month, year of birth, gender or other information that is useful for arranging a communication session. Some or all of this information depending on the service offered may be preserved in the memory of system 507. Over time, information such as the number, type, user identities, user preferences and the like of communication sessions accepted by each respective service representative may be recorded and associated with the service representative for assisting in providing better user service, and for providing salary or other compensation to the service representatives.

Figure 7:
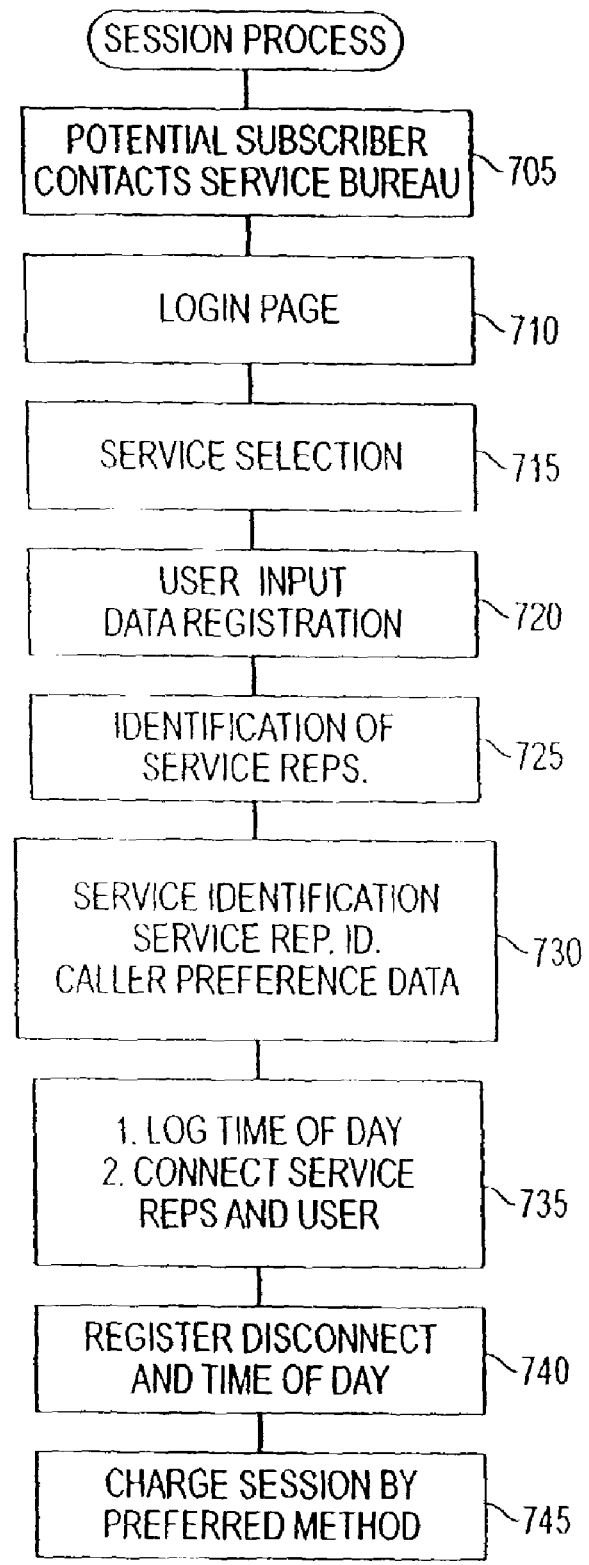
FIG. 7 shows a flowchart for processing a service representative communication session to a service bureau over a computer network according to the present invention.

FIG. 7 shows a flowchart for processing a service representative communication session, whether a data-only session or a multimedia session, according to the present invention. Such a communication session can be a data-only session or a multimedia session that includes any combination of audio, video and data. At step 705, a potential user of the service bureau provided at computer system 507 accesses a log-in page at the service bureau web address. A second web address or series of web pages may be separately provided for accessing a twins service. In such an instance, the user may be immediately passed to step 720 and the input data registered including, but not limited to, the Internet address of the user, the physical address and billing information of the user.

According to the present invention, communication session limiting, session blocking and fraud control checking is performed automatically at step 710. For example, arbitrary communication session limiting criteria may be established, such as two sessions per day, 40 session minutes per day, 50 session minutes per week, 85 session minutes per month and/or an amount of money spent by a user during a predetermined period of time for communication session services for protecting user against excess usage and billing. A user is queried in a database for determining how frequently and, for each session, how long the user has been connected for determining whether any individual or combination of session limiting criteria have been exceeded. When any session limiting criteria has been exceeded, the user may receive a message thanking the user for past sessions, but possibly blocking or limiting the duration of the present session.

Regarding session blocking based on input data and certain negative databases, the Internet address initiating the session, the first several digits of the address or apartment number and/or the zip code of the user that have been entered by the user may be matched against the Internet address (obtained via packetized data when the session is initiated) and/or credit card data so that a security breach is pre-identified. The comparison of the user-entered first several digits of a street address or apartment number, and/or zip code against credit card data downloaded or prestored from a credit agency or a bank is an address verification system (AVS). The user may be queried to explain any discrepancy and/or the session is blocked. The Internet address (or other unique address) from where the session is initiated (obtained via packetized data) can be checked against the Internet address (or unique address) entered by the user and against Internet address and telephone negative databases identifying pay phones, prisons, schools, selected commercial establishments, and other institutions or locations of terminals and/or telephones from where communication sessions may be blocked.

If the session is a multimedia session involving voice communications, a voiceprint of the user's voice may be recorded by system 507 for comparison against a voiceprint database for insuring the validity of the identity of the user. The user's name may be input and compared against a card-holder or account name as a security check. Additionally, a fingerprint image and/or a portrait image can be used for insuring the validity of the identity of the caller. At least, via AVS, the address of the user, entered through a keyboard, can be matched against the address of the cardholder or on an account that is pre-stored and downloaded from a credit agency or a bank 511. In an alternative embodiment, a non-service representative may assist, supplement or replace an automated system in regard to session limiting, session blocking, fraud control, collecting form of payment information and obtaining payment authorization.

At step 725, the user is identified to be served by at least one service representative and at step 730 immediately connected to an identified service representative listed in the availability queue of service for the type of service requested by the user, such as an individual service representative consultation, a consultation with a plurality of service representatives, a chatroom environment, etc. Once session blocking, session limiting and fraud control criteria have not been exceeded, a user is immediately connected and served by at least one service representative listed in the service representative availability queue.

In a further embodiment of the present invention, steps 710 and 715 are repeatedly performed until the user logs in a manner that is similar to the way the service representative logs in using a communication session, as per FIG. 6. For example, at step 710, a welcome announcement to the psychic network service is sent to the user. When the service representative queue is relatively full, the announcement may indicate that the user session is important and connection to a service representative be momentarily delayed. Based on a calculated average session durations and other queuing theory calculations, system 507 may send a message indicating an expected waiting time for the user and, in the meanwhile, will begin to record certain other service and service representative preference information. For example, as with the telephony-based embodiment of the present invention of FIGS. 1-4, a user may enter the month, day and year of birth, their gender and service preference (such as one or more service representative conferees, or a chatroom environment).

As steps 710 and 715 are repeated, system 507 may query a database for determining billing arrangements, among other things, such as whether the user has used the service before, how the user has paid in the past, what preferences and data was accumulated at that time, and bring such data that is useful for the session to active memory.

Once the communication session has been accepted and the user has logged in, of course, the user's input data is registered into the memory of system 507 at step 720. The registered data may include, among other things, the user's name, address, zip code, telephone number, credit card type and number, bank name and account number and billing data, service preference, and data that may be used for matching the user with service representative data. For example, the user's sign of the Zodiac, determined from an entered birth date or entered separately may be matched with similar psychic service representative information before the session is initiated.

When the service representative queue is relatively full and/or when a user must wait to connect to a particular service representative, system 507 can send pages of information to the user that have been customized for the user or may be of interest to the user. For example, while a user is waiting, horoscope information or an astrological chart (personalized for the user based on data input by the user) can be sent to the user for the user's information and entertainment. Another example is to send marketing information, such as a information regarding products and/or services available from the service bureau, to the user so that the user is entertained while waiting for a service representative.

Identification of service representatives step 725 then may be as simple as selecting the next available service representative in an availability queue and associating the selected service representative with a user. In a dual service representative session (twin service), the next two available service representatives are selected from the availability queue for a session, and so on. Service representative selection can be more complicated when a pair of psychic twins is required to be identified and selected. Other criteria can include gender, sign of the Zodiac and other preference data. In all such criteria selection and matching of preferences, step 725 is crucial for obtaining the best service for a particular user. A trade-off is that there may not be as many available service representatives having desired criteria, so that a delay in arranging a session may be lengthened or impossible to accomplish at a given time. The announcement message of step 710 may be adaptively used for describing for the user the real choices the user is able to make at a particular time. The user may be offered additional choices within the same network, or through prior arrangement with another psychic counseling network service, the user may be transferred to an available psychic representative associated with another psychic network service for receiving service. Further, system 507 can, as previously mentioned, send pages of information to the user that have been personalized for the user or may be of interest to the user, such as horoscope, astrological and/or information regarding other products and services that are available. When the selected service representative(s) is (are) available, system 507 connects the user to the service representative(s).

Once all of the selected service representatives are connected to the session, the user is billed for the session. Consequently, at step 735, all user and service representative data is transmitted to system 507 and logged in along with time of day and date for calculating session duration in minutes and for billing, and service representative compensation data logging. Specifically, a user is billed for the duration of time beginning when the first service representative goes is connected to the session until the last service representative terminates the session. Individual time logs are maintained for the user (session duration) and each service representative (service duration). For example, when each service representative disconnects or terminates from the session, the respective service representative's terminals transmit the service representative's connect time, disconnect time, time of day and date to system 507. In the situation when a user connects to a chatroom environment, the user is billed for the duration of time when the user first connects to the chatroom until the time the user disconnects from the chatroom.

Once the conferees (including the users) have completed a session, step 740 is entered and a total time for the communication session is determined for billing the user accordingly. Each of the service representatives are returned to their respective availability queues until they choose to log off by following a log-off process that is complimentary to the log-in process of FIG. 6, or become unavailable by accepting a service session. Once a service representative logs in, system 507 anticipates that the next communication session to the service bureau from the service representative is a log-off session and will provide an appropriate sequence of announcements and obtain responses for logging off. The time of day may be recorded for determining how long the service representative has been on the job.

When the counseling service is provided for a fee, it is anticipated according to the present invention that users will be offered a variety of ways to pay for the services offered.

Some methods of payment, such as debit cards, bank checks or drafts, smartcards, electronic wallets, and major credit cards are more creditworthy than other methods of payment. Other forms of payment contemplated by the present invention include billing to a telephone number, a cable television account number, a utility service account, or an Internet service provider (ISP) account number. A user enters a preferred form of payment in response to a query from system 507. A user may receive preauthorization using these credit arrangements in real time, even prior to the counseling service and, consequently, may realize a discount according to the present invention that can induce the user to use a method of payment that is preferred by the service vendor. Payment method and billing arrangements are typically agreed upon after the session limiting, session blocking and fraud control features previously described, and may be agreed upon in advance of the session or prior to conclusion of the session.

Figure 8:
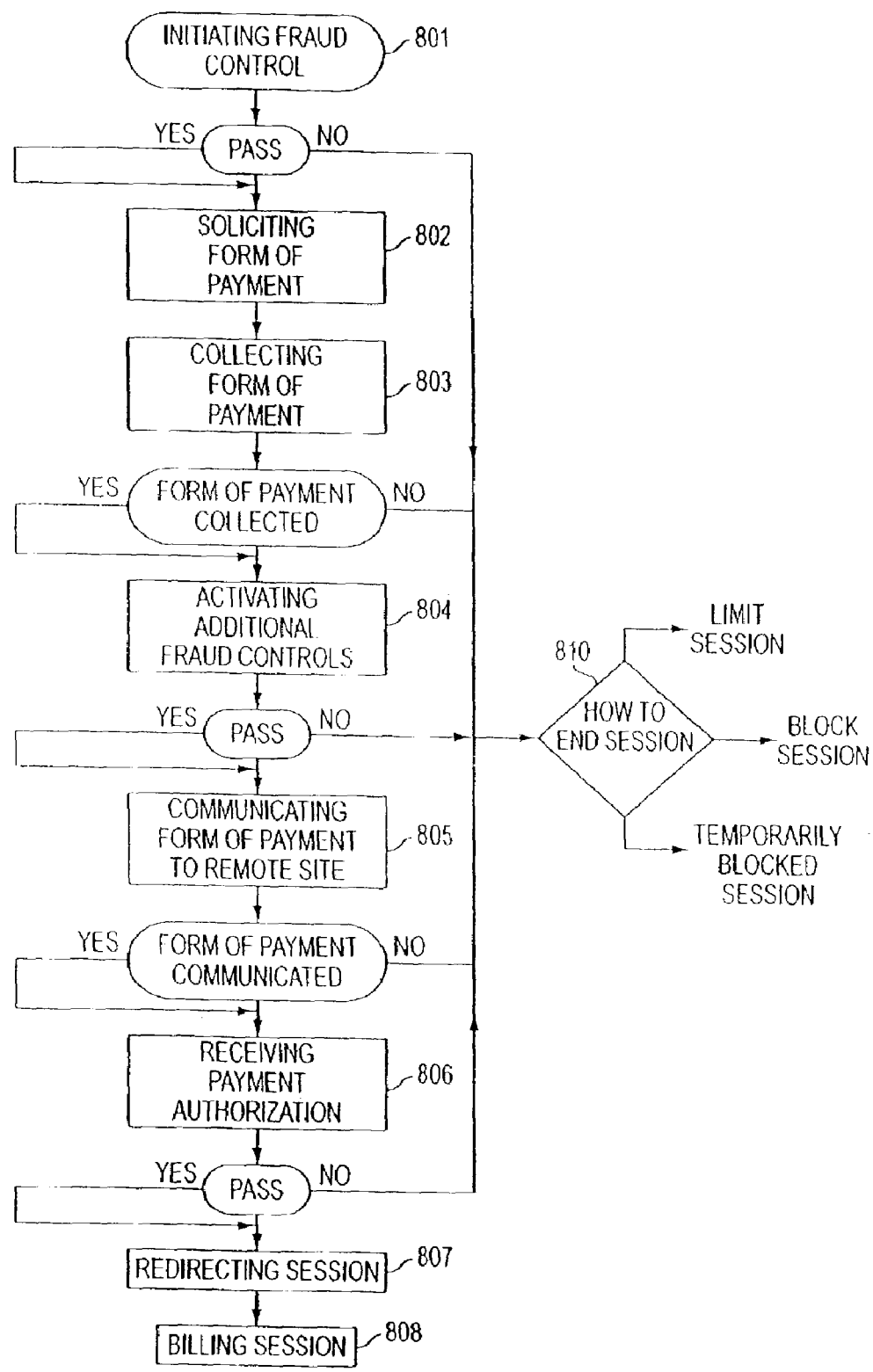
FIG. 8 shows a flow diagram for a real-time billing system for a billing communication session occurring over a computer network according to the present invention.

FIG. 8 shows a flow diagram for a real-time billing system for billing a communication session occurring over a computer network according to the present invention. Such a communication session can be a data-only session or a multimedia session that includes any combination of audio, video and data. At block 801, the initial fraud control are activated, which can include verifying whether the user is requesting a communication session from a location that matches the originating Internet address and/or a unique identification requesting the session, limiting the number and duration of sessions made during a certain time period and/or limiting the amount of money a user spends on service representative communication sessions in a predetermined time period.

When a request for a session is received from a user, the system prompts the user at block 801 to enter the user's Internet address or a unique identification to verify that the user is requesting a session from a location that matches the user's Internet address or unique identification associated with the user and/or terminal equipment received with the request for a session. When the entered Internet address or unique identification, and the Internet address or unique identification forwarded in the packetized data do not match, the user may be disconnected or the user may be given another chance to reenter the correct Internet address or unique identification.

When the originating Internet address or unique identification entered by the user is verified to match the Internet address or unique identification forwarded with the request, the initial fraud control of block 801 verifies that the user's Internet address or unique identification is not stored in a negative database of known bad Internet addresses and/or unique identifications. The negative database can be located in the memory of system 507, and/or remotely located at 509 and accessed over the Internet 501 through server 505. Internet addresses and/or unique identifications stored in the negative database result from insufficient payment of a credit card charge, or a user's refusal of payment relating to a disputed charge from a previous service representative communication session. The present invention, however, is not limited by the above-mentioned negative database satisfying the criteria mentioned above (storing Internet addresses and/or unique identifications having disputed charges or insufficient payments with respect to a service representative session). The negative database used at this stage of the initial fraud control of the present invention may be a shared database that stores Internet addresses and/or unique identifications of users who have credit problems with other types of Internet-based ordering/payment systems.

System 507 also checks to ensure that sessions are not initiated from locations in which an Internet address or a unique identification cannot be forwarded System 507 is also capable of detecting a communication session initiated from particular institutions and communication devices, such as cellular telephones, numbers associated with a PBX system, governmental facilities, pay telephones, prisons, hospitals, schools, selected commercial establishments, etc.

The above-described initial fraud controls are illustrative examples. Other fraud controls will be apparent to those skilled in the art, thus the invention is not limited to the fraud controls described above. In general, the system can be designed to prevent any unwanted Internet addresses and/or unique identifications from entering the system.

When the originating Internet address or unique identification entered by the user is verified to match the Internet address or unique identification forwarded with the session request, and the originating Internet address or unique identification is not contained in the negative database, the initial fraud control of block 801 checks that the user has not exceed a permissible number or duration of sessions the user has made during a predetermined period of time, or an amount of money the user has spent during a predetermined period of time by querying a database. For example, a user may be limited to only two sessions per day or two sessions per week, and the duration of sessions may be limited so that a user is allowed to communicate with service representatives for a maximum of, for example, 100 minutes per month. The amount of money that a user can spend can be limited to, for example, an expenditure of $100 per month. The query can be based on identification information associated with the user, such as the Internet address of the user, a unique identification of the user, a driver's license and/or social security number of the user, the user's mother's maiden name, a password and/or a digital certificate associated with the user. The database containing this type of information can be part of or separate from the negative database, and can be a shared database.

Sessions that fail the initial fraud control of block 801 are forwarded to block 810 where the session is processed to determine what the next course of action will be. According to the invention, sessions can be blocked, temporarily blocked or limited. Blocked sessions are permanently prohibited from connection with a service representative. A message may be sent to a user for a blocked session that advises the user to stop requesting a session because the originating Internet address or unique identification has been blocked. Examples of potentially blocked sessions include sessions originating from Internet addresses and/or unique identifications that are not properly forwarded with packetized data.

A limited session prohibits a user who has exceeded an allotted number of sessions, an allotted duration (in minutes, hour or days) of sessions or an allotted expenditure amount during a certain period of time from being connected to a service representative. The limitations placed on a given user may be removed once the user has satisfied criteria for removing the limitation. A temporarily blocked session can include a session in which an Internet address or a unique identification does not match the received packetized data when the session is requested. The user may be able to reenter the correct Internet address or unique identification, or may be allowed to request another session for correctly entering the user's Internet address, unique identification of other user identification information. Therefore, the user is temporarily blocked from being connected to a service representative. When any of the session limiting, session blocking, or temporary session blocking features is activated, the request is terminated.

When the session successfully passes the initial fraud control of block 801, the session then advances to block 802 where the form of payment that will be used to pay for the session to a service representative is solicited. At step 802, the user is prompted by, for example, a page that queries the user for the form of payment information the user wishes to use. The form of payment can be cash, debit cards, electronic draft or check, electronic funds transfer, credit, major credit card, electronic wallet and the like. This embodiment of the invention, however, involves credit cards, debit cards and the like.

Alternatively, in situations when the user has previously accessed the service, the form of payment information can be automatically accessed from a form-of-payment/credit database in a well-known manner based on the user identification and/or other information that has been provided by the user or through other well-known techniques, such as a cookie. Preferably, the form-of-payment/credit database is stored locally, but can also be remotely located. The previously-used form of payment information stored in the form of payment/credit database is presented to the user in a well-known manner as a possible selection by the user for payment of the current session.

System 507 may offer the user a discount when the form of payment selected by the user is convenient for the billing system. A further discount may be given when the user is a frequent user who has not exceeded the user's allowance for prescribed sessions. Any other form of preferable treatment may also be initiated. In the exemplary embodiment described in FIG. 8, the user provides the form of payment information and sends the information to system 507 in a well-known manner. The user can also be requested to enter or supply information, such as a checking account number, credit card or debit card numbers, the card expiration date, address including zip code, billing address, date of birth, driver's license number, social security number, a password, a digital certificate, mother's maiden name, etc. When the form of payment is not successfully communicated to system 507 by the user, the session is disconnected. Alternatively, the user may be temporarily blocked and/or given another chance for entering the correct information. The user may also be completely blocked from accessing system 507 again.

When the information is successfully communicated or entered, flow continues to block 804 where additional fraud control is implemented. Such additional fraud control may, for example, include comparing information given by the user against information stored in a database of information related to each respective user, and/or verifying that the user's credit card or debit card number has not been in a negative database for delinquent payment. The information stored in this database can be part of or separate from the negative database of call originating Internet addresses and/or unique identifications, and can be a shared database.

The information entered or communicated by the user is also used for determining whether the user has not exceeded a permissible number or duration of sessions the user has initiated during a predetermined period of time, or an amount of money the user has spent during a predetermined period of time by querying a database. The queried database may be the same database used in step 801 for determining whether the user has exceeded any of the same criteria.

When a session fails the additional fraud control of block 804, the session is forwarded to block 810 where the session can be selectively blocked, temporarily blocked, or limited. A blocked session includes a session in which a credit card or debit card has expired or is invalid, and/or an address associated with the user, such as a billing address and/or zip code, is different from an address in the database associated with the user. A limited session includes a session in which a credit card or a debit card exceeds the monthly/weekly allocations of session or exceeds the time allowance for a certain period of time. A temporarily blocked session includes a session in which the zip code or other information supplied by the user does not match the appropriate information stored in a database. Moreover, the system can be designed so that sessions classified as blocked sessions can also be classified as temporarily blocked sessions when the system allows a user to supply information, such as the correct expiration date of a charge card. When the user is allowed to make payment to a lending institution in order to validate the credit or debit card, a call can be classified as temporarily blocked.

According to one embodiment of the invention, when the session passes the additional fraud control, the credit card account information or the debit card account information is forwarded at block 805 to a remotely located site 511 for authorization. Site 511 can be accessed over the Internet through server 506. Alternatively, site 511 can be accessed via a modem link 512. Remote sites used for authorization may, for example, include a credit bureau, a banking institution, a third party biller such as a telephone service provider, a cable television service provider, a utility service provider, or an Internet service provider, or the like. Remote site 511 checks to ensure that the credit card, debit card or account number is valid. In the situation of a credit card, when the credit card is valid, a predetermined amount of money is charged against the credit or debit card account at block 806. According to another embodiment of the present invention, when the session passes the additional fraud control, the credit card account information or the debit card account information is forwarded to a local database to ensure that the credit card or debit card is valid. When the card is valid, a predetermined amount of money is charged against the credit or debit card account at block 806.

The predetermined amount of money charged against the credit account can be performed in several ways. For example, a portion of the user's available line of credit for the account equal to the predetermined amount can be authorized or set aside for the purpose of completing the session. Alternatively, the account may be debited by the predetermined amount. In any event, the predetermined amount of money charged to the account is preferably greater than the probable charge for the telephone call for insuring that the charges incurred during the call will be paid. When the predetermined charge to the account is approved or denied, remote site 511 sends an approval or denial notification back to system 507 at block 806. When remote site 511 authorizes the session, the session is forwarded to a service representative, such as a psychic counselor. When the session is not authorized, the session is either blocked or temporarily blocked until information regarding, for example, the credit bureau, banking institution, telephone service account, cable television account, a utility service account, or Internet service provider account is settled by the user.

At block 807, the session is redirected to a service representative and at this point, the billing processes begin, as shown in block 808. The session is billed from the time the session is redirected and connected to a service representative or the first of a plurality of service representatives and to when the last service representative terminates or ends the session. The user is billed in real time for only the actual minutes that the user communicates with a service representative. When the user is connected to a chatroom environment, the user is billed from the time that the user is connected to the chatroom until the time the user disconnects from the chatroom.

When the session is terminated, system 507 calculates the total billable amount for the session. System 507 then sends the billable amount to remote site 511 at block 810. System 507 can also send the credit card or debit card account information or some other identifying information along with the billable amount to remote site 511. Remote site 511 then reverses the previous charge of the predetermined amount to the account and a new charge for the actual billable amount of the session is charged to the account at block 808. Alternatively, the billable amount is sent to a payment authorization database, which can be locally or remotely located.

As with the voice-based embodiment of the present invention, the reverse authorization routine for the computer network-based embodiment of the present invention can be performed in several ways and the invention is not limited to the following examples. First, the initial authorization to set aside the predetermined amount of available credit is reversed, thereby returning the amount that was set aside to the available credit line. A second authorization is then performed wherein a portion of the available credit line that is equal to the actual cost of the session is set aside. In another embodiment of the invention, the account may receive a credit in the amount of the predetermined amount to negate the initial charge of the predetermined amount. A new charge in the amount of the actual cost of the session is then made to the credit card account. Alternatively, the account may just receive a credit in the amount of the difference of the predetermined amount initially set aside minus the actual billable amount of the session. Furthermore, when a user is not connected to a service representative and the billing has not begun before the session is terminated, the user is not charged for the session and the initial charge is completely reversed. When the credit account information relates to a checking account or an electronic funds transfer, the reverse authorization feature of the present invention is, of course, not used.

As indicated, the present invention is adaptable for providing multimedia-based conferencing services between users and service representatives that are appropriately equipped. Moreover, the service representatives may not necessarily need to depend on system 507 for database maintenance services regarding user and service representative data. Such data may be maintained and updated within personal computers at the service representative's premises.

The present invention also provides for a feature in which selected users are contacted by the system in a well-known manner, such as by e-mail, offering services and/or goods that can be accepted. Alternatively, a selected user can be contacted by way of a multimedia technique in which particular services and/or goods are offered for purchase. If the offer of services and/or goods is accepted by the user, the system provides audio prompts querying the user for a form of payment. Accordingly, a previously-used form of payment can be accessed from a form-of-payment/credit database and provided as a possible selection by the user. The fraud control features of the present invention can optionally be used in conjunction with the querying for the form of payment.

The fraud control of the present invention can also be used for other forms of e-commerce over a computer network, such as the Internet. Goods and/or other services can be made available for sale to potential customers who access a website using a browser or by way of computer-network telephony techniques. When a user accesses a website using a browser, the ISP through which the user is connecting to the website forwards the Internet address of the user to the accessed website. That is, identification information uniquely-identifying the user is available to the accessed website. Alternatively, a mechanism referred to as a cookie can be used for transmitting information between the accessed website and the user that is used for uniquely identifying the user.

Figure 9:
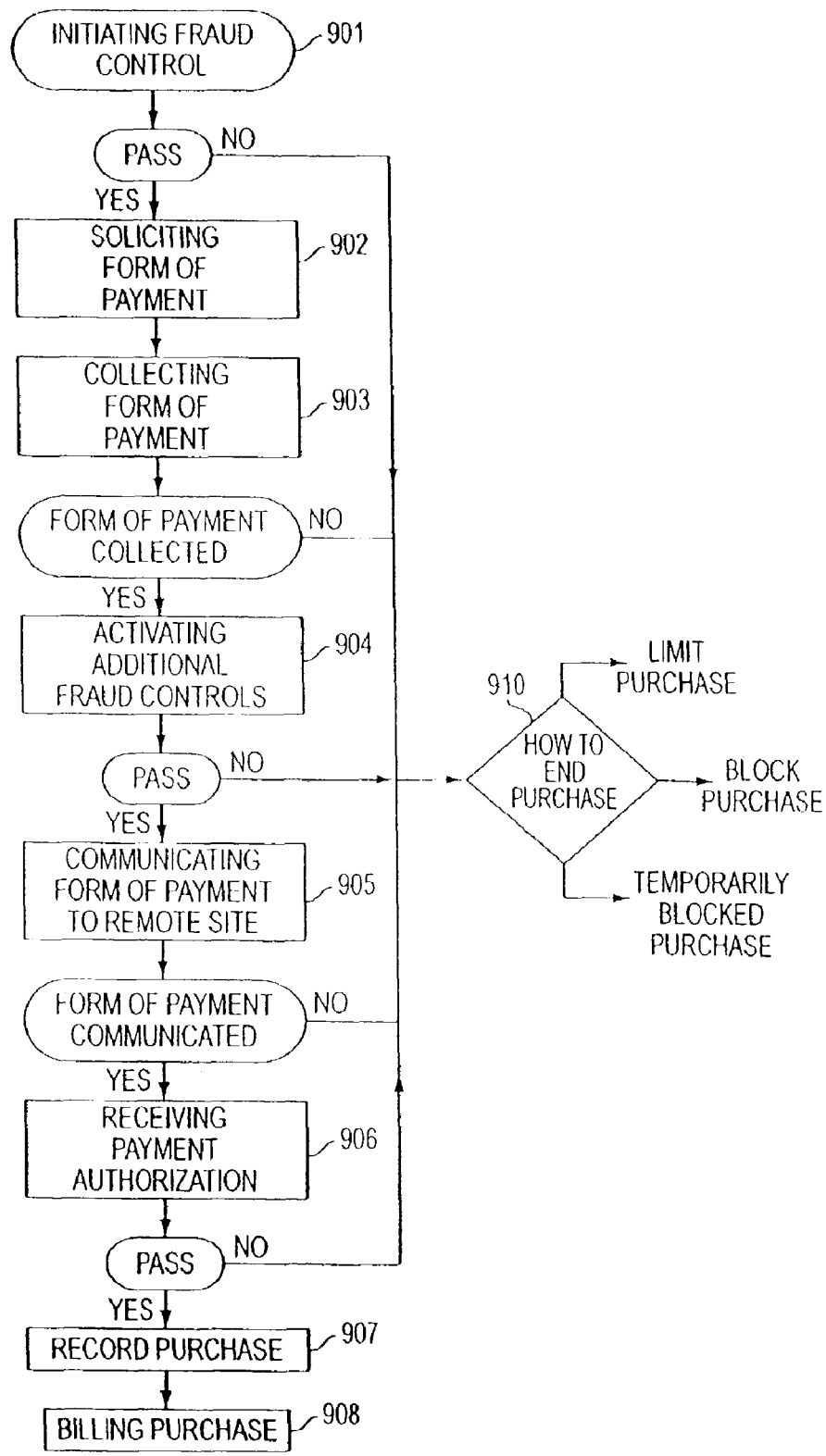
FIG. 9 shows a flow diagram for a real-time billing system for effecting a sale over a computer network according to the present invention.

A user can browse through different pages at the website and select items for purchase by, for example, placing the items into a virtual shopping cart. Once a user decides to buy the selected items, the user clicks on a purchase button. In response, system 507 enters the fraud control process shown in FIG. 9 and queries the user for the information necessary for avoiding fraud. FIG. 9 shows a flow diagram for a real-time billing system for effecting a sale over a computer network according to the present invention. According to the invention, the entire flow diagram or selected aspects of the embodiment shown by FIG. 9 can be used.

For an e-commerce embodiment of the present invention, the initial fraud control activated at block 901 can include verifying whether the user is purchasing a good and/or service from a location that matches the originating Internet address and/or has a unique identification, and/or limiting a sale amount that can be purchased during a certain time period. When a purchase request is received from a user, the system prompts the user at block 901 to enter the user's Internet address or a unique identification to verify that the user is making a purchase from a location that matches the user's Internet address or unique identification associated with the user and/or terminal equipment received with the purchase request. When the entered Internet address or unique identification, and the Internet address or unique identification forwarded in the packetized data do not match, the user may be disconnected or the user may be given another chance to reenter the correct Internet address or unique identification. Alternatively, a cookie can be used in a well-known manner for gathering specific information that can be used for uniquely identifying a user. In such a situation, the user is then prompted at block 901 to enter information that can be compared to information gathered by use of a cookie.

When the originating Internet address or unique identification entered by the user is verified to match the Internet address or unique identification forwarded with the request, the initial fraud control of block 901 also verifies that the user's Internet address or unique identification is not stored in a negative database of known bad Internet addresses and/or unique identifications. The negative database can be located in the memory of system 507, and/or remotely located at 509 and accessed over the Internet 501 through server 505. Internet addresses and/or unique identifications stored in the negative database result from insufficient payment of a credit card charge, or a user's refusal of payment relating to a disputed charge from a previous purchase of a product and/or service. The present invention, however, is not limited by the above-mentioned negative database satisfying the criteria mentioned above (storing Internet addresses and/or unique identifications having disputed charges or insufficient payments with respect to the purchase of a product and/or service). The negative database used at this stage of the initial fraud control of the present invention may be a shared database that stores Internet addresses and/or unique identifications of users who have credit problems with other types of Internet-based ordering/payment systems.

System 507 also checks to ensure that purchase requests are not initiated from locations in which an Internet address or a unique identification cannot be or is not forwarded. System 507 is also capable of detecting a communication session initiated from particular institutions and communication devices, such as cellular telephones, numbers associated with a PBX system, governmental facilities, pay telephones, prisons, hospitals, schools, selected commercial establishments, etc.

The above-described initial fraud controls are illustrative examples. Other fraud controls will be apparent to those skilled in the art, thus the invention is not limited to the fraud controls described above. In general, the system can be designed to prevent any unwanted Internet addresses and/or unique identifications from making purchases.

When the originating Internet address or unique identification entered by the user is verified to match the Internet address or unique identification forwarded with the purchase request, and the originating Internet address or unique identification is not contained in the negative database, the initial fraud control of block 901 checks that the user has not exceed a permissible amount of money the user has spent during a predetermined period of time by querying a database. The amount of money that a user can spend can be limited to, for example, an expenditure of $100 per month. The query can be based on identification information associated with the user, such as the Internet address of the user, a unique identification of the user, a driver's license and/or social security number of the user, the user's mother's maiden name, a password and/or a digital certificate associated with the user. The database containing this type of information can be part of or separate from the negative database, and can be a shared database.

Purchase requests that fail the initial fraud control of block 901 are forwarded to block 910 where the purchase request is processed to determine what the next course of action will be. According to the invention, purchases can be blocked, temporarily blocked or limited. Blocked purchases are permanently prohibited from completing a sale transaction. A message may be sent to a user for a blocked purchase request that advises the user to stop requesting a purchase because the originating Internet address or unique identification has been blocked. Examples of potentially blocked purchases include sessions originating from Internet addresses and/or unique identifications that are not properly forwarded with packetized data.

A limited purchase prohibits a user who has exceeded an allotted expenditure amount during a certain period of time from making a purchase. The limitations placed on a given user may be removed once the user has satisfied criteria for removing the limitation. A temporarily blocked purchase request can include a purchase request in which an Internet address or a unique identification does not match the received packetized data when the purchase is requested. The user may be able to reenter the correct Internet address or unique identification, or may be allowed to request another purchase for correctly entering the user's Internet address, unique identification of other user identification information. Therefore, the user is temporarily blocked from being connected from making a purchase. When any of the purchase request limiting, purchase request blocking, or temporary purchase request blocking features is activated, the request is terminated.

When the purchase request successfully passes the initial fraud control of block 901, the purchase request then advances to block 902 where the form of payment that will be used to pay for the purchase is solicited. At step 902, the user is prompted by, for example, a page that queries the user for the form of payment information the user wishes to use. The form of payment can be cash, debit cards, electronic draft or check, electronic funds transfer, credit, major credit card, smart card, electronic wallet, and the like, or applying the charge to a telephone bill, a cable television account, a utility service account, an Internet service provider account, and the like.

System 507 may offer the user a discount when the form of payment selected by the user is convenient for the billing system. A further discount may be given when the user is a frequent user who has not exceeded the user's allowance for prescribed purchases. Any other form of preferable treatment may also be initiated. In the exemplary embodiment described in FIG. 9, the user provides the form of payment information and sends the information to system 507 in a well-known manner. The user can also be requested to enter or supply information, such as a checking account number, a credit card or debit card numbers, a card expiration date, a telephone number, a cable television account number, a utility service account number, an Internet service provider account number, an address including zip code, billing address, date of birth, driver's license number, social security number, a password, a digital certificate, mother's maiden name, etc. When the form of payment is not successfully communicated to system 507 by the user, the purchase request is disconnected. Alternatively, the user may be temporarily blocked and/or given another chance for entering the correct information. The user may also be completely blocked from accessing system 507 again.

When the information is successfully communicated or entered, flow continues to block 904 where additional fraud controls are implemented. Such additional fraud controls may, for example, include comparing information given by the user against information stored in a database of information related to each respective user, verifying that the user's credit card or debit card number has not been in a negative database for delinquent payment. The information stored in this database can be part of or separate from the negative database of communication session originating Internet addresses and/or unique identifications, and can be a shared database.

The information entered or communicated by the user is also used for determining whether the user has not exceeded a permissible amount of money the user has spent during a predetermined period of time by querying a database. The queried database may be the same database used in step 901 for determining whether the user has exceeded any of the same criteria.

When a purchase request fails the additional fraud control of block 904, the purchase request is forwarded to block 910 where the purchase can be selectively blocked, temporarily blocked, or limited. A blocked purchase request includes a purchase request in which a credit card or debit card has expired or is invalid, and/or an address associated with the user, such as a billing address and/or zip code, is different from an address in the database associated with the user. A limited purchase request includes a purchase request in which a credit card or a debit card exceeds the monthly/weekly allocations of session or exceeds the time allowance for a certain period of time. A temporarily blocked purchase request includes a purchase request in which the zip code or other information supplied by the user does not match the appropriate information stored in a database. Moreover, the system can be designed so that purchase requests classified as blocked can also be classified as temporarily blocked when the system allows a user to supply information, such as the correct expiration date of a charge card. When the user is allowed to make payment to a lending institution in order to validate the credit or debit card, a communication session can be classified as temporarily blocked.

According to one embodiment of the invention, when the purchase request passes the additional fraud control, the credit card account information or the debit card account information is forwarded at block 905 to a remotely located site 511 for authorization. Site 511 can be accessed over the Internet through server 506. Alternatively, site 511 can be accessed via a modem link 512. Remote sites used for authorization may, for example, include a credit bureau, a banking institution, a third party biller such as a telephone service provider, a cable television service provider, a utility service provider, an Internet service provider, or the like. Remote site 511 checks to ensure that the credit card, debit card or account number is valid. According to another embodiment of the present invention, when the purchase request passes the additional fraud control, the credit card account information or the debit card account information is forwarded to a local database to ensure that the credit card or debit card is valid.

When the predetermined charge to the account is approved or denied, remote site 511 sends an approval or denial notification back to system 507 at block 906. When remote site 511 authorizes the purchase request, the purchase request is entered into system 507 at block 907. When the purchase request is not authorized, the purchase request is either blocked or temporarily blocked until information regarding the credit bureau, banking institution, telephone service account, cable television account, a utility service account, or Internet service provider account is settled by the user.

When the purchase request is entered into system 507, system 507 calculates the total billable amount for the session. System 507 then sends the billable amount to remote site 511 at block 908. System 507 can also send the credit card, debit card, telephone service account, cable television account, utility service account, or Internet service provider account information or some other identifying information along with the billable amount to remote site 511. Remote site 51 then charges the billable amount to the account and a new charge for the actual billable amount for the purchase is charged to the account at block 908. Alternatively, the billable amount is sent to a payment authorization database, which can be locally or remotely located.

Figure 10A:
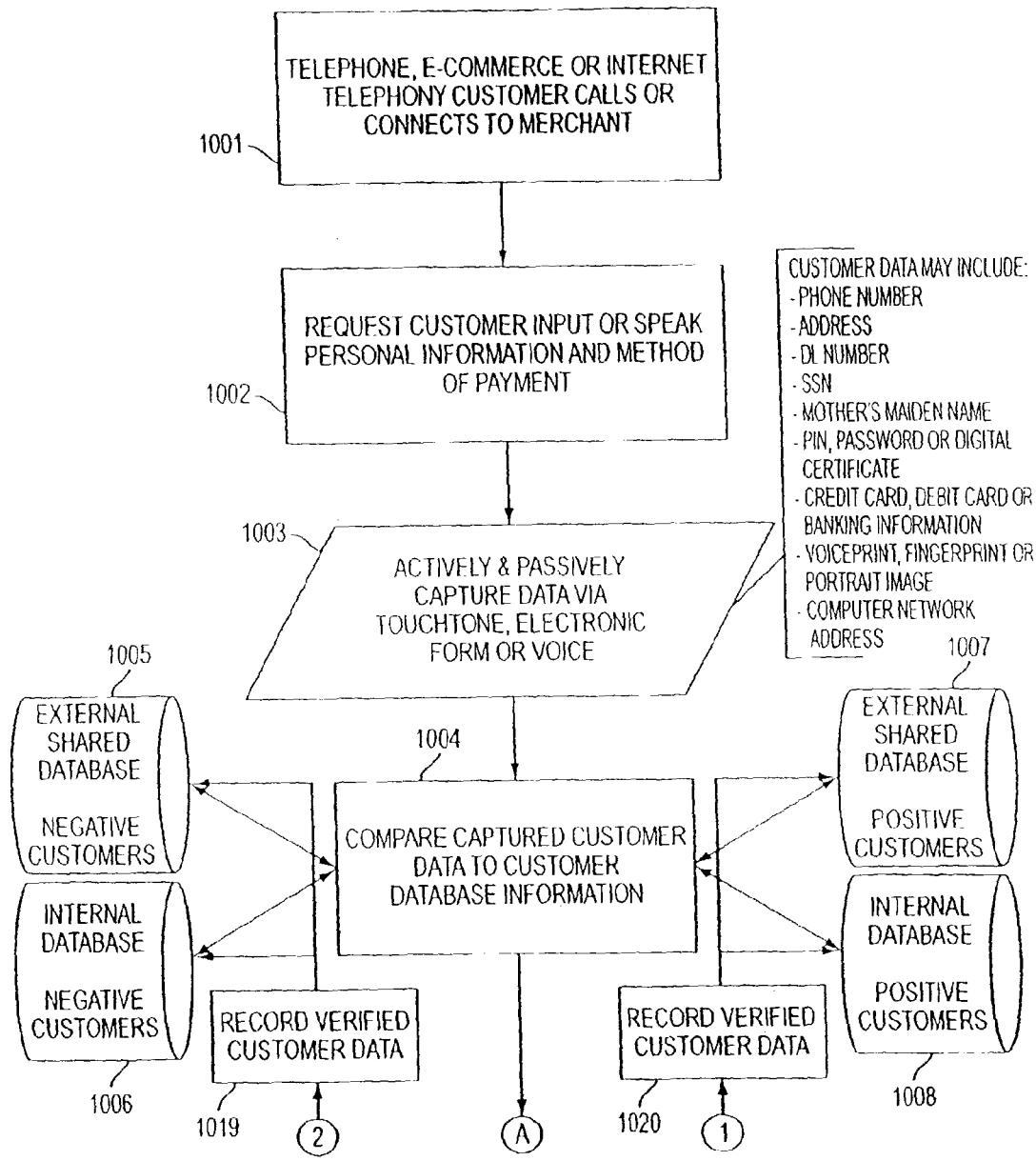
FIGS. 10a-10c show a flow diagram summarizing the real-time billing and fraud control system of the present invention.
Figure 10B:
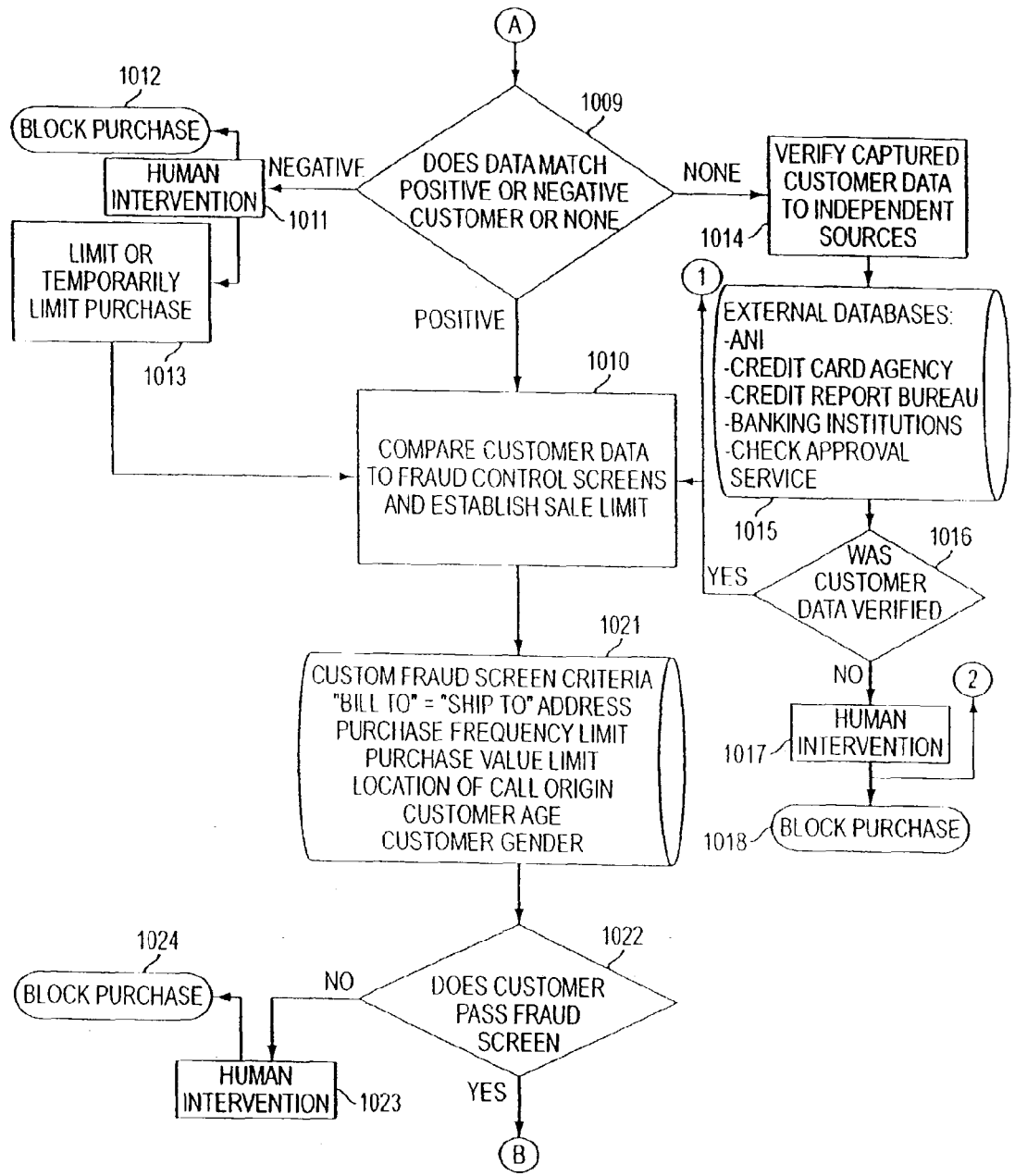
Figure 10C:
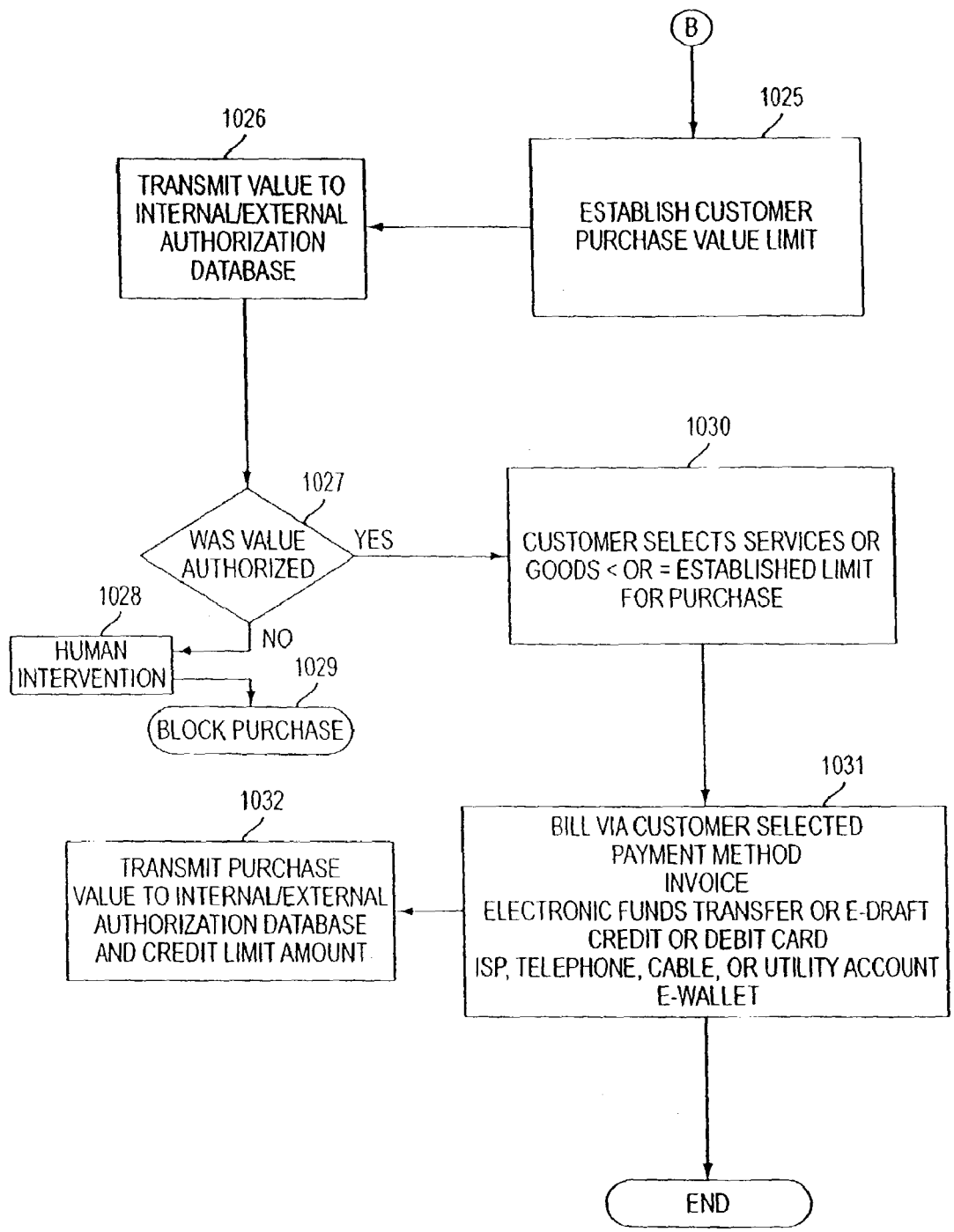

FIGS. 10*a*-10*c* show a flow diagram summarizing the real-time billing and fraud control system of the present invention. At step 1001, a customer is connected to a service provider or a merchant providing telephone or communication session services, and/or goods and services for purchase by way of e-commerce. At step 1002, the customer is queried for personal information and a method of payment that will be used by the customer. In situations when the customer has previously purchased services and/or goods, form of payment information can be automatically accessed from a form-of-payment/credit database based on the ANI and/or other information that has been provided by the customer, and presented to the customer for possible selection by the customer. At step 1003, the personal information of the customer and the method of payment information that is to be used by the customer are actively and/or passively captured. The personal information of the customer that is captured can include, the customer's telephone number, address, DL number, social security number, mother's maiden name, a PIN, a password, a digital certificate, a credit card number, a debit card number, banking information, a voiceprint, a fingerprint, a portrait image and/or a computer network address.

At step 1004, the captured customer data is compared to information contained in one or more customer databases, such as any of an external shared negative customer database 1005, an internal negative customer database 1006, an external shared positive customer database 1007 and an internal positive customer database 1009. At step 1009, it is determined whether the captured customer data matches information contained in a positive customer database or a negative customer database, or whether the captured customer data does not match information contained in any of the databases accessed. If, at step 1009, the captured customer data matches information contained in a positive customer database, flow continues to step 1010

If, at step 1009, the captured customer data matches information contained in a negative customer database, flow continues to step 1011 where a service representative can intervene for making a final determination regarding blocking or limiting purchases of the goods and/or services available for purchase. When the service representative decides to block a purchase based on the available information, flow continues to step 1012. When the service representative, based on the available information, decides to limit or temporarily limit a purchase, flow continues to step 1013, and then to step 1010. Alternatively, flow can proceed to block purchases (step 1012) or limit purchases (step 1013) based on information available at decision step 1009.

If, at step 1009, the captured customer information does not match information contained in any of the databases that were accessed, flow continues to step 1014 where the captured information is verified at step 1015 with independent sources by queries to at least one external database, such as an ANI database, a credit card agency database, a credit report bureau database, a banking institution, and a check approval service. Flow continues to step 1016, where it is determined whether the captured customer information was verified. If not, flow continues to step 1017 where a service representative can intervene for making a final determination regarding blocking purchases of the goods and/or services available for purchase. When the service representative decides to block a purchase based on the available information, flow continues to step 1018 and to step 1019 where the captured information is shared with negative customer databases, such as databases 1005 and 1006. When the service representative decides to permit a purchase based on the available information, flow continues to step 1010 where the customer information is compared to fraud control screening criteria and to establish a sale limit, and to step 1020 where the captured information is shared with positive customer databases, such as databases 1007 and 1008. Alternatively, flow can proceed to block purchases (step 1018) based on information available at decision step 1016.

At step 1010, the customer information is compared to fraud control screening criteria and a sale limit is established. Flow continues to step 1021 where customer fraud screening criteria is accessed, such as a bill-to address, a ship-to address, a purchase-frequency limit, a purchase-value limit, a call origin location, the customer age, and customer gender. At step 1022, it is determined whether the customer passed the fraud control screening. If not, flow continues to step 1023 where a service representative can intervene for making a final determination regarding blocking purchases of the goods and/or services available for purchase. When the service representative decides to block a purchase based on the available information, flow continues to step 1024. Alternatively, flow can proceed to block purchases (step 1024) based on information available at decision step 1022.

If, at step 1022, the customer passes the fraud control screening, flow continues to step 1025 where a customer purchase value limit is established. Flow continues to step 1026 where the established purchase value limit is communicated to appropriate internal and external databases, such as databases 1005-1008. Flow continues to step 1027 where it is determined whether the customer purchase value has been authorized. If not, flow continues to step 1028 where a service representative can intervene for making a final determination regarding blocking purchases of the merchants goods and/or services. When the service representative decides to block a purchase based on the available information, flow continues to step 1029. Alternatively, flow can proceed to block purchases (step 1029) based on information available at decision step 1027.

If the customer purchase value was authorized at step 1027, flow continues to step 1030 where the customer selects goods and/or services having a value that is less than or equal to the established limit for the customer. Flow continues to step 1031 where the customer is billed by way of the customer-selected method of payment, such as an invoice, an electronic funds transfer or e-draft, a credit or debit card transaction, an Internet Service Provider, a telephone, a cable or other utility account, or an e-wallet. The purchase value is transmitted to appropriate internal and external authorization and credit limit amount databases at step 1032 and the process is exited at step 1033.

Other modifications and enhancements to the present invention may be adaptively made for providing other services over a computer network, such as the Internet, than that described, such as computer service advice, medical counseling, suicide hot-line and other services.

Any patents or publications referenced above should be deemed to be incorporated by reference as to their entire subject matter should one believe it relevant to obtain details from such sources for explanations of related arrangements and how they may be employed to advantage in the present invention. The present invention should only be deemed to be limited in scope by the claims which follow.

I claim:

1. A method, comprising:
    receiving a purchase request from a user over the Internet, the purchase request comprising Internet address information associated with a user that has been forwarded with the purchase request, the Internet address information related to an Internet address from where the purchase request was requested;
    receiving a unique identification from the user over the Internet;
    comparing, by at least one computer, the unique identification to the Internet address information, the computer generating a result of the comparison; and
    allowing the purchase request to proceed when the unique identification corresponds to the Internet address information.

2. The method according to claim 1, wherein the unique identification comprises information relating to a computer-network address, terminal equipment identification information, a telephone number, a physical address, a driver's license number, a social security number, a relative's surname, a PIN, a password, a digital certificate, a credit card number, a debit card number, banking information, a voiceprint, a fingerprint, or a portrait image.

3. The method according to claim 2, further comprising:
    accessing a database; and
    comparing the unique identification with information stored in the database, and
    wherein allowing the purchase request is further based on a result of comparing the received unique identification with information stored in the database.

4. The method according to claim 3, wherein the database is a positive database,
    wherein comparing the unique identification with information stored in the database comprises verifying the identity of the user in the positive database, and
    wherein allowing the purchase request is further based on an identity of the user being verified in the positive database.

5. The method according to claim 4, wherein allowing the purchase request further comprises initiating the purchase request.

6. The method according to claim 5, wherein when the identity of the user has been verified in the positive database, the method further comprises limiting an amount of the purchase request based on at least one of the unique identification a frequency of purchase requests for the user during a predetermined period of time, an amount of money spent by the user during a predetermined period of time, a time of day, a geographical location for the user, credit account information associated with the user, a billing address, or personal information relating to the user.

7. The method according to claim 6, wherein when the amount of the purchase request is limited based on credit account information associated with the user, the credit account information comprises information relating to credit card information, debit card information, checking account information, electronic funds transfer information, a telephone number, a cable television account, a utility service account, an Internet service provider account, a credit card expiration date, an address of the user, a zip code of the user, a billing address of the user, a date of birth of the user, a driver's license number of the user, a social security number of the user, a personal identification number of the user, a password, a digital certificate associated with the user, a maiden name of the user's mother, or electronic wallet information.

8. The method according to claim 6, wherein when the amount of the purchase request is limited based on personal information relating to the user, the personal information of the user comprises at least a portion of a driver's license number, a social security number, a mother's maiden name, a password, a digital certificate, a personal identification number, a cookie associated with the user, a fingerprint of the user, a thumbprint of the user, a voice print of the user, or a portrait of the user.

9. The method according to claim 3, wherein the database is a negative database, and
    wherein comparing the unique identification with information stored in the database further comprises blocking the purchase request when the identity of the user has been verified in the negative database by comparing the received unique identification with information stored in the negative database.

10. The method according to claim 9, wherein the unique identification comprises information relating to a computer-network address, terminal equipment identification information, a telephone number, a physical address, a driver's license number, a social security number, a relative's surname, a personal identification number (PIN), a password, a digital certificate, a credit account, a credit card number, a debit card number, banking information, a voiceprint, a fingerprint, or a portrait image.

11. The method according to claim 10, wherein the negative database comprises information relating to computer-network address information, user unique identification information, or information based on payment history.

12. The method according to claim 11, wherein the information based on payment history comprises information relating to a delinquent payment of a credit account charge, an insufficient payment of a credit account charge, a refusal of payment relating to a disputed charge from a previous purchase of a product, a refusal of payment relating to a disputed charge from a previous purchase of a service, or information relating to a credit problem with other types of computer-network ordering/payment systems.

13. The method according to claim 11, wherein the computer-network address information comprises information relating to a computer-network address from where the purchase request was requested, a terminal equipment identification from which the purchase request was requested, a location from which a computer-network address cannot be forwarded, a location from which unique identification information for the user cannot be forwarded, a telephone number, a physical address, a driver's license number, a social security number, a relative's surname, a personal identification number (PIN), a password, a digital certificate, a credit account, a credit card number, a debit card number, banking information, a voiceprint, a fingerprint, or a portrait image.

14. The method according to claim 13, wherein the unique identification comprises a computer-network address for the user, and
wherein comparing the unique identification with information stored in the database further comprises determining whether the Internet address for the user is matched in the negative database.

15. The method according to claim 9, wherein the negative database comprises a shared database, a locally located database, or a database located at a remote site.

16. The method according to claim 3, wherein the database is a negative database comprising computer-address information, user unique identification information, or information based on payment history; and
wherein comparing the unique identification with information stored in the database further comprises allowing the purchase request when it is determined that the unique identification is not matched in the negative database.

17. The method according to claim 16, wherein the computer-network address information comprises information relating to a computer-network address from where the purchase request was requested, a terminal equipment identification from which the purchase request was requested, a location from which a computer-network address cannot be forwarded, a location from which unique identification information for the user cannot be forwarded, a telephone number, a physical address, a driver's license number, a social security number, a relative's surname, a personal identification number (PIN), a password, a digital certificate, a credit account, a credit card number, a debit card number, banking information, a voiceprint, a fingerprint, or a portrait image.

18. The method according to claim 17, wherein the user unique identification comprises information relating to a computer-network address, terminal equipment identification information, a telephone number, a physical address, a driver's license number, a social security number, a relative's surname, a personal identification number (PIN), a password, a digital certificate, a credit account, a credit card number, a debit card number, banking information, a voiceprint, a fingerprint, or a portrait image.

19. The method according to claim 18, wherein the information based on payment history comprises information relating to a delinquent payment of a credit account charge, an insufficient payment of a credit account charge, a refusal of payment relating to a disputed charge from a previous purchase of a product, a refusal of payment relating to a disputed charge from a previous purchase of a service, or information relating to a credit problem with other types of computer-network ordering/payment systems.

20. The method according to claim 19, wherein determining whether the unique identification associated with the user is matched in the negative database comprises receiving an indication whether the unique identification associated with a user is matched in a negative database, and
wherein allowing the purchase request is based on the indication whether the unique identification associated with the user is matched in the negative database.

21. The method according to claim 20, wherein allowing the purchase request further comprises initiating the purchase request.

22. The method according to claim 21, wherein determining whether the unique identification associated with a user is matched in the negative database further comprises:
receiving a request for determining whether the unique identification associated with the user is matched in the negative database;
determining in response to the request whether the unique identification associated with the user is matched in the negative database; and
providing the indication whether the unique identification associated with the user is matched in the negative database.

23. The method according to claim 21, wherein allowing the purchase request further comprises limiting an amount of the purchase request based on the unique identification, a frequency of purchase requests for the user during a predetermined period of time, an amount of money spent by the user during a predetermined period of time, a time of day, a geographical location for the user, credit account information associated with the user, a billing address, or personal information relating to the user.

24. The method according to claim 23, wherein when the amount of the purchase request is limited based on credit account information associated with the user, the credit account information comprises information relating to credit card information, debit card information, checking account information, electronic funds transfer information, a telephone number, a cable television account, a utility service account, an Internet service provider account, a credit card expiration date, an address of the user, a zip code of the user, a billing address of the user, a date of birth of the user, a driver's license number of the user, a social security number of the user, a personal identification number of the user, a password, a digital certificate associated with the user, a maiden name of the user's mother, or electronic wallet information.

25. The method according to claim 23, wherein when the amount of the purchase request is limited based on personal information relating to the user, the personal information of the user comprises at least a portion of a driver's license number, a social security number, a mother's maiden name, a password, a digital certificate, a personal identification number, a cookie associated with the user, a fingerprint of the user, a thumbprint of the user, a voice print of the user, or a portrait of the user.

26. The method according to claim 16, wherein the negative database comprises a shared database, a locally located database, or a database located at a remote site.

27. A method, comprising:
receiving a result of a comparison, made by at least one computer, of a unique identification of a user to Internet address information associated with the user, the Internet address information associated with the user being received over the Internet with a purchase request from the user, the Internet address information related to an Internet address from where the purchase request was requested; and allowing the purchase request to proceed when the result of the comparison is that the unique identification corresponds to the Internet address information.

28. The method according to claim 27, wherein the unique identification comprises information relating to a computer-network address, terminal equipment identification information, a telephone number, a physical address, a driver's license number, a social security number, a relative's surname, a PIN, a password, a digital certificate, a credit card number, a debit card number, banking information, a voiceprint, a fingerprint, or a portrait image.

29. The method according to claim 28, further comprising:
receiving a result of a comparison of the unique identification with information stored in a database, and
wherein allowing the purchase request is further based on the result of comparing the received unique identification with information stored in the database.

30. The method according to claim 29, wherein the database is a positive database,
wherein the result of the comparison of the unique identification with information stored in the database comprises a verification of the identity of the user being in the positive database, and
wherein allowing the purchase request is further based on the identity of the user being verified to be in the positive database.

31. The method according to claim 30, wherein allowing the purchase request further comprises initiating the purchase request.

32. The method according to claim 31, wherein when the identity of the user has been verified to be in the positive database, the method further comprises limiting an amount of the purchase request based on at least one of the unique identification, a frequency of purchase requests for the user during a predetermined period of time, an amount of money spent by the user during a predetermined period of time, a time of day, a geographical location for the user, credit account information associated with the user, a billing address, or personal information relating to the user.

33. The method according to claim 31, wherein when the amount of the purchase request is limited based on credit account information associated with the user, the credit account information comprises information relating to at least one of credit card information, debit card information, checking account information, electronic funds transfer information, a telephone number, a cable television account, a utility service account, an Internet service provider account, a credit card expiration date, an address of the user, a zip code of the user, a billing address of the user, a date of birth of the user, a driver's license number of the user, a social security number of the user, a personal identification number of the user, a password, a digital certificate associated with the user, a maiden name of the user's mother, or electronic wallet information.

34. The method according to claim 31, wherein when the amount of the purchase request is limited based on personal information relating to the user, the personal information of the user comprises at least a portion of a driver's license number, a social security number, a mother's maiden name, a password, a digital certificate, a personal identification number, a cookie associated with the user, a fingerprint of the user, a thumbprint of the user, a voice print of the user, or a portrait of the user.

35. The method according to claim 29, wherein the database is a negative database, and
wherein the result of the comparison of the unique identification with information stored in the database comprises a verification of the identity of the user being in the negative database, and
wherein the method further comprising blocking the purchase request based on the identity of the user being verified to be in the negative database.

36. The method according to claim 35, wherein the unique identification comprises information relating to a computer-network address, terminal equipment identification information, a telephone number, a physical address, a driver's license number, a social security number, a relative's surname, a personal identification number (PIN), a password, a digital certificate, a credit account, a credit card number, a debit card number, banking information, a voiceprint, a fingerprint, or a portrait image.

37. The method according to claim 36, wherein the negative database comprises information relating to computer-network address information, user unique identification information, or information based on payment history.

38. The method according to claim 37, wherein the information based on payment history comprises information relating to a delinquent payment of a credit account charge, an insufficient payment of a credit account charge, a refusal of payment relating to a disputed charge from a previous purchase of a product, a refusal of payment relating to a disputed charge from a previous purchase of a service, or information relating to a credit problem with other types of computer-network ordering/payment systems.

39. The method according to claim 37, wherein the computer-network address information comprises information relating to a computer-network address from where the purchase request was requested, a terminal equipment identification from which the purchase request was requested, a location from which a computer-network address cannot be forwarded, a location from which unique identification information for the user cannot be forwarded, a telephone number, a physical address, a driver's license number, a social security number, a relative's surname, a personal identification number (PIN), a password, a digital certificate, a credit account, a credit card number, a debit card number, banking information, a voiceprint, a fingerprint, or a portrait image.

40. The method according to claim 39, wherein the unique identification comprises a computer-network address for the user, and
wherein the result of the comparison of the unique identification with information stored in the database further comprises a verification of the computer-network address for the user being in the negative database.

41. The method according to claim 35, wherein the negative database comprises a shared database, a locally located database, or a database located at a remote site.

42. The method according to claim 29, wherein the database is a negative database comprising computer-address information, user unique identification information, or information based on payment history; and
wherein the result of the comparison of the unique identification with information stored in the database comprises a verification of the identity of the user not being in the negative database.

43. The method according to claim 42, wherein the computer-network address information comprises information relating a computer-network address from where the purchase request was requested, a terminal equipment identification from which the purchase request was requested, a location from which a computer-network address cannot be forwarded, a location from which unique identification information for the user cannot be forwarded, a telephone number, a physical address, a driver's license number, a social security number, a relative's surname, a personal identification number (PIN), a password, a digital certificate, a credit account, a credit card number, a debit card number, banking information, a voiceprint, a fingerprint, or a portrait image.

44. The method according to claim 43, wherein the user unique identification comprises information relating to a computer-network address, terminal equipment identification information, a telephone number, a physical address, a driver's license number, a social security number, a relative's surname, a personal identification number (PIN), a password, a digital certificate, a credit account, a credit card number, a debit card number, banking information, a voiceprint, a fingerprint, or a portrait image.

45. The method according to claim 44, wherein the information based on payment history comprises information relating to a delinquent payment of a credit account charge, an insufficient payment of a credit account charge, a refusal of payment relating to a disputed charge from a previous purchase of a product, a refusal of payment relating to a disputed charge from a previous purchase of a service, or information relating to a credit problem with other types of computer-network ordering/payment systems.

46. The method according to claim 45, wherein allowing the purchase request is further based on the verification that the identity of the user not being in the negative database.

47. The method according to claim 46, wherein allowing the purchase request further comprises initiating the purchase request.

48. The method according to claim 47, wherein allowing the purchase request further comprises limiting an amount of the purchase request based on at least one of the unique identification, a frequency of purchase requests for the user during a predetermined period of time, an amount of money spent by the user during a predetermined period of time, a time of day, a geographical location for the user, credit account information associated with the user, a billing address, or personal information relating to the user.

49. The method according to claim 48, wherein when the amount of the purchase request is limited based on credit account information associated with the user, the credit account information comprises information relating to at least one of credit card information, debit card information, checking account information, electronic funds transfer information, a telephone number, a cable television account, a utility service account, an Internet service provider account, a credit card expiration date, an address of the user, a zip code of the user, a billing address of the user, a date of birth of the user, a driver's license number of the user, a social security number of the user, a personal identification number of the user, a password, a digital certificate associated with the user, a maiden name of the user's mother, or electronic wallet information.

50. The method according to claim 48, wherein when the amount of the purchase request is limited based on personal information relating to the user, the personal information of the user comprises at least a portion of a driver's license number, a social security number, a mother's maiden name, a password, a digital certificate, a personal identification number, a cookie associated with the user, a fingerprint of the user, a thumbprint of the user, a voice print of the user, or a portrait of the user.

51. The method according to claim 42, wherein the negative database comprises a shared database, a locally located database, or a database located at a remote site.

* * * * *

UNITED STATES PATENT AND TRADEMARK OFFICE
CERTIFICATE OF CORRECTION

| | | |
|---|---|---|
| PATENT NO. | : 8,190,513 B2 | Page 1 of 1 |
| APPLICATION NO. | : 12/255857 | |
| DATED | : May 29, 2012 | |
| INVENTOR(S) | : David Felger | |

It is certified that error appears in the above-identified patent and that said Letters Patent is hereby corrected as shown below:

On the Title Page, Column 1, item (75), line 5, please delete "Latana" and insert --Lantana--

On the Title Page, Column 1, item (73), line 7, please delete "Boca Raton" and insert --Lantana--

On the Title Page, Column 1, item (60), beginning at line 25, please insert the following immediately after "abandoned":

--, which is a continuation-in-part of application No. 09/039,335, filed on Mar. 16, 1998, now abandoned, which is a continuation-in-part of application No. 08/757,563, filed on Nov. 27, 1996, now Pat. No. 5,960,069, which is a continuation-in-part of application No. 08/658,378, filed on Jun. 5, 1996, now Pat. No. 5,802,156.

and said application No. 09/362,238, filed on Jul. 28, 1999 claims benefit of Provisional application No. 60/139,475, filed on Jun. 17, 1999--

Signed and Sealed this
Twenty-fourth Day of July, 2012

David J. Kappos
*Director of the United States Patent and Trademark Office*